United States Patent [19]
Watanabe

[11] Patent Number: 5,544,091
[45] Date of Patent: Aug. 6, 1996

[54] CIRCUIT SCALE REDUCTION FOR BIT-SERIAL DIGITAL SIGNAL PROCESSING

[75] Inventor: Tohru Watanabe, Musashimurayama, Japan

[73] Assignee: Casio Computer Co., Ltd., Tokyo, Japan

[21] Appl. No.: 205,844

[22] Filed: Mar. 2, 1994

[30] Foreign Application Priority Data

Mar. 5, 1993 [JP] Japan ................................ 5-071221

[51] Int. Cl.⁶ ................................................ G06F 7/38
[52] U.S. Cl. ................................................. 364/725
[58] Field of Search ........................ 364/725, 715.02

[56] References Cited

U.S. PATENT DOCUMENTS

| | | |
|---|---|---|
| 3,979,701 | 9/1976 | Tomozawa . |
| 4,302,775 | 11/1981 | Widergren et al. . |
| 4,385,363 | 5/1983 | Widergren et al. . |
| 4,789,953 | 12/1988 | Gerrath ................................ 364/734 |
| 5,068,911 | 11/1991 | Resnikoff et al. . |
| 5,153,730 | 10/1992 | Nagasaki et al. . |
| 5,285,402 | 2/1994 | Keith ................................ 364/725 |

FOREIGN PATENT DOCUMENTS 3-145274  6/1991  Japan .

OTHER PUBLICATIONS

Chen et al, "Adaptive Coding of Monochrome and Color Images", IEEE Transactions on Communications vol. COM-25, No. 11, Nov., 1977, pp. 1285-1292.
Gottlieb et al, "A Video Rate 16×16 Discrete Cosine Transform IC", IEEE 1988 Custom Integrated Circuit Conference.
Leung, "A Realization of Narrow-Band Recursive Digital Low-Pass Filter Using Highly Quantized Coefficients" IEEE Transactions on Circuits and Systems, vol. 36, No. 4, Apr. 1989, pp. 618-622.

Primary Examiner—Tan V. Mai
Attorney, Agent, or Firm—Frishauf, Holtz, Goodman, Langer & Chick

[57] ABSTRACT

For input signals f0–f7, by the implementing of signal processing in several stages with bit-serial form, output signals f0–f7 are obtained. For input signals f0–f7, non-two's power approximation proportions of ideal values of fixed coefficient, i.e., $\cos[\pi l(2K+1)/2N]$ are applied. This results in asymmetrical hardware to implement a forward transform mode and an inverse transform mode. Therefore, by adding a circuit element which is employed for a forward transform mode, and by adding a circuit element which is employed for an inverse transform mode, hardware which can deal with both of forward transform and inverse transform is realized.

21 Claims, 66 Drawing Sheets

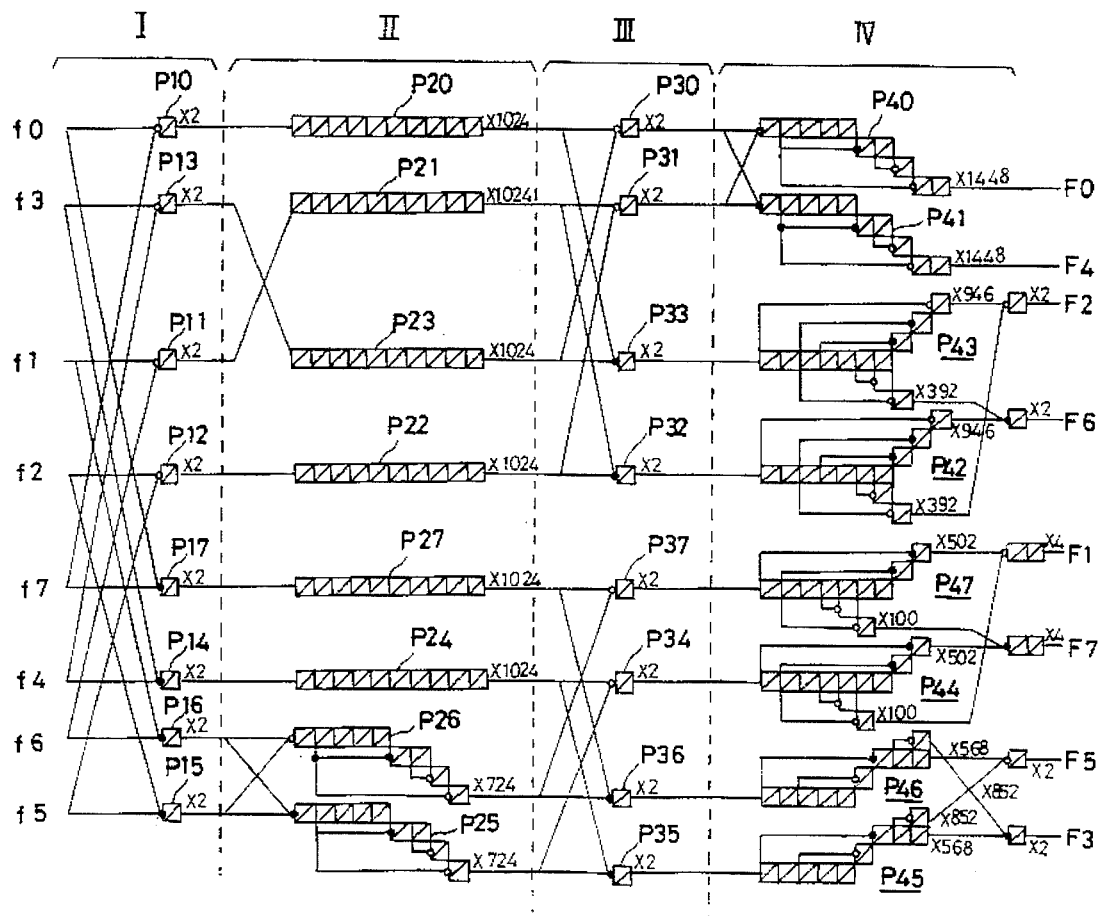
F I G. 1

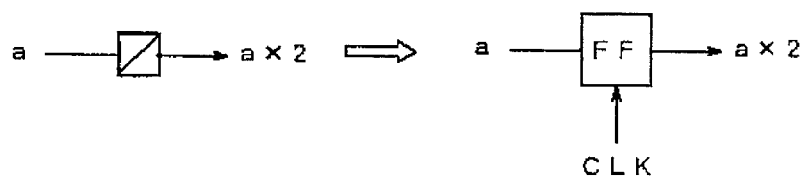
F I G. 3
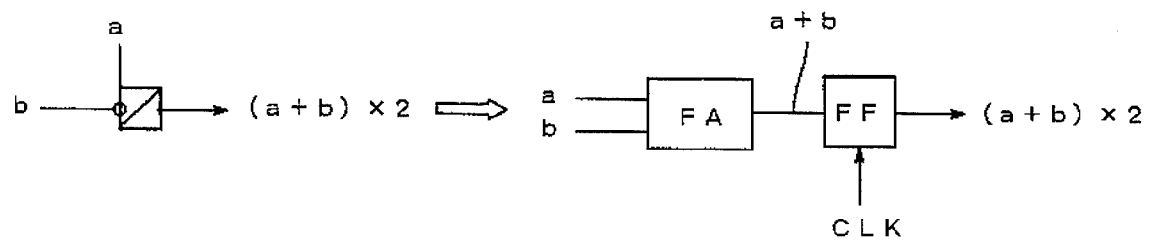
F I G. 4
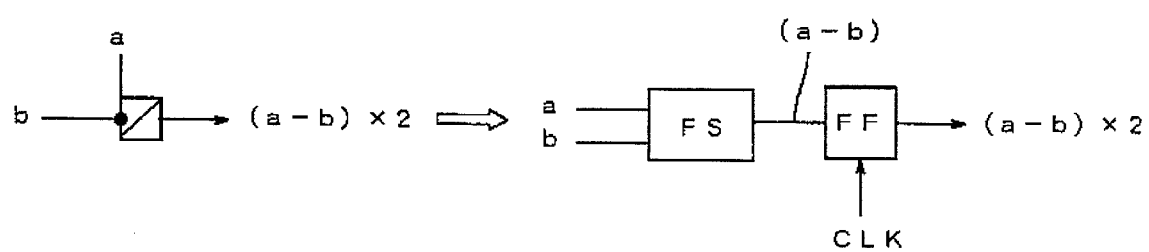
F I G. 5

$\alpha \uparrow$ $\frac{1}{2}$

| | 0 | 1 | 2 | 3 | 4 | 5 | 6 | 7 |
|---|---|---|---|---|---|---|---|---|
| 0 | $\frac{1}{\sqrt{2}}$ | $\cos\frac{1}{16}\pi$ | $\cos\frac{2}{16}\pi$ | $\cos\frac{3}{16}\pi$ | $\cos\frac{4}{16}\pi$ | $\cos\frac{5}{16}\pi$ | $\cos\frac{6}{16}\pi$ | $\cos\frac{7}{16}\pi$ |
| 1 | $\frac{1}{\sqrt{2}}$ | $\cos\frac{3}{16}\pi$ | $\cos\frac{6}{16}\pi$ | $-\cos\frac{7}{16}\pi$ | $-\cos\frac{4}{16}\pi$ | $-\cos\frac{1}{16}\pi$ | $-\cos\frac{2}{16}\pi$ | $-\cos\frac{5}{16}\pi$ |
| 2 | $\frac{1}{\sqrt{2}}$ | $\cos\frac{5}{16}\pi$ | $-\cos\frac{6}{16}\pi$ | $-\cos\frac{1}{16}\pi$ | $-\cos\frac{4}{16}\pi$ | $+\cos\frac{7}{16}\pi$ | $+\cos\frac{2}{16}\pi$ | $+\cos\frac{3}{16}\pi$ |
| 3 | $\frac{1}{\sqrt{2}}$ | $\cos\frac{7}{16}\pi$ | $-\cos\frac{2}{16}\pi$ | $-\cos\frac{5}{16}\pi$ | $+\cos\frac{4}{16}\pi$ | $+\cos\frac{3}{16}\pi$ | $+\cos\frac{6}{16}\pi$ | $-\cos\frac{1}{16}\pi$ |
| 4 | $\frac{1}{\sqrt{2}}$ | $-\cos\frac{7}{16}\pi$ | $-\cos\frac{2}{16}\pi$ | $+\cos\frac{5}{16}\pi$ | $+\cos\frac{4}{16}\pi$ | $-\cos\frac{3}{16}\pi$ | $-\cos\frac{6}{16}\pi$ | $+\cos\frac{1}{16}\pi$ |
| 5 | $\frac{1}{\sqrt{2}}$ | $-\cos\frac{5}{16}\pi$ | $-\cos\frac{6}{16}\pi$ | $+\cos\frac{1}{16}\pi$ | $-\cos\frac{4}{16}\pi$ | $-\cos\frac{7}{16}\pi$ | $+\cos\frac{2}{16}\pi$ | $-\cos\frac{3}{16}\pi$ |
| 6 | $\frac{1}{\sqrt{2}}$ | $-\cos\frac{3}{16}\pi$ | $+\cos\frac{6}{16}\pi$ | $+\cos\frac{7}{16}\pi$ | $-\cos\frac{4}{16}\pi$ | $+\cos\frac{1}{16}\pi$ | $-\cos\frac{2}{16}\pi$ | $+\cos\frac{5}{16}\pi$ |
| 7 | $\frac{1}{\sqrt{2}}$ | $-\cos\frac{1}{16}\pi$ | $+\cos\frac{2}{16}\pi$ | $-\cos\frac{3}{16}\pi$ | $+\cos\frac{4}{16}\pi$ | $-\cos\frac{5}{16}\pi$ | $+\cos\frac{6}{16}\pi$ | $-\cos\frac{7}{16}\pi$ |

$\rightarrow k$

| k \ ℓ | 0 | 1 | 2 | 3 | 4 | 5 | 6 | 7 |
|---|---|---|---|---|---|---|---|---|
| 0 | 5931008 (724) | 8224768 (1004) | 7749632 (946) | 6979584 (852) | 5931008 (724) | 4653056 (568) | 3211264 (392) | 1638400 (200) |
| 1 | 5931008 (724) | 6973568 (851.27) | 3211264 (392) | -1644928 (-200.80) | -5931008 (-724) | -8224640 (-1003.98) | -7749632 (-946) | -4656768 (-568.45) |
| 2 | 5931008 (724) | 4656768 (568.45) | -3211264 (-392) | -8224640 (-1003.98) | -5931008 (-724) | 1644928 (200.80) | 7749632 (946) | 6973568 (851.27) |
| 3 | 5931008 (724) | 1638400 (200) | -7749632 (-946) | -4653056 (-568) | 5931008 (724) | 6979584 (852) | -3211264 (-392) | -8224768 (-1004) |
| 4 | 5931008 (724) | -1638400 (-200) | -7749632 (-946) | 4653056 (568) | 5931008 (724) | -6979584 (-852) | -3211264 (-392) | 8224768 (1004) |
| 5 | 5931008 (724) | -4656768 (-568.45) | -3211264 (-392) | 8224640 (1003.98) | -5931008 (-724) | -1644928 (-200.80) | 7749632 (946) | -6973568 (-851.27) |
| 6 | 5931008 (724) | -6973568 (-851.27) | 3211264 (392) | 1644928 (200.80) | -5931008 (-724) | 8224640 (1003.98) | -7749632 (-946) | 4656768 (568.45) |
| 7 | 5931008 (724) | -8224768 (-1004) | 7749632 (946) | -6979584 (-852) | 5931008 (724) | -4653056 (-568) | 3211264 (392) | -1638400 (-200) |

$(\times 2^{13} = \times 8192)$

| | VALUE | × 2¹⁰ = 1024 | APPROXIMATE VALUE | ERROR% |
|---|---|---|---|---|
| $\cos\frac{1}{16}\pi$ | 0.98079 | 1004.32 | 1004 | 0.031 |
| $\cos\frac{2}{16}\pi$ | 0.92388 | 946.05 | 946 | 0.005 |
| $\cos\frac{3}{16}\pi$ | 0.83147 | 851.42 | 852 | 0.068 |
| $\cos\frac{4}{16}\pi$ | 0.70711 | 724.08 | 724 | 0.011 |
| $\cos\frac{5}{16}\pi$ | 0.55557 | 568.90 | 568 | 0.158 |
| $\cos\frac{6}{16}\pi$ | 0.38268 | 391.87 | 392 | 0.033 |
| $\cos\frac{7}{16}\pi$ | 0.19509 | 199.77 | 200 | 0.115 |

FIG. 10

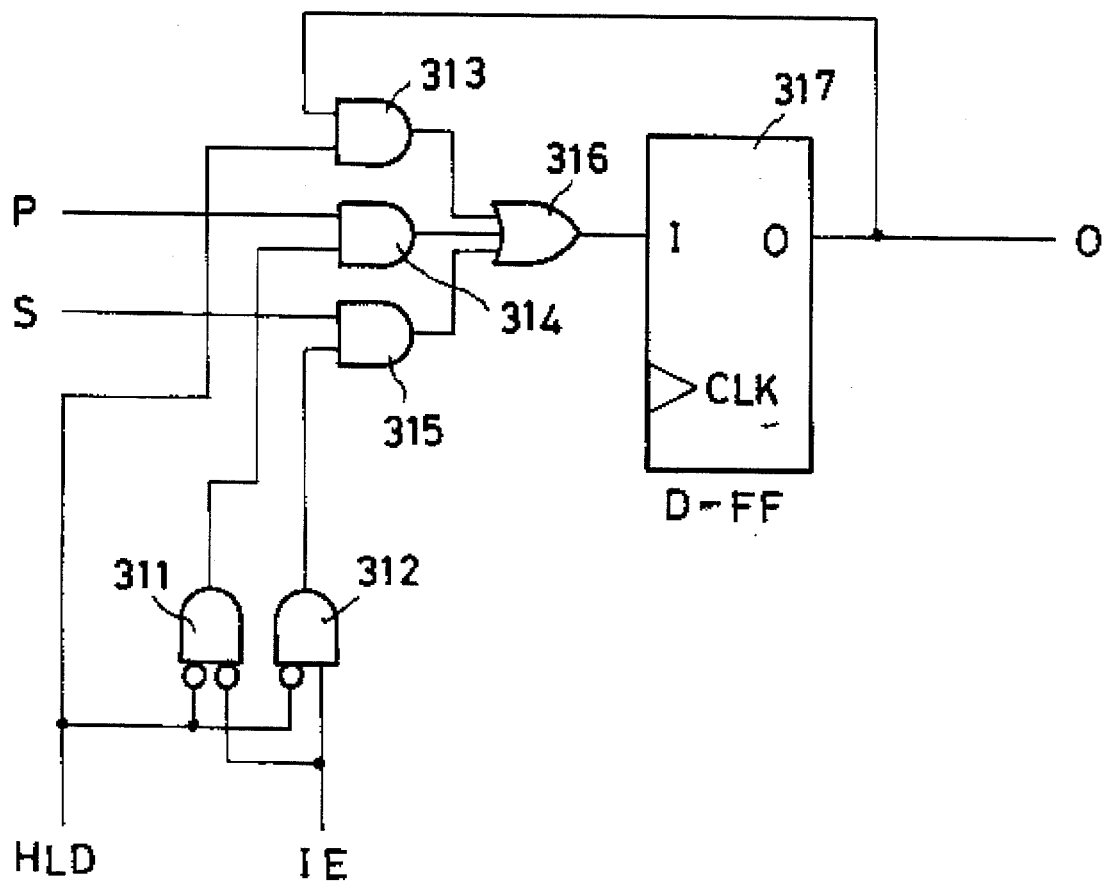
F I G. 1 5

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 21

| | VALUE | ×260.2153 (=2⁸×G) | APPROXIMATE VALUE | ERROR% | ODD (÷3) | EVEN (÷4) |
|---|---|---|---|---|---|---|
| $\cos\frac{1}{16}\pi$ | 0.98079 | 255.22 | 255 | 0.086 | 85 | |
| $\cos\frac{2}{16}\pi$ | 0.92388 | 240.41 | 240 | 0.171 | | 60 |
| $\cos\frac{3}{16}\pi$ | 0.83147 | 216.36 | 216 | 0.167 | 72 | |
| $\cos\frac{4}{16}\pi$ | 0.70711 | 184.00 | 184 | 0 | | 46 |
| $\cos\frac{5}{16}\pi$ | 0.55557 | 144.57 | 144 | 0.396 | 48 | |
| $\cos\frac{6}{16}\pi$ | 0.38268 | 99.58 | 100 | 0.320 | | 25 |
| $\cos\frac{7}{16}\pi$ | 0.19509 | 50.765 | 51 | 0.461 | 17 | |

| k \ ℓ | 0 | 1 | 2 | 3 | 4 | 5 | 6 | 7 |
|---|---|---|---|---|---|---|---|---|
| 0 | 23552 (184) | 32640 (255) | 30720 (240) | 27648 (216) | 23552 (184) | 18432 (144) | 12800 (100) | 6528 (51) |
| 1 | 23552 (184) | 27648 (216) | 12800 (100) | -6528 (-51) | -23552 (-184) | -32640 (-255) | -30720 (-240) | -18432 (-144) |
| 2 | 23552 (184) | 18432 (144) | -12800 (-100) | -32640 (-255) | -23552 (-184) | 6528 (51) | 30720 (240) | 27648 (+216) |
| 3 | 23552 (184) | 6528 (51) | -30720 (-240) | -18432 (-144) | 23552 (184) | 27648 (216) | -12800 (-100) | -32640 (-255) |
| 4 | 23552 (184) | -6528 (-51) | -30720 (-240) | 18432 (144) | 23552 (184) | -27648 (-216) | -12800 (-100) | 32640 (255) |
| 5 | 23552 (184) | -18432 (-144) | -12800 (-100) | 32640 (255) | -23552 (-184) | -6528 (-51) | 30720 (240) | -27648 (-216) |
| 6 | 23552 (184) | -27648 (-216) | 12800 (100) | 6528 (51) | -23552 (-184) | 32640 (255) | -30720 (-240) | 18432 (144) |
| 7 | 23552 (184) | -32640 (-255) | 30720 (240) | -27648 (-216) | 23552 (184) | -18432 (-144) | 12800 (+100) | -6528 (-51) |

(×2⁷)

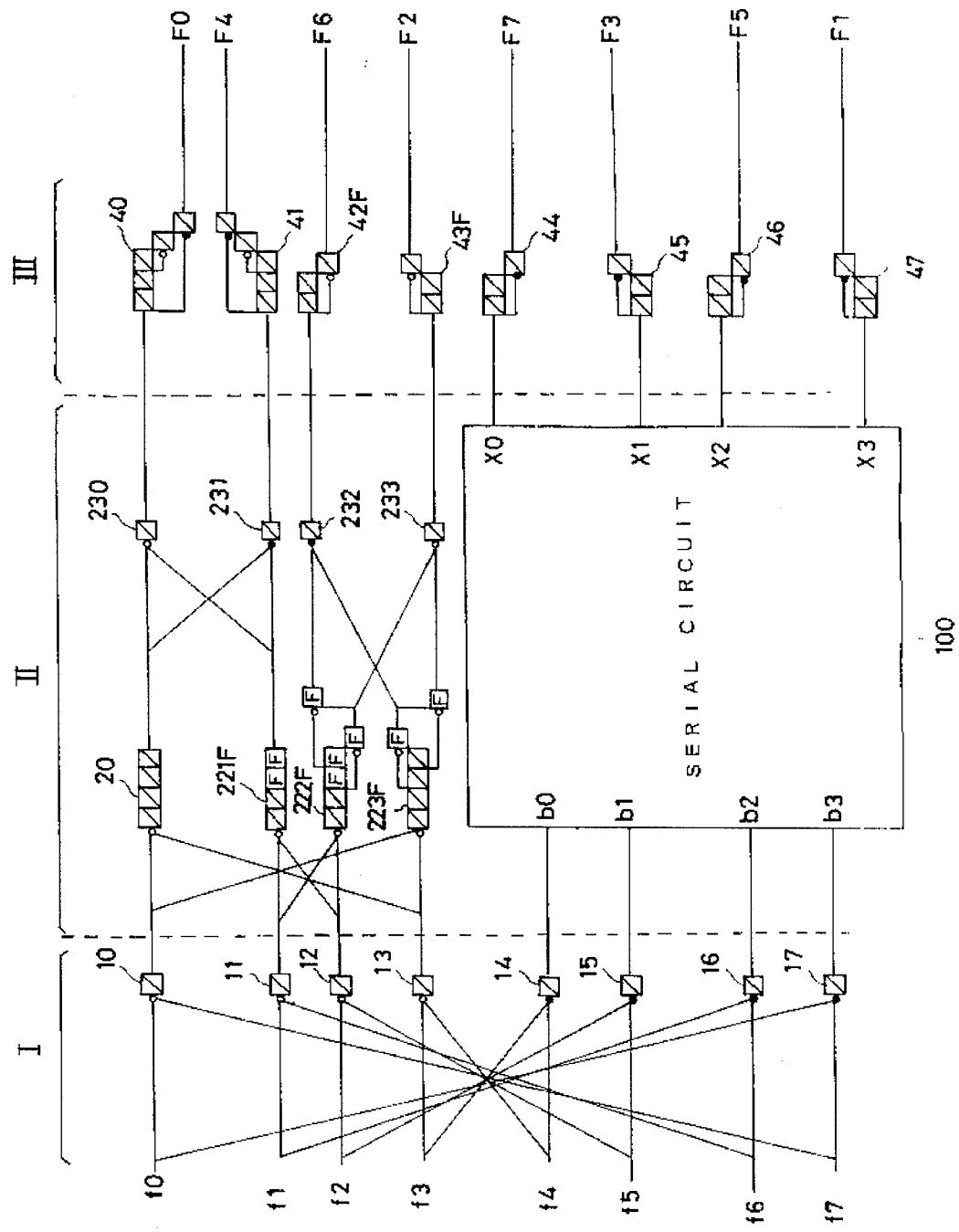
F I G. 39

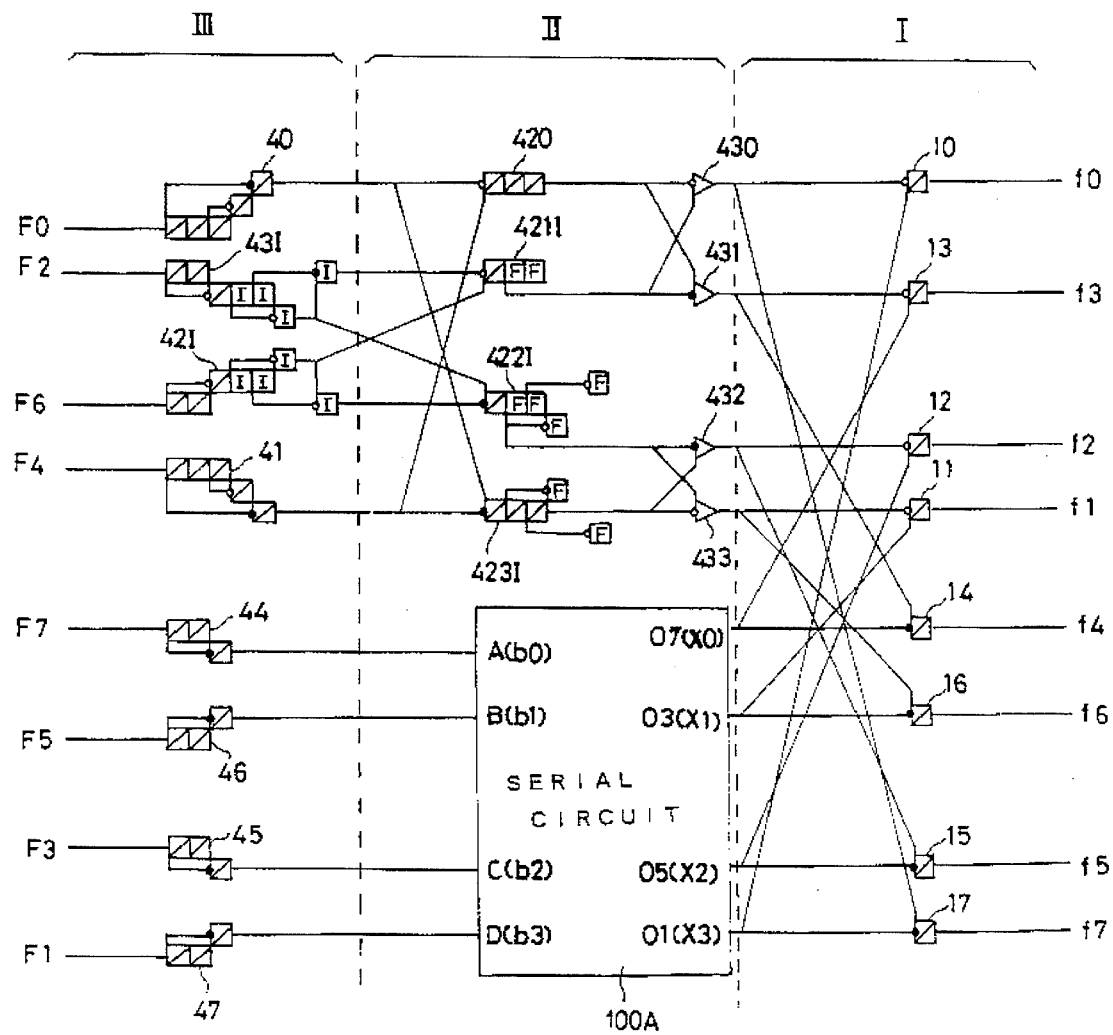
F I G. 46

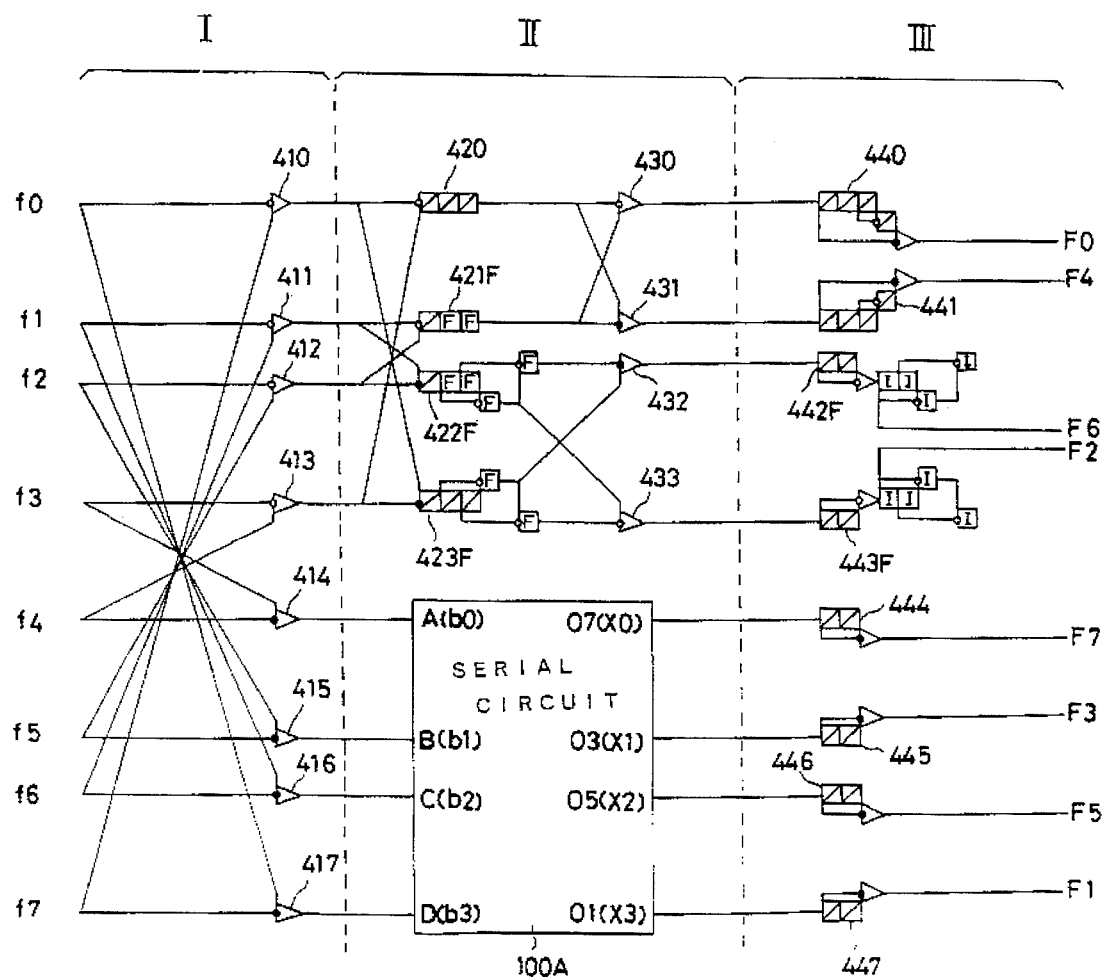
F I G. 51

| ENABLE SIGNAL A | ENABLE SIGNAL B | OPERATION |
|---|---|---|
| 0 | 0 | READING OF THE PARALLEL DATA P TO CELL |
| 1 | 0 | READING OF THE SERIAL DATA TO CELL (READING OF THE SERIAL DATA FROM THE FORMER CELL) |
| 0 | 1 | PRESERVATION OF DATA IN CELL |
| 1 | 1 | PRESERVATION OF PARALLEL OUTPUT DATA IN CELL |

FIG. 58

CIRCUIT SCALE REDUCTION FOR BIT-SERIAL DIGITAL SIGNAL PROCESSING

BACKGROUND OF THE INVENTION

1. Field of the Invention

The present invention is broadly concerned with a digital signal processing unit that runs a bit serial operation, and intended particularly for technology to minimize the circuit scale for the bit serial, digital signal processing. More specifically this invention is applied to a data compressing and expanding device. One of the embodiments of the invention is the compressing and expanding device for image data. Exemplary applications of the invention include a wide variety of image equipment, for example, electronic cameras and visual telephones.

2. Description of the Related Art

Digital signal processing technology has conventionally been adopted in various industrial and other fields.

In the arena of speech and image processing, for instance, digital filters and digital compressing and expanding devices (orthogonal transformation) have been utilized in varied activities.

This sort of digital signal processing is however disadvantageous in that, when effected in parallel operation, it is compelled to increase the largeness of the circuitry concerned; the fact which led to the development of the digital signal processing by way of bit serial computation.

In this type of digital signal processing unit relying on the bit serial computation, the multiplication by addition of power of 2 of a given coefficient is performed through a combination of a shift register (coupled flip-flops) and adder/subtracter. This results naturally in elimination of the multiplier needed in the parallel computation. The numerical accuracy of such a bit serial operation depends largely upon the number of stages in the shift register (flip-flops).

Discrete Cosine Transform (DCT) is one of the branches of the digital signal processing that have lately arrested public attention. This is an orthogonal transform whose defining equations are as indicated in Eq. 1 and Eq. 2, the Eq. 1 being for Forward Discrete Cosine Transform (FDCT) and Eq. 2, Inverse Discrete CosineTtransform (IDCT).

$$F(l) = \sqrt{\frac{2}{N}} \ C(l) \sum_{k=0}^{N-1} f(k) \cos\left[\frac{\pi l(2k+1)}{2N}\right] \quad \text{[Eq. 1]}$$

$$C(l) = \begin{cases} \frac{1}{\sqrt{2}} & (l=0) \\ 1 & (l \neq 0) \end{cases}$$

$$f(k) = \sqrt{\frac{2}{N}} \sum_{l=0}^{N-1} C(l) F(l) \cos\left[\frac{\pi l(2k+1)}{2N}\right] \quad \text{[Eq. 2]}$$

Several fast computation algorithms for the DCT have been studied, and one of them is described in IEEE Transaction on Communications, Vol. COM-25, No. 11, November, 1977, (Adaptive Coding of Monochrome and Color Image, Wen-Hsiung Chen and C. Harrison Smith.) Japanese Unexamined Patent Hei 3-145274 proposes a bit serial operation comfortable to the DCT flow which is described in the document mentioned above.

Although the adoption of the bit serial computation in the digital signal processing may reduce markedly the circuitry size involved as has thus far been explained, relatively longer time required for the serial computation had elicited the necessity of further improvements.

Moreover the direct application of high-speed algorithm into some hardware still manifested, to a pronounced degree, the largeness of the circuitry concerned as has been described in the foregoing official gazette, which also meant the requirement of yet further enhancements.

In addition the signal processing unit running the bit serial computation necessitates in its prior stage, a parallel to serial converter. A serial to parallel converter should therefore be provided in the posterior stage of the signal processing unit in order to transform the data resulting from the above bit serial operation into so many parallel information. Such auxiliary circuit making the total system even still larger, there arose a requisite for yet other ameliorations.

SUMMARY OF THE INVENTION

The present invention has been made to solve these problems and has an object to provide such a technology for reducing the size of circuitry as enables a relatively high-speed digital signal processing with smaller circuits.

Another object of the invention is to furnish a data compressing and expanding device that applies this circuitry diminishing technology, more specifically an orthogonal transform unit, namely a discrete cosine transformer more concretely.

Further object of the invention is to supply the electronic equipment provided with such data compressing and expanding device, particularly the image equipment, and this in the form of electronic cameras and visual telephones.

According to one aspect of this invention, an apparatus for transforming digitized data is provided. which comprises: supplying means for supplying said digitized data; arithmetic means for executing operations on said supplied data for said transforming; said arithmetic means comprising bit-serial means for performing bit-serial arithmetic operations; said bit-serial moans comprising distributed strings of flip flop, adder and/or subtracter for said bit-serial arithmetic operations; said strings having a function of performing multiplications without any actual bit-parallel multiplier; and said multiplications using non-two's power approximation proportions of ideal values of fixed coefficients for application to a digital signal to be processed, whereby said bit-serial arithmetic means are realized on a reduced circuit scale.

Because of this configuration, in the bit serial computation, the circuit scale for data transform is reduced, and it results in the shortening of computation processing time. This configuration is based on the principle I as described later.

According to this apparatus, the digital data like image data can be compressed or expended by implementing forward transform and inverse transform.

The typical transform is orthogonal transform, as an example, discrete cosine transform is given.

Described in more details, for discrete cosine transform, the coefficient of $\cos[\pi l(2K+1)/2N]$ (it is irrational number originally) is multiplied with the digitized data $f(K)$ by bit serial means. In the meantime, in the computation processing, the above mentioned coefficient is not obtained by power of 2 but the approximate value of integer value as small as possible.

And in this configuration, because the asymmetrical hardware exists in both of forward transform mode and inverse transform mode by arithmetic means, in the case where the apparatus is implemented selectively for forward transform mode and inverse transform mode, first certain circuit elements being dedicated to the forward transform mode and second certain circuit elements being dedicated to the inverse transform mode are included.

In an apparatus of this invention, to transform data by serial compution, the parallel-to-serial converter means which transforms the digitized data in a parallel manner to bit-serial stream is necessary, and the serial-to-parallel converter means which transforms the transformed in a serial manner to bit-parallel form is necessary as well.

To reduce the circuit scale, according to one configuration example in this invention, including sharing means for sharing said parallel-to-serial converter means with said serial-to-parallel converter means, the apparatus can be realized. By this kind of configuration, both converter means can be realized by the common hardware. This is based on principle V as described later.

According to other aspect of this invention, an apparatus for processing a digital signal is provided, which comprises: supplying means for supplying said digital signal; bit-serial arithmetic means for performing bit-serial arithmetic operations on said supplied signal for said processing; said bit-serial arithmetic means comprising distributed strings of flip flop, adder and/or subtracter for said bit-serial arithmetic operations; said strings having function of performing multiplications without any actual bit-parallel multiplier; and said multiplications using non-two's power approximation proportions of ideal values of fixed coefficients for application to a digital signal to be processed, whereby said bit-serial arithmetic means are realized on a reduced circuit scale.

And based on other aspect, an apparatus for transforming digitized data is provided, which comprises: first storage means for storing and supplying said digitized data; bit-serial arithmetic means for performing bit-serial arithmetic operations on a bit-serial stream of said digitized data from said first storage means to thereby provide a bit-serial stream of processed data; second storage means for receiving and storing said processed data; said first and second storage means being bit-parallel accessible; first converter means for receiving from said first storage means digitized data in a bit-parallel manner and for converting into a bit-serial stream for application to said bit-serial arithmetic means; second converter means for receiving from said bit-serial arithmetic means a bit-serial stream of said processed data and for converting into a bit-parallel form for loading into said second storage means; and sharing means for sharing said first converter means with said second converter means such that both of said first and second converter means are realized on a common hardware of a reduced size.

Furthermore, by forward transforming, the apparatus in which the data compression of digitized data is implemented can be realized.

Inversely, by inverse transforming, the apparatus in which the data compression of digitized data is implemented can be realized.

In other wards, in one device, the forward transform is implemented, and in another device, the inverse transform is implemented, different devices are constructed by different hardwares.

Inversely, in one hardware, the configuration is realized by moding switching the above-mentioned two transforms. This is realized by, for example, an apparatus having first and second operation modes, in which, in the first operation mode, digitized data are forward-transformed into these in a transformed domain for data compression, whereas in the second operation mode, digitized data in said transformed domain are inverse transformed for data expansion, comprising: supplying means for supplying digitized data; bit-serial arithmetic means for performing bit-serial arithmetic operations on said supplied data; said bit-serial arithmetic means comprising distributed strings of circuit elements without any bit-parallel multiplier; said strings having a function of performing multiplications which use non-two's power approximation proportions of ideal-valued fixed coefficients for application to data to be processed, said proportions serving to reduce a circuit scale of said bit-serial arithmetic means; and mode control means for controlling interconnection of said strings of said bit-serial arithmetic means for either of said data compression in said first operation mode and said data expansion in said second operation mode, whereby the apparatus functions as a forward-transformer in said first operation mode and as an inverse-transformer in said second operation mode.

According to another further aspect of this invention, this is also can be realized by an apparatus for processing digitized signal, which comprises: supplying means for supplying said digitized signal; scale-reduced arithmetic means of bit-serial type for performing bit-serial arithmetic operations on said supplied signal to thereby provide a processed signal; said scale-reduced arithmetic means having a size smaller than that of a prototype arrangement of bit-serial arithmetic type whose overall function is essentially identical with that of said scale-reduced arithmetic means; said prototype arrangement having a reducible portion; said reducible portion, including distributed strings of circuit elements, each string formed by a combination or subcombination of flip-flops, adders and subtracters; said scale-reduced arithmetic means being realized by applying a scale-reducing design to said prototype arrangement.

In this case, the prototype arrangement of bit-serial arithmetic type is, as an example, the signal processing device which is constructed directly by following the basic algorithm, or its signal flow construction. Therefore, for prototype arrangement, by applying a number of scale-reducing design, the device circuit scale can be reduced.

According to one configuration example, said scale-reducing design comprises: means for heuristically finding said reducible portion of said prototype arrangement, and means for reducing said reducible portion so as to realize said scale-reduced arithmetic means.

According to one configuration example, it can be realized by an apparatus for processing a digitized signal, which comprises: supplying means for supplying said digitized signal; scale-reduced arithmetic means of bit-serial type for performing bit-serial arithmetic operations on said supplied signal to thereby provide a processed signal; said scale-reduced arithmetic means having a size smaller than that of a prototype arrangement of bit-serial arithmetic type whose overall function is essentially identical with that of said scale-reduced arithmetic means; said prototype arrangement comprising a plurality of hardware stages; said plurality of hardware stages operatively interconnected in a cascade so as to bit-serially process said digitized signal; each hardware stage comprising strings of circuit elements in which a certain string includes a clocked adder or subtracter with a synchronous sample-and-hold element which is driven by clock pulses; and said scale-reduced arithmetic means being derivable from said prototype arrangement by substituting an unclocked adder or substracter without any synchronous sample-and-hold element for said clocked adder or substracter.

This is based on principle III as described later.

And according to another configuration example, it can be realized by an apparatus for performing digital signal processing, which comprises: scale-reduced arithmetic means for processing digital signals by executing bit-serial arithmetic operations; control means including means for supplying clock pulses for the operation of said scale-reduced arithmetic means; said scale-reduced arithmetic means being derivable from a prototype arrangement of bit-serial and distributed arithmetic type; said scale-reduced arithmetic means having a circuit scale smaller than that of said prototype arrangement; said prototype arrangement comprising first and second hardware stages, each including strings of circuit elements; said first hardware stage operatively connected in a cascade to said second hardware stage under the control of said control means; said first hardware stage including a plurality of input ports for receiving input digital signals to said prototype arrangement; said second hardware stage including a plurality of output ports for supplying output digital signals from said prototype arrangement; the function of said prototype arrangement being expressed by the first relationship formed between said input and output digital signals; said first relationship including a reducible two's power multiplier factor; the function of said scale-reduced arithmetic means being expressed by the second relationship formed between its input and output digital signals; and said second relationship including a multiplier factor reduced from said two's power multiplier factor of said prototype arrangement, whereby said scale-reduced arithmetic means has a smaller number of circuit elements than that required for said prototype arrangement.

This is based on principle 1 as described later. Described in more details, said first relationship is given by;

$$[I_B] \times 2^N \times [T] = [O_B]$$

in which $[I_B]$=input vector representing said input signals to said prototype arrangement, $2^N$=said reducible two's power multiplier factor, with N=positive integer, $[T]$=remaining transform matrix, and $[O_B]$=output vector representing said output signals from said prototype arrangement wherein said second relationship is given by;

$$[I] \times 2^M \times [T] = [O]$$

in which $[I]$=input vector to said scale-reduced arithmetic means, corresponding to $[I_B]$ $2^M$=said two's power multiplier factor in which M is an integer and $0 \leq M < N$, and $[O]$=output vector from said scale-reduced arithmetic means.

According to one configuration example, $[T]$ can be orthogonal matrix, in detail, can be the orthogonal matrix containing discrete cosine coefficients approximate by finite bit-length.

Furthermore, $2^M \times [T]$, i.e., transfer function contains integer-approximated coefficients, each given by an integer $K_l$ for l-th coefficient.

Where, integer $K_l$ can be decomposed into a linear combination of two's power integer as $K_l = \Sigma_i C_i \times 2^{ni}$, in which ni=integer, and Ci=non-two's power integer wherein:

said scale-reduced arithmetic means comprises a first portion corresponding to said non-two's power integer Ci and a second portion corresponding to $2^{ni}$ and receiving output signals from said first portion.

This is based on principle II as described later.

According to another aspect of this invention, an apparatus for performing digital signal, which comprises: arithmetic means of bit-serial and distributed type for operatively executing bit-serial arithmetic operations on digital signals to thereby provide processed signals; control means including clock means for supplying periodical clock pulses to said arithmetic means for its operation; said arithmetic means being derived from a prototype arrangement of bit-serial and distributed arithmetic type whose function is essentially identical with that of said arithmetic means; said prototype arrangement comprising a plurality of hardware stages operatively connected in a cascade with one after another; each hardware stage including strings of circuits elements in which first certain elements are driven by said clock pulses whereas second certain elements are of unclocked type, not driven by any clock pulses; said prototype arrangement including a critical path which is defined by a digital signal path subject to a relatively large clock skew, thus limiting operational speed; and said arithmetic means including skew reducing means for reducing clock skew of said critical path.

This is based on principle IV as described later. Concretely the shown reducing means compreses a clock-driven Flip-Flop connected in said critical path at a point directly after a circuit element of unchecked type.

As an application example, based on this invention, the data transforming apparatus which possesses bit-serial arithmetic means can be applied for image machines, e.g. the image data can be compressed, and then transmitted or recorded. In the case of restoration, the data is expanded and becomes original one. As for concrete examples, it can be realized in electronic camera and visual telephone.

BRIEF DESCRIPTION OF THE DRAWINGS

Other objects and structures of the present invention will be more fully understood by those skilled in the art from the following description of the preferred embodiments and the accompanying drawings.

FIG. 1 illustrates a circuit configuration in which the FDCT (forward discrete cosine transform), a prerequisition of this invention, is performed.

FIG. 3 shows the circuit symbols of those elements shown in other accompanying drawings which execute the one-bit shift.

FIG. 4 is a diagram showing the circuit symbols of the elements performing the one-bit shift after 2 input addition as used in the drawings accompanying this description.

FIG. 5 diagrammatically depicts the similar circuit symbols of those elements which carry out one-bit shift after 2 input subtraction as explained in other drawings according to this invention.

FIG. 7 is a diagram representing the transformation matrix of the DCT.

FIG. 9 is a diagram showing the transformation matrix of the DCT conformable to FIGS. 1 and 2.

FIG. 10 gives the values of cos (i/16)π, i=0 to 7 as expressed in FIGS. 1 and 2.

FIG. 15 illustrates the concrete construction of the cells shown in FIG. 14.

FIG. 21 shows the quantization table as used in the quantization device shown in FIG. 12B.

FIG. 24 gives the values of cos (i/16)π, i=0 to 7 as expressed in the data transform computing device according to this invention.

FIG. 25 represents the transformation matrix of the DCT in accordance with FIGS. 22 and 23.

FIG. 39 shows the circuitry of the second version (Ver. 2) FDCT of the data transform computing device conformable to this invention.

FIG. 46 shows up the circuitry of the IDCT as its third version for the same data transform computing device.

FIG. 51 illustrates the circuitry of the FDCT as the 3.1 version (Ver. 3.1) for the data transform computing device in line with the spirit of this invention.

FIG. 58 explains the operating state of the enable signals A and B to one cell shown in FIG. 57.

DETAILED DESCRIPTION OF THE PREFERRING EMBODIMENTS

Based on the figures, this invention is described as follows.

BASIC DESCRIPTION

Description of the Data Transform Computing Device

First of all, as the premise of this invention, the data transform computing device, which can implement the data transform by the serial computation, is described. This computing device is based on the Discrete Cosine Transform device described in the Japanese Unexamined Patent Hei 3-145274, as mentioned before.

Figure 2:
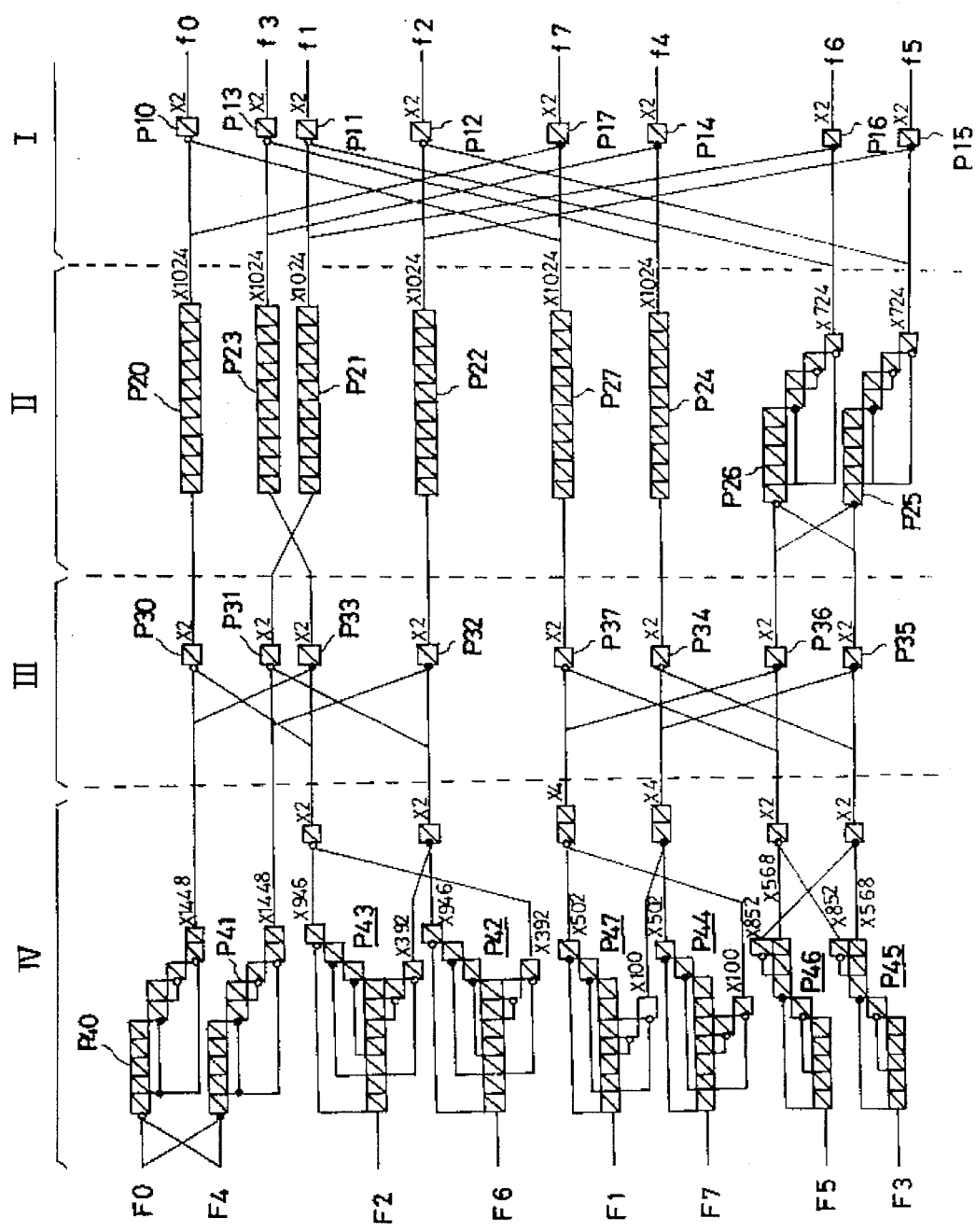
FIG. 2 is a diagrammatically shown circuitry in which the IDCT (inverse discrete cosine transform), also a precondition of the invention is to be accomplished.

FIG. 1 is the circuit for the implementation of Forward Discrete Cosine Transform (FDCT) by serial computation, and FIG. 2 illustrates the circuit for implementation of Inverse Discrete Cosine Transform (IDCT) by serial computation. The transform equations of FDCT and IDCT in FIG. 1 and 2 are based on Eq. 1 and 2 of FDCT and IDCT as defined before, but for the realization of the fast computation, it is computed by the following fast algorithm.

This is, in the case of N=8, the DCT matrix [Ck1] which is the transform matrix of FDCT from f0–f7 to F0–F7, is defined as FIG. 7 and become the following Eqs. 3–10 by writing in the order of F0, F4, F2, F6, F1, F7, F5, and F3.

$$F0 = [\{(f0+f7) + (f3+f4)\} + \{(f1+f6) + (f2+f5)\}] \times \tfrac{1}{2} \cos \tfrac{4}{16}\pi \quad [\text{Eq. 3}]$$

$$F4 = [\{(f0+f7) + (f3+f4)\} - \{(f1+f6) + (f2+f5)\}] \times \tfrac{1}{2} \cos \tfrac{6}{16}\pi \quad [\text{Eq. 4}]$$

$$F2 = \left[ \{(f0+f7) - (f3+f4)\} \times \tfrac{1}{2} \cos \tfrac{2}{16}\pi \right] + \left[ \{(f1+f6) - (f2+f5)\} \times \tfrac{1}{2} \cos \tfrac{6}{16}\pi \right] \quad [\text{Eq. 5}]$$

$$F6 = \left[ \{(f0+f7) - (f3+f4)\} \times \tfrac{1}{2} \cos \tfrac{6}{16}\pi \right] - \left[ \{(f1+f6) - (f2+f5)\} \times \tfrac{1}{2} \cos \tfrac{2}{16}\pi \right] \quad [\text{Eq. 6}]$$

$$F1 = \left[ \left[ (f0-f7) + \left\{ (f1-f6) \times \cos \tfrac{4}{16}\pi + (f2-f5) \times \cos \tfrac{4}{16}\pi \right\} \right] \times \tfrac{1}{2} \cos \tfrac{1}{16}\pi \right] + \left[ \left[ (f3-f4) + \left\{ (f1-f6) \times \cos \tfrac{4}{16}\pi - (f2-f5) \times \cos \tfrac{4}{16}\pi \right\} \right] \times \tfrac{1}{2} \cos \tfrac{7}{16}\pi \right] \quad [\text{Eq. 7}]$$

$$F7 = \left[ \left[ (f0-f7) - \left\{ (f1-f6) \times \cos \tfrac{4}{16}\pi + (f2-f5) \times \cos \tfrac{4}{16}\pi \right\} \right] \times \tfrac{1}{2} \cos \tfrac{1}{16}\pi \right] - \left[ \left[ (f3-f4) + \left\{ (f1-f6) \times \cos \tfrac{4}{16}\pi - (f2-f5) \times \cos \tfrac{4}{16}\pi \right\} \right] \times \tfrac{1}{2} \cos \tfrac{7}{16}\pi \right] \quad [\text{Eq. 8}]$$

$$F5 = \left[ \left[ (f0-f7) - \left\{ (f1-f6) \times \cos \tfrac{4}{16}\pi + (f2-f5) \times \cos \tfrac{4}{16}\pi \right\} \right] \times \tfrac{1}{2} \cos \tfrac{5}{16}\pi \right] + \quad [\text{Eq. 9}]$$

-continued $$\left[\;\left[\;\underbrace{(f3-f4)}_{\text{I}\;\text{III}} - \left\{\;\underbrace{(f1-f6)}_{\text{I}} \times \underbrace{\cos\frac{4}{16}\pi}_{\text{II}}\;-\underbrace{}_{\text{II}}\right.\right.\right.$$

$$\left.\left.\underbrace{(f2-f5)\;\times\cos\frac{4}{16}\pi}_{\text{I}\quad\text{II}}\;\right\}\;\right]\;\times\underbrace{\frac{1}{2}\cos\frac{3}{16}\pi}_{\text{IV}}\;\right]$$

$$F3 = \left[\;\left[\;\underbrace{(f0-f7)}_{\text{I}\;\text{III}} - \left\{\;\underbrace{(f1-f6)}_{\text{I}} \times \underbrace{\cos\frac{4}{16}\pi}_{\text{II}}\;+\underbrace{}_{\text{II}}\right.\right.\right. \quad\text{[Eq. 10]}$$

$$\left.\left.\underbrace{(f2-f5)\;\times\cos\frac{4}{16}\pi}_{\text{I}\quad\text{II}}\;\right\}\;\right]\;\times\underbrace{\frac{1}{2}\cos\frac{3}{16}\pi}_{\text{IV}}\;\right] - \underbrace{}_{\text{IV}}$$

$$\left[\;\left[\;\underbrace{(f3-f4)}_{\text{I}\;\text{III}} - \left\{\;\underbrace{(f1-f6)}_{\text{I}} \times \underbrace{\cos\frac{4}{16}\pi}_{\text{II}}\;-\underbrace{}_{\text{II}}\right.\right.\right.$$

$$\left.\left.\underbrace{(f2-f5)\;\times\cos\frac{4}{16}\pi}_{\text{I}\quad\text{II}}\;\right\}\;\right]\;\times\underbrace{\frac{1}{2}\cos\frac{5}{16}\pi}_{\text{IV}}\;\right]$$

where the numbers I, II, III and IV under each equations are related to the stages shown in FIG. 1 (this will be described later.)

Expressing by matrix, all relations of DCT become the matrix as described in FIG. 7 later. If this matrix is divided into stages I, II, III and IV, Eq. 11 can be obtained. Here the coefficient ½ engaged in each term of the matrix in FIG. 7 is ignored.

$$[f0, f3, f1, f2, f7, f4, f6, f5] \cdot \quad\text{[Eq. 11]}$$

$$[I^*]\;[II^*]\;[III^*]\;[IV^*] = [F0, F4, F2, F6, F1, F7, F5, F3]$$

where $[I^*]$, $[II^*]$, $[III^*]$ and $[IV^*]$ are the matrices defined as follows, respectively, and equal to the circuit configurations (signal flow) for each stage shown in FIG. 1. It is also necessary to point out that, since the matrix in FIG. 7 is expressed by output order of F0–F7 and the input order of f0–f7, it is different from the input and output order of Eq. 11, respectively. As to be clear later, the matrix in FIG. 7 is an orthogonal matrix, in the case of IDCT by which f0–f7 are obtained from F0–F7, the inverse matrix of FIG. 7 is its transform matrix.

Figure 6:
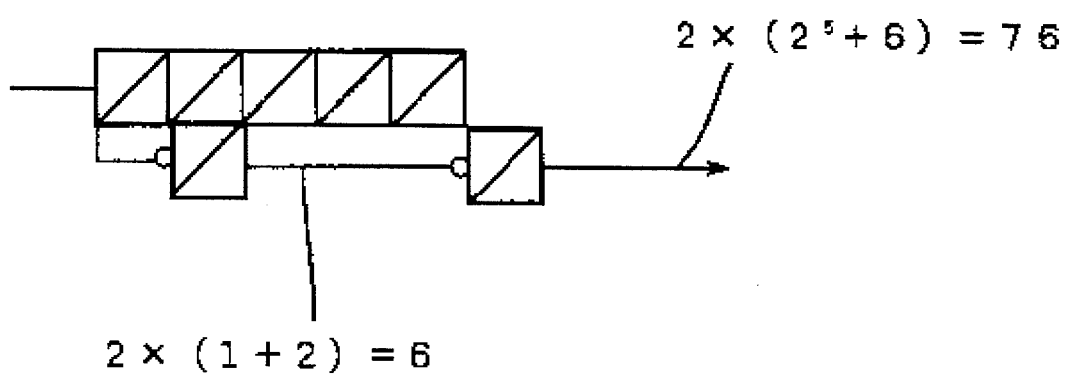
FIG. 6 shows the circuit symbols of the elements performing a computation by way of the combinations of plural symbols.

Including FIG. 1, the explanations of several symbols used in the figures are shown in FIGS. 3–5. The circuit symbol in FIG. 3 is the element which performs double computation by 1 bit shift configuration of a input. The configuration with details is carried out by Flip-Flop FF. The symbol in FIG. 4 is the element which performs the addition of a and b input and double computation of that value. The configuration with details is the combination of 1 bit serial Full-Adder FA and Flip-Flop FF. The symbol in FIG. 5 is the element which performs the subtraction of b input given in horizontal direction from a input in another direction and double computation of that value, i.e., the output becomes (a–b)×2. The configuration with details is the combination of 1 bit serial Full-Subtractor FS and Flip-Flop FF. According to these configurations, as an example like FIG. 6, by the combination of these circuit symbols, the new element can realize the function of increasing input data by 76 times.

Back to the FDCT configuration in FIG. 1, first of all, the computation of stage 1 is equal to the computation of matrix $[I^*]$, i.e., the relations of Eqs. 12 and 13 are obtained as follows:

$$[f0, f3, f1, f2, f7, f4, f6, f5]\;[I^*] = \quad\text{[Eq. 12]}$$

$$[a0, a3, a1, a2, b3, b0, b2, b1]$$

$$[I^*] = \begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{bmatrix} \quad\text{[Eq. 13]}$$

where the outputs of the elements P10, P13, P11, P12, P17, P14, P16, P15 of stage I in FIG. 1 become a0, a3, a1, a2, b3, b0, b2, b1.

For the next stage II, the computation equivalent to the computation of matrix $[II^*]$ is performed, i.e., the relations of Eqs. 14 and 15 are obtained as follows.

$$[a0, a1, a3, a2, b3, b0, b2, b1]\;[II^*] = \quad\text{[Eq. 14]}$$

$$[y0, y1, y2, y3, y4, y5, y6, y7]$$

$$[II^*] = \begin{bmatrix} 1 & 0 & 0 & 0 & 0 & 0 & 0 & 0 \\ & 1 & & & & & & \\ & & 1 & & & & & \\ & & & 1 & & & & \\ & & & & 1 & & & \\ & & & & & 1 & & \\ & & & & & & \alpha & \alpha \\ & & & & & & \alpha & -\alpha \end{bmatrix} \quad\text{[Eq. 15]}$$

$$\alpha = \cos\frac{4}{16}\pi$$

where the outputs of the elements P20, P21, P23, P22, P27, P24, P26, P25 of stage II in FIG. 1 become y1, y2, y3, y4, y5, y6, y7. It will be shown later that the computation of elements P26, P25. i.e., the multiplication by 724, becomes the multiplication of $\alpha = \cos(4/16)\pi$. Furthermore, to realize the multiplication of 1.0 by increasing the input by $1024 = 2^{10}$ times with the configuration of FIG. 1, the elements P20, P21, P23, P22, P27, P24 are increased by 1024 times as well.

In the next stage III, the computation equivalent to the computation of matrix $[III^*]$ is performed, i.e., the relations of Eqs. 16 and 17 become as follows.

$$[y0, y1, y2, y3, y4, y5, y6, y7]\;[III^*] = \quad\text{[Eq. 16]}$$

$$[z0, z1, z2, z3, z4, z5, z6, z7]$$

$$[III^*] = \begin{bmatrix} 1 & 0 & 1 & 0 & 0 & 0 & 0 & 0 \\ 0 & 1 & 0 & 1 & 0 & 0 & 0 & 0 \\ 1 & 0 & -1 & 0 & 0 & 0 & 0 & 0 \\ 0 & 1 & 0 & -1 & 0 & 0 & 0 & 0 \\ 0 & 0 & 0 & 0 & 1 & 0 & 1 & 0 \\ 0 & 0 & 0 & 0 & 0 & 1 & 0 & 1 \\ 0 & 0 & 0 & 0 & 1 & 0 & -1 & 0 \\ 0 & 0 & 0 & 0 & 0 & 1 & 0 & -1 \end{bmatrix} \quad\text{[Eq. 17]}$$

where the outputs of the elements P30, P31, P33, P32, P37, P34, P36, P35 of stage III in FIG. 1 become z0, z1, z2, z3, z4, z5, z6, z7, z8.

In the last stage IV, the computation equivalent to the computation of matrix $[IV^*]$ is performed, i.e., the relations of Eqs. 18 and 19 become as follows.

$$[z0, z1, z2, z3, z4, z5, z6, z7] \; [IV^*] = \qquad \text{[Eq. 18]}$$

$$[F0, F4, F2, F6, F1, F7, F5, F3]$$

$$[IV^*] = \begin{bmatrix} \alpha & \alpha & & & & & & \\ \alpha & -\alpha & & & & & & \\ & & \beta & \gamma & & & & \\ & & \gamma & -\beta & & & & \\ & & & & \delta & \epsilon & & \\ & & & & \epsilon & -\delta & & \\ & & & & & & \zeta & \eta \\ & & & & & & \eta & -\zeta \end{bmatrix} \quad \text{[Eq. 19]}$$

$$\alpha = \cos\frac{4}{16}\pi, \beta = \cos\frac{2}{16}\pi, \gamma = \cos\frac{6}{16}\pi,$$

$$\delta = \cos\frac{1}{16}\pi, \epsilon = \cos\frac{7}{16}\pi, \zeta = \cos\frac{5}{16}\pi,$$

$$\eta = \cos\frac{3}{16}\pi$$

where the outputs of the elements P40, P41, P43, P42, P47, P44, P46, P45 of stage IV in FIG. 1 become the final output F0, F4, F2, F6, F1, F7, F5, F3. The equivalence of the computation of the matrix elements shown in Eq. 19 and the computation of each element obtained above will be described later.

Therefore, by performing the matrix computation defined in Eq. 11, the output data Fj can be obtained from input data fi. Actually the matrix [I*], [II*], [III*] and [IV*] are the extended orthogonal matrix. (The orthogonal matrix is defined as the matrix, the multiplication of whose transpose matrix and itself is an unit matrix. But here the extended orthogonal matrix is defined as the matrix, the multiplication of whose transpose matrix and itself becomes the integral times of an unit matrix.) Their inverse matrix equals to their transpose matrix. (The value of the integral times is ignored.)

Furthermore, the transpose matrix of matrix [I*], [II*], [III*] and [IV*] are the symmetrical matrix which are equal to the original matrix. Finally each inverse matrix [I*]$^{-1}$, [II*]$^{-1}$, [III*]$^{-1}$ and [IV*]$^{-1}$ is obtained as in Eq. 20.

$$[IV^*]^{-1}=[IV^*], [III^*]^{-1}=[III^*] \qquad \text{[Eq. 20]}$$

$$[II^*]^{-1}=[II^*], [I^*]^{-1}=[I^*]$$

where the values of the integer times are omitted for the convenience of explanation.

Therefore, the inverse transform IDCT of FDCT in FIG. 1 is obtained from Eq. 11 as the following Eq. 21.

$$[f0, f3, f1, f2, f7, f4, f6, \qquad \text{[Eq. 21]}$$

$$f5] \; [I^*] \; [II^*] \; [III^*] \; [IV^*] \; [IV^*]^{-1} \; [III^*]^{-1} \; [II^*]^{-1} \; [I^*]^{-1} =$$

$$[F0, F4, F2, F6, F1, F7, F5, F3] \; [IV^*]^{-1} \; [III^*]^{-1} \; [II^*]^{-1} \; [I^*]^{-1}$$

And finally the relation of Eq. 22 is given as $$[f0, f3, f1, f2, f7, f4, f6, f5] = \qquad \text{[Eq. 22]}$$

$$[F0, F4, F2, F6, F1, F7, F5, F3] \; [IV^*] \; [III^*] \; [II^*] \; [I^*]$$

The circuit configuration (signal flow) for the realization of inverse transform IDCT can be obtained by connecting each stage of I, II, III and IV as shown in FIG. 1 inversely and computing in the order of stages IV, III, II and I. The result is shown in FIG. 2. The same element in FIG. 2 as in FIG. 1 is defined by the same number.

Figure 8:
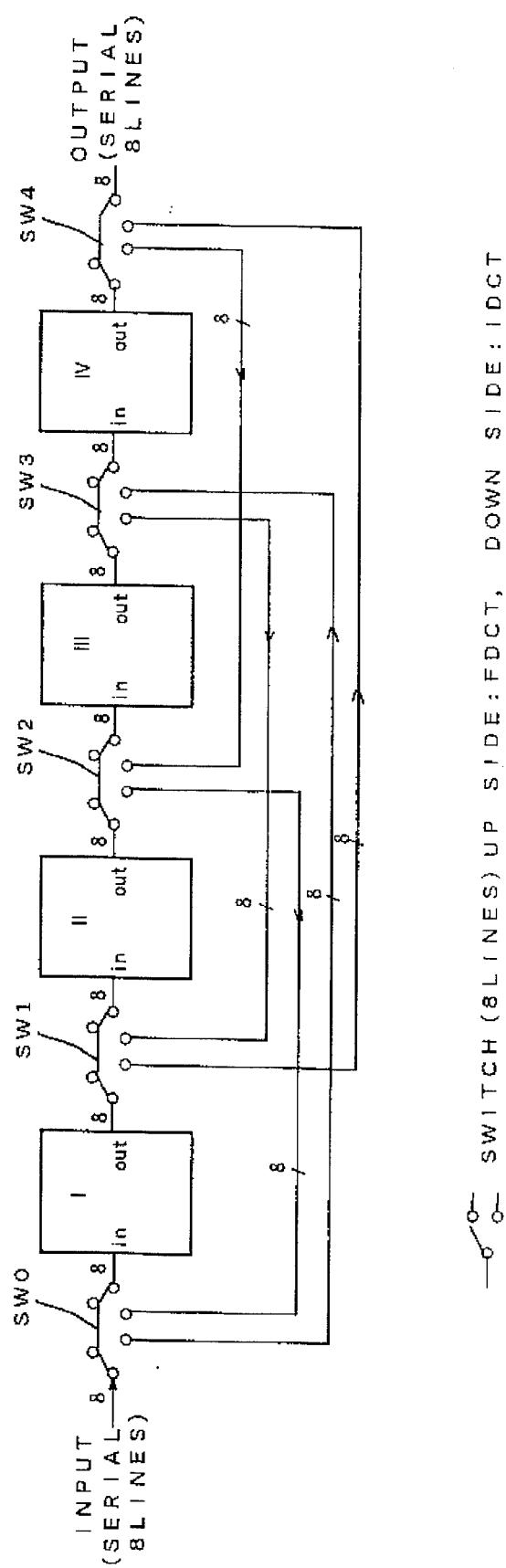
FIG. 8 schematically shows up the signal flow according to which both FDCT and IDCT are realized changing the sequences of respective stages.

Therefore, FDCT and IDCT can be implemented by connecting the elements in the exactly same configuration. As shown in FIG. 8, in the case of FDCT, for input fi, the stages I, II, III and IV are connected serially by pulling down the switches SW0–SW4 on the up sides, and then the output Fi is obtained. In the case of IDCT, to connect the stages in the order of IV, III, II and I, the switches SW0–SW4 are pulled down on the down sides.

Up to now, based on the fast computing equations of FDCT and IDCT, the configurations of FIGS. 1 and 2 are described. Furthermore, in the case of FDCT, in particular, the relations of the outputs F0, F4, F2, F6, F1, F7, F5, F3 in FIG. 1 and inputs f0–f7 are defined as in following Eqs. 23–30.

[Eq. 23]

$$F0 = \Big\{ \Big( \underbrace{(f0 + f7)}_{\text{I } P10} \times \underbrace{2}_{\text{I } P10} \times \underbrace{1024}_{\text{II } P20} + \underbrace{\phantom{()}}_{\text{III } P30} \underbrace{(f3 + f4)}_{\text{I } P13} \times \underbrace{2}_{\text{I } P13} \times \underbrace{1024}_{\text{II } P23} \Big) \times \underbrace{2}_{\text{III } P30}$$

$$+ \underbrace{\phantom{()}}_{\text{IV } P40} \Big( \underbrace{(f1 + f6)}_{\text{I } P11} \times \underbrace{2}_{\text{I } P11} \times \underbrace{1024}_{\text{II } P21} + \underbrace{\phantom{()}}_{\text{III } P31} \underbrace{(f2 + f5)}_{\text{I } P12} \times \underbrace{2}_{\text{I } P12} \times \underbrace{1024}_{\text{II } P22} \Big) \times \underbrace{2}_{\text{III } P31} \Big\} \times \underbrace{1448}_{\text{IV } P40}$$

[Eq. 24]

$$F4 = \Big\{ \Big( \underbrace{(f0 + f7)}_{\text{I } P10} \times \underbrace{2}_{\text{I } P10} \times \underbrace{1024}_{\text{II } P20} + \underbrace{\phantom{()}}_{\text{III } P30} \underbrace{(f3 + f4)}_{\text{I } P13} \times \underbrace{2}_{\text{I } P13} \times \underbrace{1024}_{\text{II } P23} \Big) \times \underbrace{2}_{\text{III } P30}$$

-continued
$$-\underbrace{\Big(}_{\substack{IV\\P41}}\underbrace{(f1+f6)}_{\substack{I\\P11}}\times\underbrace{2}_{\substack{I\\P11}}\times\underbrace{1024}_{\substack{II\\P21}}+\underbrace{(f2+f5)}_{\substack{III\\P31}}\underbrace{\phantom{x}}_{\substack{I\\P12}}\times\underbrace{2}_{\substack{I\\P12}}\times\underbrace{1024}_{\substack{II\\P22}}\Big)\times\underbrace{2}_{\substack{III\\P31}}\Big\}\times\underbrace{1448}_{\substack{IV\\P41}}$$

[Eq. 25]
$$F2 = \Bigg[\bigg\{\Big(\underbrace{(f0+f7)}_{\substack{I\\P10}}\times\underbrace{2}_{\substack{I\\P10}}\times\underbrace{1024}_{\substack{II\\P20}}-\underbrace{(f3+f4)}_{\substack{III\\P33}}\underbrace{\phantom{x}}_{\substack{I\\P13}}\times\underbrace{2}_{\substack{I\\P13}}\times\underbrace{1024}_{\substack{II\\P23}}\Big)\times\underbrace{2}_{\substack{III\\P33}}\bigg\}\times\underbrace{946}_{\substack{IV\\P43}}$$

$$\underbrace{+}_{\substack{IV\\P43}}\bigg\{\Big(\underbrace{(f1+f6)}_{\substack{I\\P11}}\times\underbrace{2}_{\substack{I\\P11}}\times\underbrace{1024}_{\substack{II\\P21}}-\underbrace{(f2+f5)}_{\substack{III\\P32}}\underbrace{\phantom{x}}_{\substack{I\\P12}}\times\underbrace{2}_{\substack{I\\P21}}\times\underbrace{1024}_{\substack{II\\P22}}\Big)\times\underbrace{2}_{\substack{III\\P32}}\bigg\}\times\underbrace{392}_{\substack{IV\\P42}}\Bigg]\times\underbrace{2}_{\substack{IV\\P43}}$$

[Eq. 26]
$$F6 = \Bigg[\bigg\{\Big(\underbrace{(f0+f7)}_{\substack{I\\P10}}\times\underbrace{2}_{\substack{I\\P10}}\times\underbrace{1024}_{\substack{II\\P20}}-\underbrace{(f3+f4)}_{\substack{III\\P33}}\underbrace{\phantom{x}}_{\substack{I\\P13}}\times\underbrace{2}_{\substack{I\\P13}}\times\underbrace{1024}_{\substack{II\\P23}}\Big)\times\underbrace{2}_{\substack{III\\P33}}\bigg\}\times\underbrace{392}_{\substack{IV\\P43}}$$

$$\underbrace{-}_{\substack{IV\\P42}}\bigg\{\Big(\underbrace{(f1+f6)}_{\substack{I\\P11}}\times\underbrace{2}_{\substack{I\\P11}}\times\underbrace{1024}_{\substack{II\\P21}}-\underbrace{(f2+f5)}_{\substack{III\\P32}}\underbrace{\phantom{x}}_{\substack{I\\P12}}\times\underbrace{2}_{\substack{I\\P12}}\times\underbrace{1024}_{\substack{II\\P22}}\Big)\times\underbrace{2}_{\substack{III\\P32}}\bigg\}\times\underbrace{946}_{\substack{IV\\P42}}\Bigg]\times\underbrace{2}_{\substack{IV\\P42}}$$

[Eq. 27]
$$F1 = \Bigg[\bigg\{\underbrace{(f0-f7)}_{\substack{I\\P17}}\times\underbrace{2}_{\substack{I\\P17}}\times\underbrace{1024}_{\substack{II\\P27}}\underbrace{+}_{\substack{III\\P37}}\Big(\underbrace{(f1+f6)}_{\substack{I\\P16}}\times\underbrace{2}_{\substack{I\\P16}}\underbrace{+}_{\substack{II\\P26}}\underbrace{(f2-f5)}_{\substack{I\\P15}}\times\underbrace{2}_{\substack{I\\P15}}\Big)$$

$$\times\underbrace{724}_{\substack{II\\P26}}\bigg\}\times\underbrace{2}_{\substack{III\\P37}}\times\underbrace{502}_{\substack{IV\\P47}}\underbrace{+}_{\substack{IV\\P47}}\bigg\{\underbrace{(f3-f4)}_{\substack{I\\P14}}\times\underbrace{2}_{\substack{I\\P14}}\times\underbrace{1024}_{\substack{II\\P24}}\underbrace{+}_{\substack{III\\P34}}\Big(\underbrace{(f1-f6)}_{\substack{I\\P16}}$$

$$\times\underbrace{2}_{\substack{I\\P16}}\underbrace{-}_{\substack{II\\P25}}\underbrace{(f2-f5)}_{\substack{I\\P15}}\times\underbrace{2}_{\substack{I\\P15}}\Big)\times\underbrace{724}_{\substack{II\\P25}}\bigg\}\times\underbrace{2}_{\substack{III\\P34}}\times\underbrace{100}_{\substack{IV\\P44}}\Bigg]\times\underbrace{4}_{\substack{IV\\P47}}$$

[Eq. 28]
$$F7 = \Bigg[\bigg\{\underbrace{(f0-f7)}_{\substack{I\\P17}}\times\underbrace{2}_{\substack{I\\P17}}\times\underbrace{1024}_{\substack{II\\P27}}\underbrace{+}_{\substack{III\\P37}}\Big(\underbrace{(f1+f6)}_{\substack{I\\P16}}\times\underbrace{2}_{\substack{I\\P16}}\underbrace{+}_{\substack{II\\P26}}\underbrace{(f2-f5)}_{\substack{I\\P15}}\times\underbrace{2}_{\substack{I\\P15}}\Big)$$

$$\times\underbrace{724}_{\substack{II\\P26}}\bigg\}\times\underbrace{2}_{\substack{III\\P37}}\times\underbrace{100}_{\substack{IV\\P47}}\underbrace{-}_{\substack{IV\\P44}}\bigg\{\underbrace{(f3-f4)}_{\substack{I\\P14}}\times\underbrace{2}_{\substack{I\\P14}}\times\underbrace{1024}_{\substack{II\\P24}}\underbrace{+}_{\substack{III\\P34}}\Big(\underbrace{(f1-f6)}_{\substack{I\\P16}}$$

$$\times\underbrace{2}_{\substack{I\\P16}}\underbrace{-}_{\substack{II\\P25}}\underbrace{(f2-f5)}_{\substack{I\\P15}}\times\underbrace{2}_{\substack{I\\P15}}\Big)\times\underbrace{724}_{\substack{II\\P25}}\bigg\}\times\underbrace{2}_{\substack{III\\P34}}\times\underbrace{502}_{\substack{IV\\P44}}\Bigg]\times\underbrace{4}_{\substack{IV\\P44}}$$

[Eq. 29]
$$F5 = \Bigg[\bigg\{\underbrace{\underbrace{(\underbrace{f0 - f7}_{\substack{I\\P17}}) \times 2}_{\substack{I\\P17}} \times 1024}_{\substack{II\\P27}} - \underbrace{\bigg(\underbrace{(\underbrace{f1-f6}_{\substack{I\\P16}}) \times 2}_{\substack{I\\P16}} + \underbrace{(\underbrace{f2-f5}_{\substack{I\\P15}}) \times 2}_{\substack{I\\P15}}\bigg)}_{\substack{III\\P36}}$$
$$\underbrace{\times 724}_{\substack{II\\P26}}\bigg\} \underbrace{\times 2}_{\substack{III\\P36}} \underbrace{\times 568}_{\substack{IV\\P46}} + \underbrace{\phantom{x}}_{\substack{IV\\P46}} \bigg\{\underbrace{\underbrace{(\underbrace{f3-f4}_{\substack{I\\P14}}) \times 2}_{\substack{I\\P14}} \times 1024}_{\substack{II\\P24}} - \underbrace{\bigg(\underbrace{(f1-f6)}_{\substack{I\\P16}}}_{\substack{III\\P35}}$$
$$\underbrace{\times 2}_{\substack{I\\P16}} - \underbrace{(f2-f5)}_{\substack{II\\P25}} \underbrace{\times 2}_{\substack{I\\P15}}\bigg) \underbrace{\times 724}_{\substack{I\\P15}}\bigg\} \underbrace{\times 2}_{\substack{II\\P25}} \underbrace{\times 852}_{\substack{III\\P35}}\Bigg] \underbrace{\times 2}_{\substack{IV\\P46}}\phantom{x}_{\substack{IV\\P45}}$$

[Eq. 30]
$$F3 = \Bigg[\bigg\{\underbrace{\underbrace{(\underbrace{f0 - f7}_{\substack{I\\P17}}) \times 2}_{\substack{I\\P17}} \times 1024}_{\substack{II\\P27}} - \underbrace{\bigg(\underbrace{(\underbrace{f1-f6}_{\substack{I\\P16}}) \times 2}_{\substack{I\\P16}} + \underbrace{(\underbrace{f2-f5}_{\substack{I\\P15}}) \times 2}_{\substack{I\\P15}}\bigg)}_{\substack{III\\P36}}$$
$$\underbrace{\times 724}_{\substack{II\\P26}}\bigg\} \underbrace{\times 2}_{\substack{III\\P36}} \underbrace{\times 852}_{\substack{IV\\P46}} - \underbrace{\phantom{x}}_{\substack{IV\\P45}} \bigg\{\underbrace{\underbrace{(\underbrace{f3-f4}_{\substack{I\\P14}}) \times 2}_{\substack{I\\P14}} \times 1024}_{\substack{II\\P24}} - \underbrace{\bigg(\underbrace{(f1-f6)}_{\substack{I\\P16}}}_{\substack{III\\P35}}$$
$$\underbrace{\times 2}_{\substack{I\\P16}} - \underbrace{(f2-f5)}_{\substack{II\\P25}} \underbrace{\times 2}_{\substack{I\\P15}}\bigg) \underbrace{\times 724}_{\substack{I\\P15}}\bigg\} \underbrace{\times 2}_{\substack{II\\P25}} \underbrace{\times 568}_{\substack{III\\P35}}\Bigg] \underbrace{\times 2}_{\substack{IV\\P45}}\phantom{x}_{\substack{IV\\P45}}$$

where the numbers shown under each part of equations are the stage numbers and element numbers, respectively. And in the same way, in the case of IDCT, the relations of the outputs f0, f3, f1, f2, f7, f4, f6, f5 in FIG. 2 and inputs F0–F7 are defined as in following Eqs. 31–38.

$$f0 = \{((F0 + F4) \times 1448 + \quad\quad [\text{Eq. 31}]$$
$$\underbrace{\phantom{((F0+F4)\times 1448)}}_{\substack{IV\\P40}}\underbrace{\phantom{xx}}_{\substack{IV\\P40}}\underbrace{\phantom{xx}}_{\substack{III\\P30}}$$

$$(F2 \times 946 + F6 \times 392) \times 2 \times 1024 +$$
$$\underbrace{\phantom{xx}}_{\substack{IV\\P43}}\underbrace{\phantom{xx}}_{\substack{IV\\P43}}\underbrace{\phantom{xx}}_{\substack{IV\\P42}}\underbrace{\phantom{xx}}_{\substack{IV\\P43}}\underbrace{\phantom{xx}}_{\substack{III\\P30}}\underbrace{\phantom{xx}}_{\substack{II\\P20}}\underbrace{\phantom{xx}}_{\substack{I\\P10}}$$

$$((F1 \times 502 + F7 \times 100) \times 4 +$$
$$\underbrace{\phantom{xx}}_{\substack{IV\\P47}}\underbrace{\phantom{xx}}_{\substack{IV\\P47}}\underbrace{\phantom{xx}}_{\substack{IV\\P44}}\underbrace{\phantom{xx}}_{\substack{IV\\P47}}\underbrace{\phantom{xx}}_{\substack{III\\P37}}$$

$$(F5 \times 568 + F3 \times 852) \times 2 \times 1024 \} \times 2$$
$$\underbrace{\phantom{xx}}_{\substack{IV\\P46}}\underbrace{\phantom{xx}}_{\substack{IV\\P46}}\underbrace{\phantom{xx}}_{\substack{IV\\P45}}\underbrace{\phantom{xx}}_{\substack{IV\\P46}}\underbrace{\phantom{xx}}_{\substack{III\\P37}}\underbrace{\phantom{xx}}_{\substack{II\\P27}}\underbrace{\phantom{xx}}_{\substack{I\\P10}}$$

$$f3 = \{((F0 + F4) \times 1448 - \quad\quad [\text{Eq. 32}]$$
$$\underbrace{\phantom{xx}}_{\substack{IV\\P40}}\underbrace{\phantom{xx}}_{\substack{IV\\P40}}\underbrace{\phantom{xx}}_{\substack{III\\P33}}$$

-continued $$(F2 \times 946 + F6 \times 392) \times 2 \times 1024 +$$
$$\underbrace{\phantom{xx}}_{\substack{IV\\P43}}\underbrace{\phantom{xx}}_{\substack{IV\\P43}}\underbrace{\phantom{xx}}_{\substack{IV\\P42}}\underbrace{\phantom{xx}}_{\substack{IV\\P42}}\underbrace{\phantom{xx}}_{\substack{III\\P33}}\underbrace{\phantom{xx}}_{\substack{II\\P23}}\underbrace{\phantom{xx}}_{\substack{I\\P10}}$$

$$((F1 \times 100 - F7 \times 502) \times 4 +$$
$$\underbrace{\phantom{xx}}_{\substack{IV\\P47}}\underbrace{\phantom{xx}}_{\substack{IV\\P44}}\underbrace{\phantom{xx}}_{\substack{IV\\P44}}\underbrace{\phantom{xx}}_{\substack{IV\\P44}\substack{III\\P34}}$$

$$(F5 \times 852 - F3 \times 568) \times 2 \times 1024 \} \times 2$$
$$\underbrace{\phantom{xx}}_{\substack{IV\\P46}}\underbrace{\phantom{xx}}_{\substack{IV\\P45}}\underbrace{\phantom{xx}}_{\substack{IV\\P45}}\underbrace{\phantom{xx}}_{\substack{IV\\P45}\substack{III\\P34}}\underbrace{\phantom{xx}}_{\substack{II\\P24}}\underbrace{\phantom{xx}}_{\substack{I\\P10}}$$

$$f1 = [((F0 + F4) \times 1448 + \quad\quad [\text{Eq. 33}]$$
$$\underbrace{\phantom{xx}}_{\substack{IV\\P41}}\underbrace{\phantom{xx}}_{\substack{IV\\P41}}\underbrace{\phantom{xx}}_{\substack{III\\P33}}$$

$$(F2 \times 392 - F6 \times 946) \times 2 \times 1024 +$$
$$\underbrace{\phantom{xx}}_{\substack{IV\\P43}}\underbrace{\phantom{xx}}_{\substack{IV\\P42}}\underbrace{\phantom{xx}}_{\substack{IV\\P42}}\underbrace{\phantom{xx}}_{\substack{IV\\P42}}\underbrace{\phantom{xx}}_{\substack{III\\P31}}\underbrace{\phantom{xx}}_{\substack{II\\P21}}\underbrace{\phantom{xx}}_{\substack{I\\P11}}$$

$$\{((F1 \times 502 + F7 \times 100) \times 4 -$$
$$\underbrace{\phantom{xx}}_{\substack{IV\\P47}}\underbrace{\phantom{xx}}_{\substack{IV\\P47}}\underbrace{\phantom{xx}}_{\substack{IV\\P44}}\underbrace{\phantom{xx}}_{\substack{IV\\P47}\substack{III\\P36}}$$

$$(F5 \times 568 + F3 \times 852) \times 2) \times 2 +$$
$$\underbrace{\underbrace{\underbrace{\underbrace{\underbrace{}_{\text{IV}}}_{\text{IV}}}_{\text{IV}}}_{\text{IV}}}_{\text{P46}} \underbrace{\underbrace{}_{\text{IV}}}_{\text{P46}} \underbrace{}_{\text{P45}} \cdot \underbrace{}_{\text{P45P36}} \underbrace{}_{\text{P26}}$$

$$((F1 \times 100 - F7 \times 502) \times 4 -$$
IV IV IV IV III
P47 P44 P44 P44P35

$$(F5 \times 852 - F3 \times 568) \times 2\} \times 724] \times 2$$
IV IV IV IV III II I
P46 P45 P45 P45P35 P26 P26

$$f2 = [((F0 - F4) \times 1448 -$$ [Eq. 34]
IV IV III
P41 P41 P31

$$(F2 \times 392 - F6 \times 946) \times 2 \times 1024 +$$
IV IV IV IV III II I
P43 P42 P42 P42P31 P22 P12

$$\{((F1 \times 502 + F7 \times 100) \times 4 -$$
IV IV IV IV III
P47 P47 P44 P47P36

$$(F5 \times 568 + F3 \times 852) \times 2) \times 2 -$$
IV IV IV IV III II
P46 P46 P45 P46P36 P25

$$((F1 \times 100 - F7 \times 502) \times 4 -$$
IV IV IV IV III
P47 P44 P44 P44P35

$$(F5 \times 852 - F3 \times 568) \times 2\} \times 724] \times 2$$
IV IV IV IV III II I
P46 P45 P45 P45P35 P25 P12

$$f7 = \{((F0 + F4) \times 1448 +$$ [Eq. 35]
IV IV III
P40 P40 P30

$$(F2 \times 946 + F6 \times 392) \times 2 \times 2 \times 1024 -$$
IV IV IV IV III II I
P43 P43 P43 P43 P30 P20 P17

$$((F1 \times 502 + F7 \times 100) \times 4 +$$
IV IV IV IV III
P47 P47 P44 P47P37

$$(F5 \times 568 + F3 \times 852) \times 2) \times 2 \times 1024\} \times 2$$
IV IV IV IV III II I
P46 P45 P45 P46P37 P27 P17

$$f4 = \{((F0 + F4) \times 1448 -$$ [Eq. 36]
IV IV III
P40 P40 P33

$$(F2 \times 946 + F6 \times 392) \times 2 \times 2 \times 1024 -$$
IV IV IV IV III II I
P43 P43 P42 P43 P33 P23 P14

$$((F1 \times 100 - F7 \times 502) \times 4 +$$
IV IV IV IV III
P47 P44 P44 P44P34

$$(F5 \times 852 - F3 \times 568) \times 2) \times 2 \times 1024\} \times 2$$
IV IV IV IV III II I
P46 P45 P45 P45P34 P24 P14

$$f6 = [((F0 - F4) \times 1448 +$$ [Eq. 37]
IV IV III
P41 P41 P31

$$(F2 \times 392 - F6 \times 946) \times 2 \times 1024 -$$
IV IV IV IV III II I
P43 P42 P42 P42P31 P21 P14

$$\{((F1 \times 502 + F7 \times 100) \times 4 -$$
IV IV IV IV III
P47 P47 P44 P47P36

$$(F5 \times 568 + F3 \times 852) \times 2) \times 2 +$$
IV IV IV IV III II
P46 P46 P45 P45P36 P26

$$((F1 \times 100 - F7 \times 502) \times 4 -$$
IV IV IV IV III
P47 P44 P44 P44P35

$$(F5 \times 852 - F3 \times 568) \times 2\} \times 724] \times 2$$
IV IV IV IV III II I
P46 P45 P45 P45P35 P26 P14

$$f5 = [((F0 - F4) \times 1448 -$$ [Eq. 38]
IV IV III
P41 P41 P31

$$(F2 \times 392 - F6 \times 946) \times 2 \times 1024 -$$
IV IV IV IV III II I
P43 P42 P42 P42P31 P22 P15

$$\{((F1 \times 502 + F7 \times 100) \times 4 -$$
IV IV IV IV III
P47 P47 P44 P47P36

$$(F5 \times 568 + F3 \times 852) \times 2) \times 2 -$$
IV IV IV IV III II
P46 P46 P45 P46P36 P25

$$((F1 \times 100 - F7 \times 502) \times 4 -$$
IV IV IV IV III
P47 P44 P44 P44P35

$$(F5 \times 852 - F3 \times 568) \times 2\} \times 724] \times 2$$
IV IV IV IV III II I
P46 P45 P45 P45P35 P25 P15 where the numbers shown under each part of equations are the stage numbers and element numbers, respectively.

Then, related to the outputs F0, F1, F2, F3, F4, F5, F6, F7, the values of each element in the matrix (refer to Eq. 39) of inputs f0, f1, f2, f3, f4, f5, f6, f7 are obtained as in FIG. 9, The values written in parenthesis of this figure are the values of elements in the real matrix by dividing by $2^{18}=8192$, and by comparing the values in parenthesis and that in FIG. 10, it is obvious that the matrix shown in FIG. 7 is equivalent to the original matrix in FIG. 9, i.e., the matrix in FIG. 9 is an orthogonal matrix just like the original one. Therefore, in the case of IDCT, related to the outputs f0, f1, f2, f3, f4, f5, f6, f7, the matrix of input F0, F1, F2, F3, F4, F5, F6, F7 becomes to the transpose/natrix as shown in the following Eq. 39.

$$(F0, F2, F3, F4, F5, F6, F7)=(f0, f1, f2, f3, f4, f5, f6, f7) \text{ (Matrix in FIG. 9)} \quad [\text{Eq. 39}]$$

In the next, related to FIG. 10, the fact that, the multiplying values shown in FIGS. 1 and 2 equal to $\cos(i/16)\pi$, is described. That is, in the circuit configuration (signal flow) in FIGS. 1 and 2, the values of $\cos(i/16)\pi$ which is based on the fast computing algorithm, is approximated the values shown in the approximate value column in FIG. 10 by putting $1024=2^{10}$ as 1.0. The values of first 10 bits in binary notation are used as the values of $\cos(i/16)\pi$.

For example, as mentioned before, by implementing the multiplication of elements P26, P25 related to FIG. 1 by 724, the multiplication by $\cos(4/16)\pi$ is realized. This fact is evident from FIG. 10.

Figure 11:
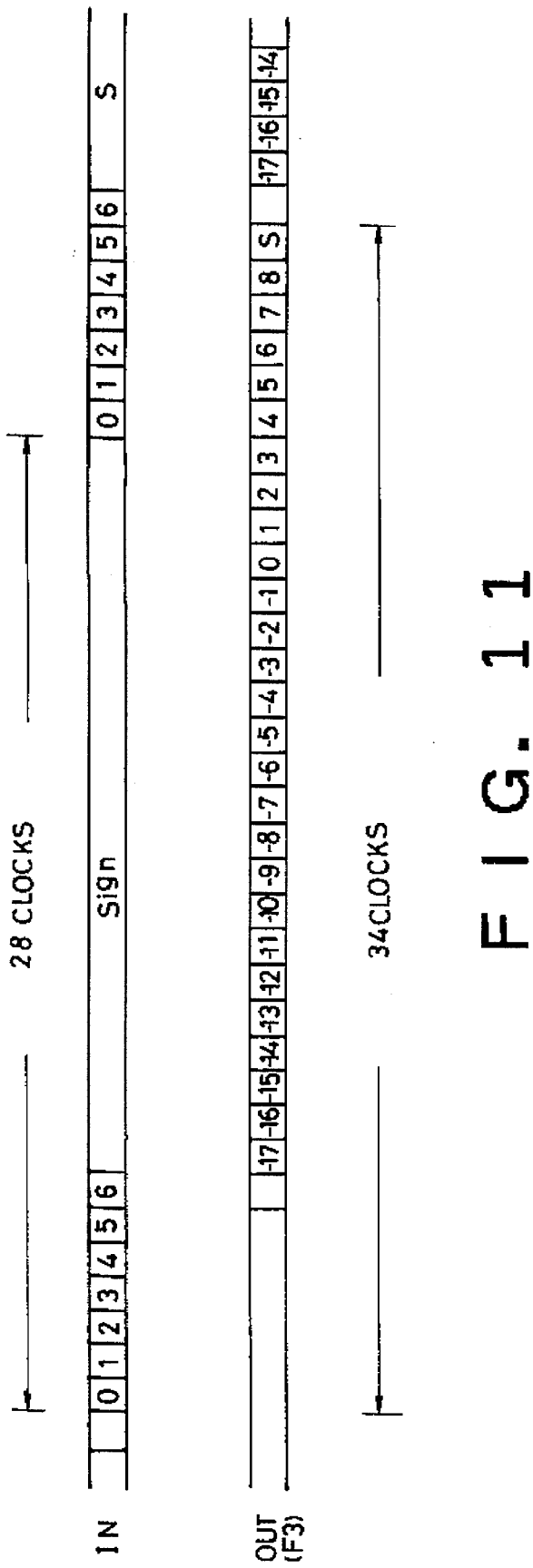
FIG. 11 shows a time chart of the FDCT input and output as shown in FIG. 1.

FIG. 11 is the input and output time chart of FDCT in FIG. 1, in other words, it shows the computing time of FDCT. When the method which inputs 0 and then clears the remained data at the beginning of FDCT computing process is used, (i.e., flashing bit is put into pipe line), if the input bit number is given by 8 bit (7 bit+code bit), one group computation of each 28 clock cycles is implemented. The line cycle numbers (pipe line length) determined as clock number from LSB of input to MSB of output is 34 clock cycles in this example just as shown in the figure.

For the outputs of F3 in FIG. 1, the multiplication of the matrix coefficients from the matrix in FIG. 9 is performed to each fi, in the meantime, if it is assumed that all of fi can have the maximum values, as the result of multiplication, the outputs of F3 in FIG. 1 become the coefficients in the line of l=3 in FIG. 9 (k=0~7), and the sum of the absolute values becomes $(6979584+1644928+8224640+4653056)\times 2=43004416$ which needs 26 bits in the expression of binary notation. (since $2^{26}=67108864$).

Therefore, because the multiplying values of 8 bit input are expressed by 26 bits, the pipe line length becomes 34 clocks. By checking the outputs of F3 in FIG. 1, the shortest path from input to output needs 7 clocks in which there are 1 clock for 1 Flip-Flop in stage I, 2 clocks for 2 Flip-Flops in stage II, 1 clock for 1 Flip-Flop in stage III, and 3 clocks for 3 Flip-Flops in stage IV, i.e., the outputs start at 7th clock after input. This is the position shown by −17 in the output column of FIG. 11.

If the position of decimal points (Binary Point) is placed at the left side of 0 for inputs, the outputs are placed between 0 and −1 as shown in the figure.

In other wards, back to the original matrix of FDCT, for the output of F3, when fi is the maximum value, the multiplied values become the coefficients in the line of 1–3 in FIG. 7 (k=0~7), and the sum of the absolute values becomes $\{\cos(3\pi/16)+\cos(7\pi/16)+\cos(1\pi/16)+\cos(5\pi/16)\}\times \frac{1}{2}\times 2$ which is 2.5 approximately, the bit number above the decimal points of output increases 2 bits compared to input. Therefore, if the bit number of input is 8, that above the decimal points is 10 bits, and the decimal points come to the position as mentioned before.

It is evident in the above description that, the bit number of output data depends on that of input data and is variable, and the pipe line length is variable as well. By omitting the details of description, if the output bit number is less than 10, (including sign bit), when flashing bit is used, the computation of each 28 clock cycles is implemented, if the clock cycles are more than 28, the output bit number is obtained as (9+n) and pipe line length becomes (27+n) clock number. The case discussed above is about the case using flashing bit, when the construction is realized by resetting all Flip-Flop circuits in FIG. 1 under compulsion, the flashing bit in the figure is disused, i.e., in advance of 1 clock in FIG. 11, the computation of each 27 clock is implemented.

Description of Image Processing Device

In the next, one configuration example of the image processing device which employed the data compressing/extending device (refer to FIG. 12B which will be mentioned later.) by using the data transform computing device as mentioned before (refer to FIG. 1, 2 and 8.) is described.

Figure 12A:
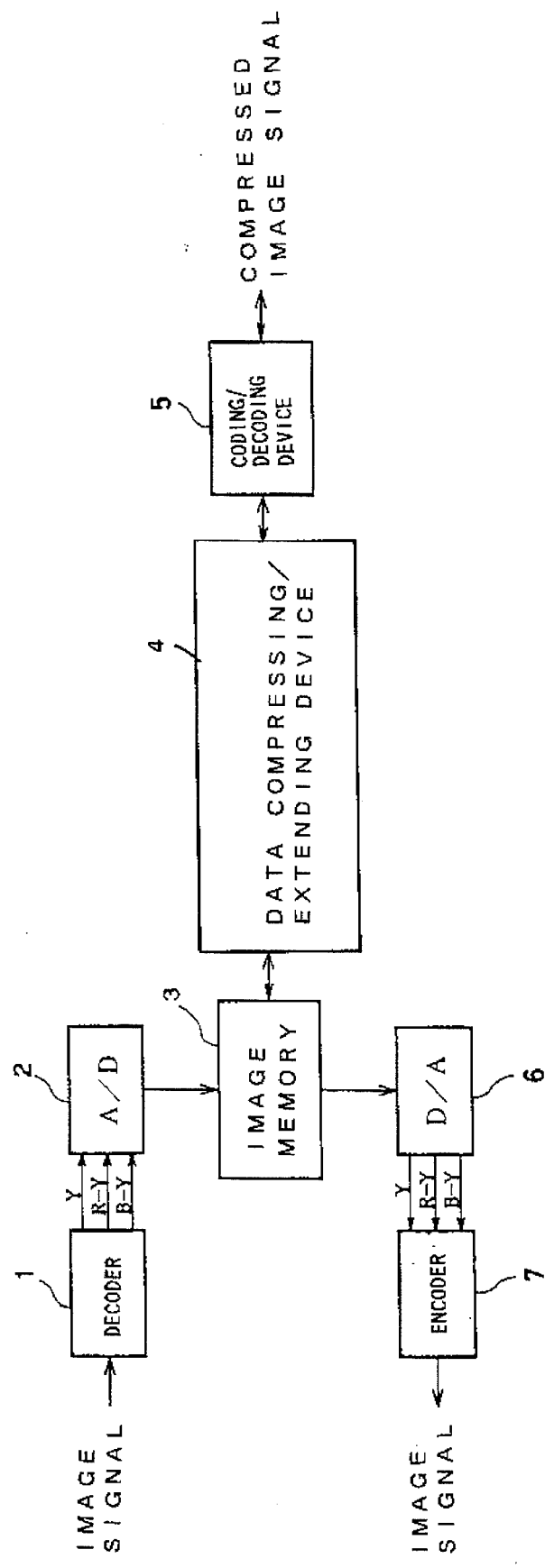
FIG. 12A shows up an exemplary composition of the image processing unit, one of the preconditions of this invention.

FIG. 12A shows the general construction. The image signal provided is divided by brightness signal Y and color-difference signal R–Y, B–Y in decoder 1, the image signal divided by Y, R–Y and B–Y is transformed to 3 groups digital signals at A/D converter 2, and preserved at image memory 3 temporarily. After the processing of FDCT, the data preserved at image memory 3 is quantized with the suitable quantization table (one example is described later.) by the data compressing/extending device 4 in every 8×8 image element. The next step is the suitable coding at coding/decoding device 5, e.g., Huffman coding, and finally the compressed image signal is obtained.

This compressed image signal can be memorized and transmitted, the application example will be described later.

Inversely, when this compressed image data is restored to the original image, the inverse signal processing of compression as mentioned before is implemented, i.e., the decoding processing is performed at coding/decoding device 5, after the de-quantization, at data compressing/extending device 4, the digital image signal is obtained by the processing of IDCT. Then, this digital image signal is preserved at image memory 3, and 3 groups analog image signal Y, R–Y, B–Y are obtained at D/A converter 6, finally the image data is restored by decoding at decoder 7.

Figure 12B:
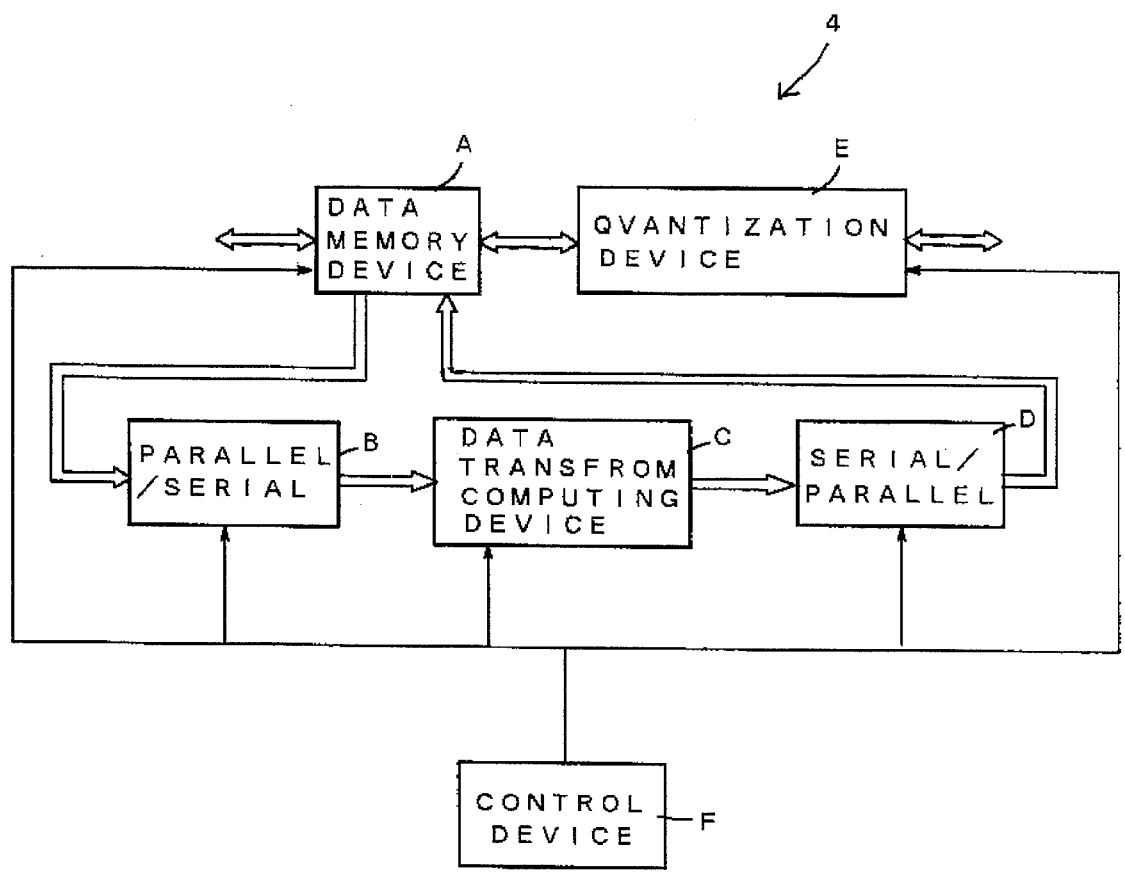
FIG. 12B shows on the other hand the overall configuration of the data compressing and expanding device as displayed in FIG. 12A.

Description on Overall Configuration of Data Compressing and Expanding Device and Parallel to Serial/Serial to Parallel Converter FIG. 12B illustrates the overall configuration of the data compressing and expanding device 4 as shown in FIG. 12A, which is so designed that the compression and expension of data may be performed selectively by changeover of operating state.

"A" symbolizes a data memory device where the information to be compressed is stored in a parallel form, for instance in 8 lines of multibit parallel data which is converted into serial one in the parallel to serial converter B. In this case the parallel data is transformed into multibit serial data in 8 lines.

This 8-line multibit serial data is transferred serially to the data transform computing device C where the data is compressed. The data transform computing device C, whose embodiments have already been explained referring to FIGS. 1, 2, and 3, executes the FDCT processing by serial operation. Then the result of this operation is output in 8 lines as serial multibit data.

Then the data resulting from the operation is given to the serial to parallel converter D which converts the serial data into parallel one to supply the information to the data memory device A once again.

What has so far been described is relevant to one-dimensional data. In the event of such two-dimensional data as image, the aforesaid FDCT processing will first be executed for horizontal data and then for vertical one (it may go as well if, conversely, the data is first processed in vertical direction and then in horizontal one).

Figure 20:
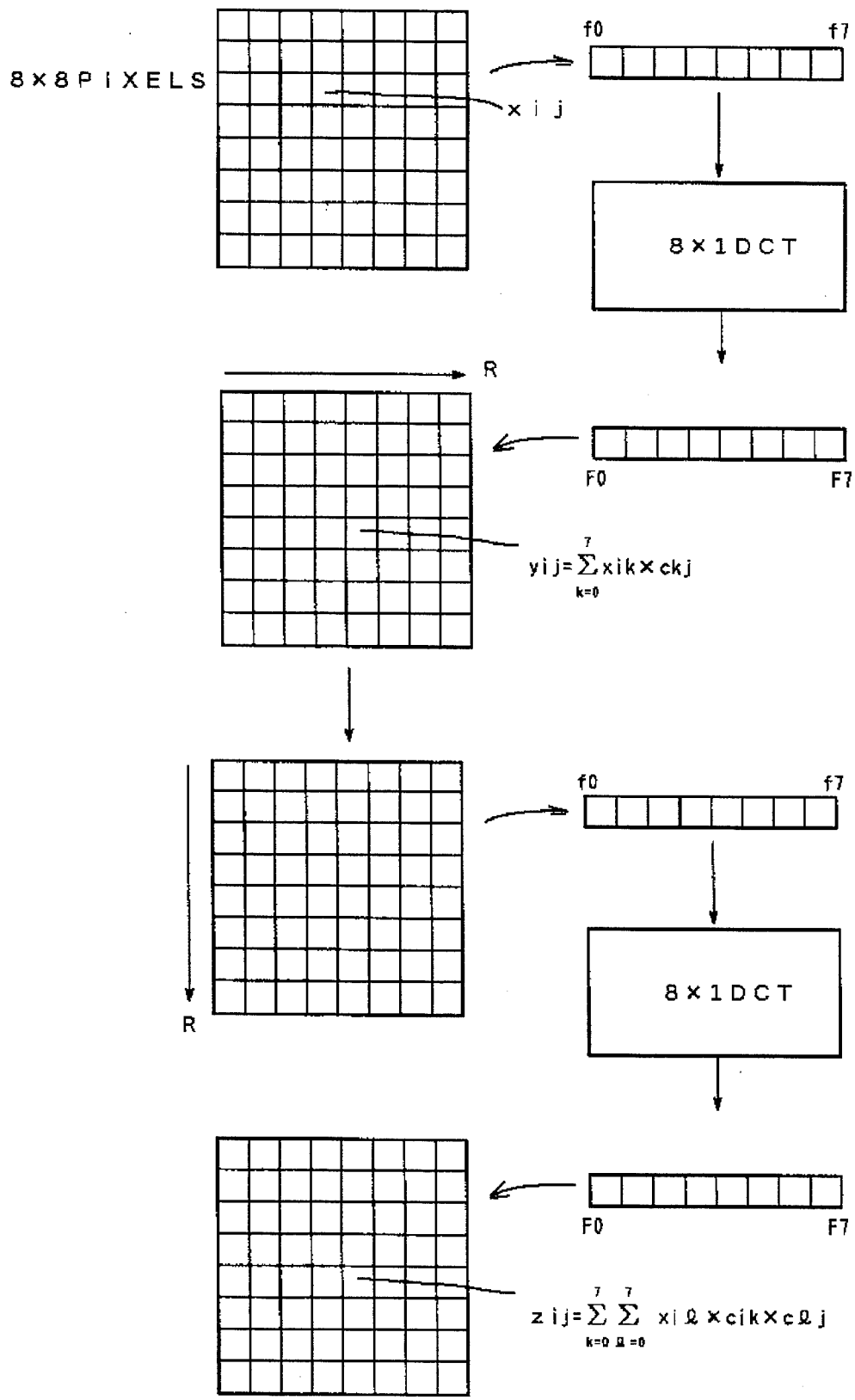
FIG. 20 represents flow chart showing how the two-dimensional image data is FDCT-processed and converted into two-dimensional frequency component data.

In case of image data, a multibit parallel data xij of, for example, 8×8 dots original image may be converted into 8-sample serial data in horizontal direction (with j fixed) as shown in FIG. 20. Then it will be FDCT-processed, the result of which will be converted into parallel form to be stored. This operation, if repeated 8 times by sequentially incrementing the j from 0 up to 7, will complete the FDCT processing in horizontal direction (data of yij).

After converting into 8-sample serial data this FDCT-processed parallel data yij in vertical direction (with i fixed), it is FDCTed once again, and the result of this FDCT processing is converted into parallel form to be stored. This operation, if repeated 8 times by sequentially incrementing i from o to 7, will accomplish the FDCT also in vertical direction (zij data).

Subsequently the image data as having undergone the two-dimensional FDCT processing and stored in data memory device (that is, two-dimensional data of frequency component) is linearly quantized (divided) in a quantization device E using a quantization table. In other words the suppression of the high frequency component which is poor in visual sensitivity allows to compress the information, minimizing the degradation of picture quality. An exemplary table of quantization is given in FIG. 21.

In the event of data expansion the data to be expanded is conversely quantized by the quantization device E to be given in parallel form into the data memory device A. Thus the data will first be converted from parallel into serial as was in the preceding process, IDCTed in the data transform computing device C, then converted from serial to parallel to be stored once again in the data memory device A.

Also in this case such two-dimensional data as image requires IDCT processing twice in a zigzag way.

Figure 13:
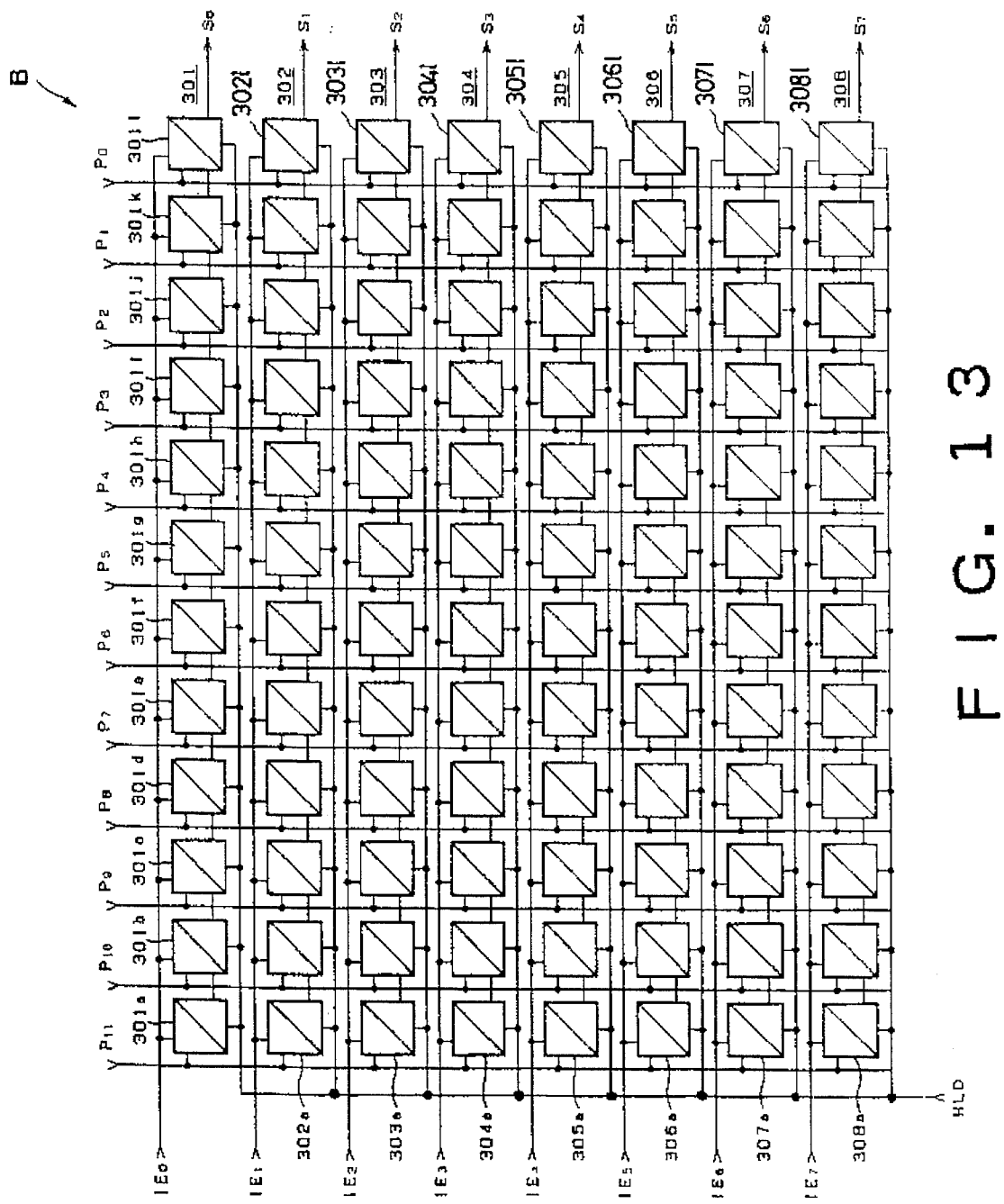
FIG. 13 shows an exemplary constitution of the parallel to serial converter B shown in FIG. 12B.
Figure 14:
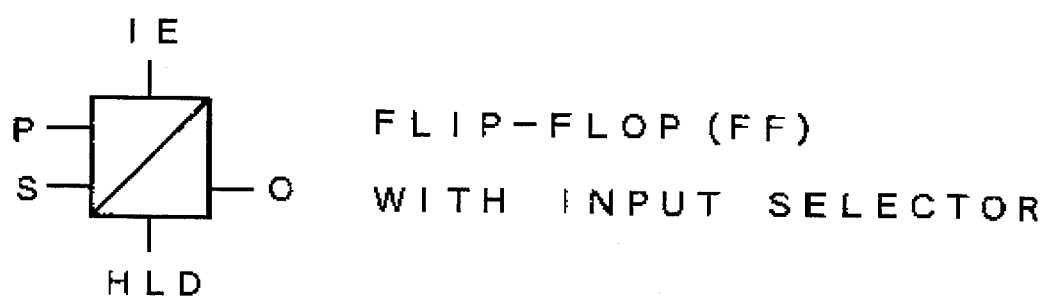
FIG. 14 represents the input and output terminals of the respective cells as illustrated in FIG. 13.

This type of operations are run under the control of the controller F. In FIG. 13, which diagrammatically shows the configuration of the parallel to serial converter B in said data compressing and extending device, input data is given as a parallel data of 12 bits (P0 to P11) to be output as 8-line serial one from the output lines S0 to S7. Note that in this case the fixed number of bits on lower side of 12 bits are effective bits, while the higher ones are sign bits. As shown in FIG. 14, each cell comprises the parallel data input terminal P, the serial data input terminal S, the control terminal of the hold signal HLD for holding these input data, the control terminal of the enable signal IE which permits intake of serial data (independently controlled as 8-lines, IE0 to IE7) and the output terminal 0. Each cell serves as a flip-flop FF provided with input selector, which will be described more in detail later.

In consequence 8 lines×12 bits=96 cells are furnished as shown in FIG. 13. Putting the respective lines 301 to 308, and each cell 301a to 301l, 302a to 302l, . . . and 308a to 308l, it is clear that these lines constitute a shift register. The enable signals IE0 to IE7 allow to selectively decide the cells of the line into which the data corresponding to 8 samples given as parallel data are to be stored. After all the parallel data are set in each line (that is, after the parallel data are taken sequentially into the shift register 8 times), the data are shift-output from the lowest bit side as serial data S0 to S7 in 8 lines. Namely bit shift is run toward right hand side one cell by one cell as illustrated in FIG. 13.

This operation permits to convert the 8 lines×12 bits of parallel data into so many serial data.

In FIG. 15 which depicts the circuitry of one cell as shown in FIG. 14, the operation runs that, with the aforesaid input signals and the control signals given, parallel or serial data are latched to send the output signals to the cells of subsequent stages.

In other words the D type flip-flop 317 is selectively provided with the parallel data of input terminal P via the AND gate 314, with the serial data of input terminal S via the AND gate 315, and the output of the feedback loop of the D flip-flop 317 via the AND gate 313, and further through the OR gate 316 connected to these AND gates 313, 314, and 315.

The hold signal HLD and the enable signal IE are furnished via the AND gates 311 and 312 to control the opening and closing action of these AND gates 313, 314, and 315.

As is clear from the circuit connection shown, when the hold signal HLD is 1, the output of the flip-flop 317 is fed back and latched in synchronization with the clock thus producing the data hold state.

When the hold signal HLD is 0 and the enable signal IE is also 0, parallel data is latched to flip-flop 317 in synchronization with the clock. When further the hold signal HLD is 0 but that the enable signal IE is 1, it results that the serial data is latched to the flip-flop 317 synchronizing with the clock.

Figure 16:
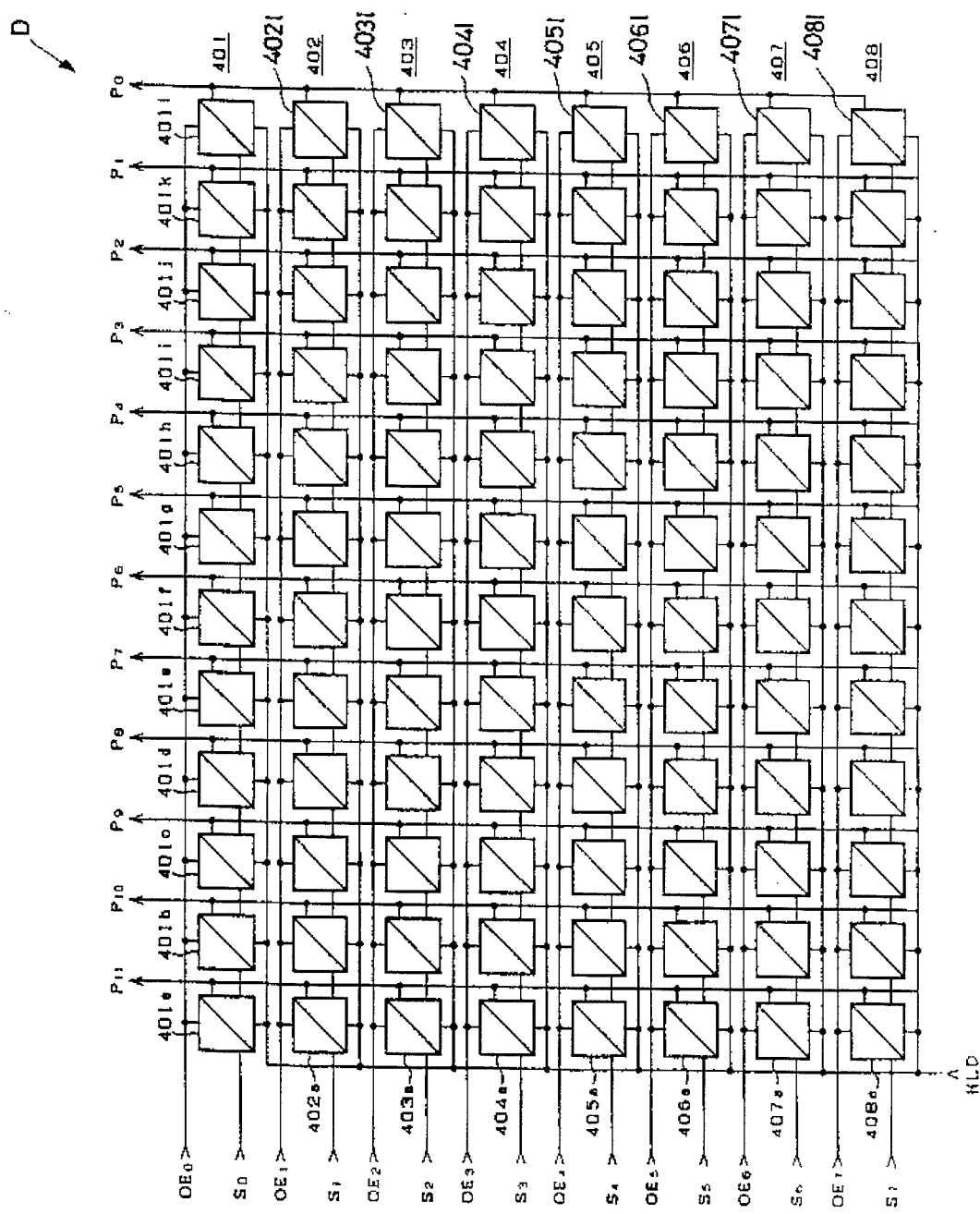
FIG. 16 shows an exemplary configuration of the serial to parallel converter D depicted in FIG. 12B.

In FIG. 16 which illustrates diagrammatically the configuration of the serial to parallel converter D, the input data are 12-bit serial data which are given to the input lines S0 to S7 as 8-line serial data. How many bits out of 12-bit data are made to be effective is determined in terms of the operations by FDCT and IDCT. It turns out that these serial data do output as 8-line, 12-bit parallel data P0 to P11.

Figure 17:
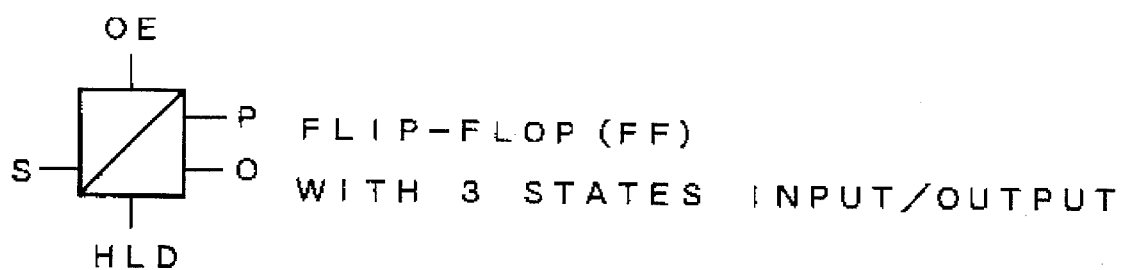
FIG. 17 illustrates the input and output terminals of the respective cells as shown in FIG. 16.

Provided in each cell as shown in FIG. 17 are the serial data input terminal S, the control terminal HLD of the hold signal HLD for holding the data, the control terminal of the enable signal OE which permits the output of parallel data (independently controlled as OE0 to OE7 for 8 lines) and the parallel data output terminal P, and serial data output terminal O. Each cell serves as a flip-flop FF provided with 3-state (tri-state) output, which will be described more in detail later.

In consequence 8 lines×12 bits=96 cells of this type are supplied as shown in FIG. 16. Putting the respective lines 401 to 408, and respective cells 401a to 401l, 402a to 402l, . . . and 408a to 408l, it is clear that these lines constitute a shift register.

That is, these these 8-line shift register continues to shift sequentially toward right hand side in the figure the data corresponding to the 8 samples given as serial data. As soon as 12 bits of data are set, the same operation is repeated 8 times sequentially and selectively deciding, by way of the enable signals OE0 to OE7, the signals of which line should be output as parallel data.

Hence this type of operation permits to convert the 8 lines×12 bits of serial data into so many parallel data.

Figure 18:
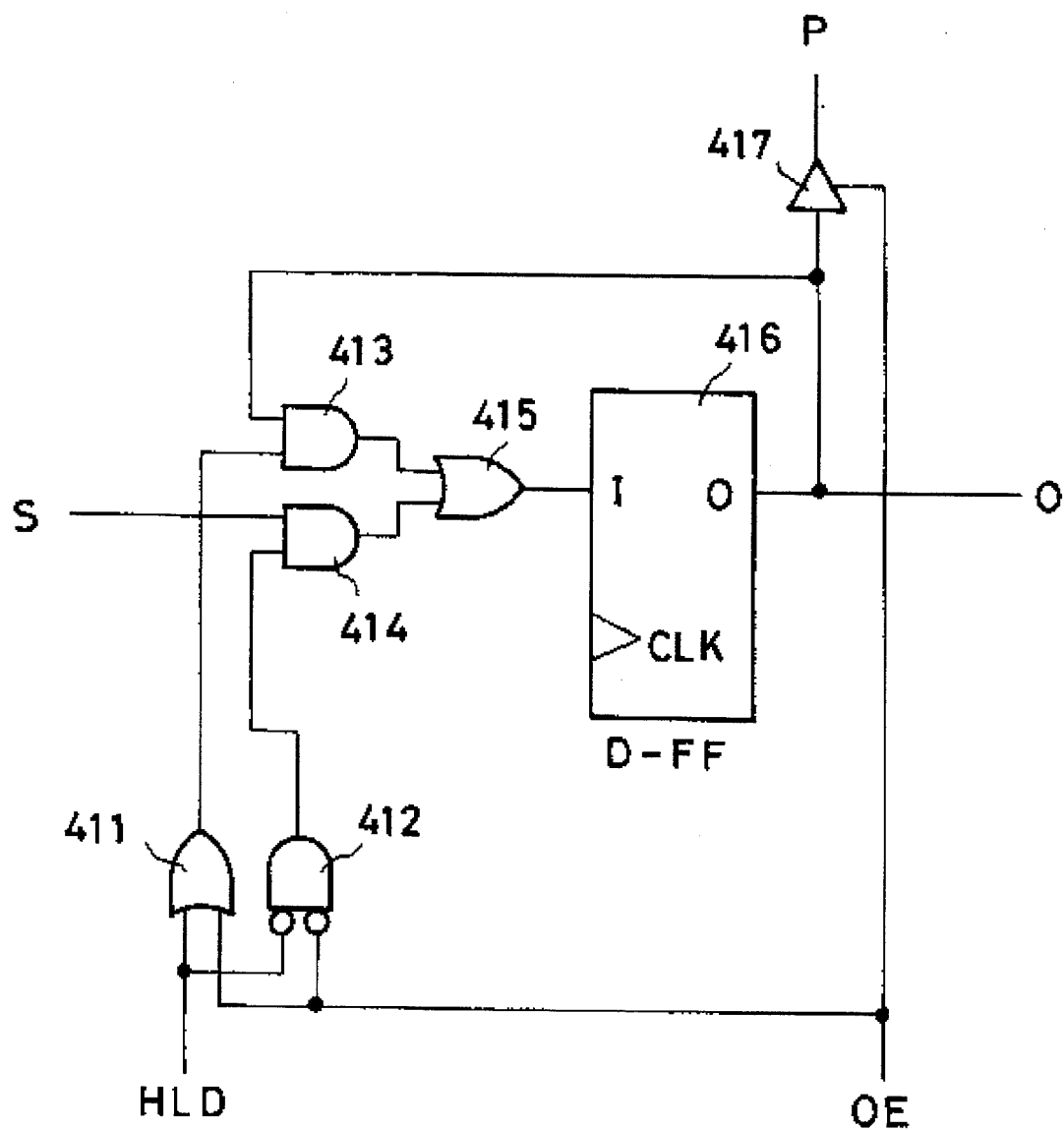
FIG. 18 is a diagram showing the materialized configuration of the cells shown in FIG. 17.

In the FIG. 18 which illustrates the embodiment of the circuitry of the cell as shown in FIG. 17, the aforesaid input and output signals are given, and the selective operation is run by which the serial data is latched either to be sent to the subsequent cells as output signals or to be output as parallel data.

The D type flip-flop 416 is selectively provided with the serial data of input terminal S via the AND gate 414, or with the output of the feedback loop of the D flip-flop 416 via the AND gate 413, or else the data through the OR gate 415 connected to these AND gates 413 and 414.

The hold signal HLD and the enable signal OE are furnished via the OR gate 411 and the AND gate 412 to control the opening and closing action of these AND gates 413 and 414.

As is clear from the circuit connection shown, when the hold signal HLD or the enable signal OE is 1, the output of the flip-flop 416 is fed back and latched in synchronization with the clock thereby producing the data hold state.

As long as the hold signal HLD is 0 and the enable signal OE is also 0, serial data is synchronized with the clock from the input terminal to latch the flip-flop 416.

Further the output of the flip-flop 416 is given to the subsequent cells via the terminal O and, at the same time, sent out as parallel data via the tri-state buffer 417, and this only when the enable signal OE is 1.

Figure 19:
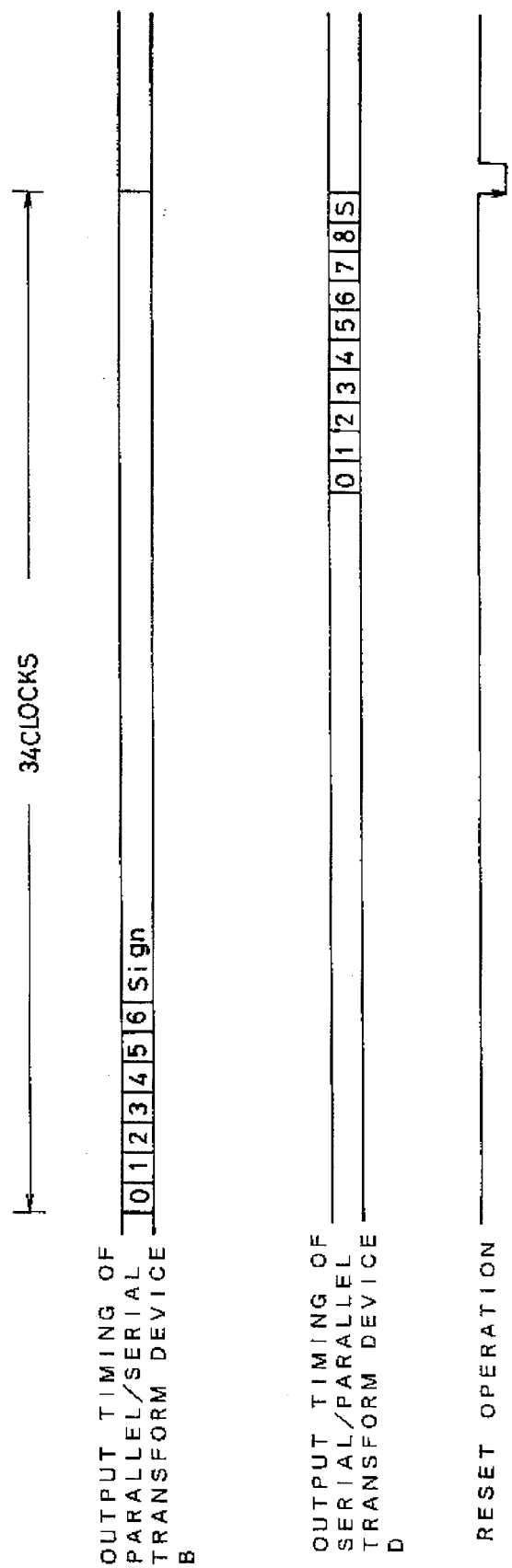
FIG. 19 is an operating time chart of the parallel to serial converter B and serial to parallel converter D as shown in FIG. 12B.

FIG. 19 indicates the operational timing of the parallel to serial converter B and the serial to parallel converter D.

In this case, as was the case with FIG. 11, it is a time chart when the data transform computing device C performs the operation where the length of the pipeline is 34 clocks.

Though no reset terminals have been provided on the respective cells in FIGS. 13 and 16, resetting all the cells every time when the operation starts will prevent the preceding data from remaining and outputting any queer values. It will go the same also with the respective flip-flops of the data transform computing device C already explained. It is therefore feasible to have a construction where a simultaneous resetting can be made when the parallel to serial conversion begins for one set of data or else when serial to parallel conversion terminates for one set of data (refer to FIG. 19).

We have already described that similar reset function may be actualized by sending the data from the data of the lowest significant bits always beginning with 0 passed through each cell, with 0 data on the head of each line (so-called input of flashing bits in pipeline processing).

As the premise of this invention, the data compressing/extending device was described as above. The circuit scale is reduced particularly compared to that based on parallel computation, by using serial computation to implement FDCT and IDCT. However, the circuit scale can be further improved greatly. The reason of this improvement is that the fast algorithm of DCT which has been considered from the beginning is realized directly in the serial computing circuits as will be explained later in detail.

Depending on the step numbers of Flip-Flop, the computing time is variable, so that quite long computing time is required as described before. Furthermore, because the serial-parallel transform and parallel-serial transform are configured by different converters, this part also can be improved.

In this invention, the improvements on above important points are realized. In the data transform computing device which will be described later, Ver. 1, Ver. 2, Ver. 3, Ver. 3.1 and Ver. 4 are provided, and the data transform device is provided as well by using parallel-serial/serial-parallel transform device.

The description for each pan will be given in sequence.

First of all, the basic idea for the configuration of data transform device is called Principle I, which is described as follows.

Description of Principle I

The configurations of FDCT and IDCT illustrated in FIGS. 1 and 2 is based on the conventional fast algorithm of DCT, and realized directly by the serial computing manner, i.e., the value of $\cos(i/16)\pi$ is multiplied by the power of 2 as shown in FIG. 10 (it is multiplied by $2^{10}=1024$ in FIG. 10.), and its approximate value which can be realized by the shift circuit expressing by the multiplication of addition or subtraction of the power of 2 is obtained.

Described in more details, it is obvious from the original DCT flow that the element P26 must be multiplied by 724 equivalent to $\cos(4/16)\pi$. And as an example, the value of 724 can be rewritten as follows.

$$724 = [(2^5 - 2^1) * (2^2 + 2^1) * 2^1 + 2^1] * 2^1$$

Therefore, from this relation, the configuration of element P26 multiplied by 724 is realized as illustrated in FIG. 1 by the combination of shift multiplier (the operator of power of 2) and adder/subtractor operator (the actual multiplier is disused.)

This design can be realized directly by the signal flow of original fast algorithm of DCT at stages I~IV, i.e., by the multiplication of the coefficient of $\cos(i/16)\pi$ with the combination of Flip-Flop as mentioned above and adder/subtractor operator, and the circuit configuration is obtained by remaining the part of butterflies. For this purpose, the circuit scale of FDCT in FIG. 1 and IDCT in FIG. 2 is becoming large, and in the transform processing of FDCT and IDCT, because of the usage of many Flip-Flops, the computing time which depends on the stage numbers of Flip-Flops is required, it takes much time in the compution.

In this invention, the conventional fast algorithm is ignored at this stage, and original computing equations of DCT and concrete computing equations in FIGS. 1 and 2 are paid attentions.

The original computing equations of DCT are defined in Eqs. 3~10, if the sum of two terms at stage I is defined as Eq. 40, the computing equation of FDCT in FIG. 1 is rewritten by Eq. 41.

$$\begin{aligned}(f0 + f7) \times 2 &= a0, (f0 - f7) \times 2 = b3 \\ (f1 + f6) \times 2 &= a1, (f1 - f6) \times 2 = b2 \\ (f2 + f5) \times 2 &= a2, (f2 - f5) \times 2 = b1 \\ (f3 + f4) \times 2 &= a3, (f3 - f4) \times 2 = b0\end{aligned} \quad [\text{Eq. 40}]$$

$$\begin{aligned}F0 &= (181a0 + 181a1 + 181a2 + 181a3) \times 16384 \\ F4 &= (181a0 - 181a1 - 181a2 + 181a3) \times 16384 \\ F2 &= (473a0 + 196a1 - 196a2 - 474a3) \times 8192 \\ F6 &= (196a0 - 473a1 + 473a2 - 196a3) \times 8192 \\ F1 &= (64256b3 + 54481b2 + 36381b1 + 12800b0) \times 64 \\ F7 &= (12800b3 - 36381b2 + 54481b1 - 64256b0) \times 64 \\ F3 &= (54528b3 - 12851b2 - 64255b1 - 36352b0) \times 64 \\ F5 &= (36352b3 - 64255b2 + 12851b1 + 54528b0) \times 64\end{aligned} \quad [\text{Eq. 41}]$$

If Eq. 41 is approximated by a simple equation, its coefficients or $\cos(i/16)\pi$ can be expressed by the integral ratio of figures as few as possible, and the equations which can reduce the approximate error is found out neuristically. Finally, Eq. 42 is obtained successfully.

$$F0 = (92a0 + 92a1 + 92a2 + 92a3) = 128 \quad [\text{Eq. 42}]$$

$$F4 = (92a0 - 92a1 - 92a2 + 92a3) \times 128$$

$$F2 = (240a0 + 100a1 - 100a2 - 240a3) \times 64$$

$F6=(100a0-240a1+240a2-100a3)\times 64$ $F7=(17b3-48b2+72b1-85b0)\times 192$ $F3=(72b3-17b2-85b1-48b0)\times 192$ $F5=(48b3-85b2+17b1+72b0)\times 192$ $F1=(85b3+72b2+48b1+17b0)\times 192$ The Eq. 42 can be rewritten as following Eq. 43.

$$\begin{aligned}
F0 &= \{(a0+a3)\times 16 + (a1+a2)\times 16\}\times 2\times 8\times 46 \\
F4 &= \{(a0+a3)\times 16 - (a1+a2)\times 16\}\times 2\times 8\times 46 \\
F6 &= \{(a0-a3)\times 40 - (a1-a2)\times 96\}\times 2\times 8\times 10 \\
F2 &= \{(a0-a3)\times 96 + (a1-a2)\times 40\}\times 2\times 8\times 10
\end{aligned}$$
[Eq. 43]

$F7 = [\{48\times(b1+b2)+(68\times b3)\}\times 2] \times 2 -$ $[\{48\times(b2-b1)+(68\times b0)\}\times 2]\times 10]\times 12$ $F3 = [\{\{96\times b3)-68\times(b1+b2)\}\times 2]\times 6 -$ $[\{(96\times b0)-68\times(b2-b1)\}\times 2]\times 4]\times 12$ $F5 = [\{\{96\times b0)-68\times(b2-b1)\}\times 2]\times 6 +$ $[\{(96\times b3)-68\times(b1+b2)\}\times 2]\times 4]\times 12$ $F1 = [\{48\times(b2-b1)+(68\times b0)\}\times 2]\times 2 +$ $[\{48\times(b1+b2)+(68\times b3)\}\times 2]\times 10]\times 12$ Based on Eq. 43, version 1 of the data transform computing device as described later is obtained.

It is useful to compare the Eqs. 41 and 42 as mentioned above. In the expression of F0 (Eq. 41) in FDCT of FIG. 1, (f0+f1+...+f7) is multiplied by $181\times 16384\times 2=724\times 2^{12}$, where the value of 724 is the approximate value of $(1/\sqrt{2})\times 2^{10}$. By overlooking the original expression of F0 (Eq. 3) in FDCT again, it is obvious that (f0+f1+...+f7) is multiplied by $\sqrt{2}/4(=\frac{1}{2}\cdot\cos(\frac{4}{16})\pi)$.

Similarly, in the expression of F0 in Eq. 42, (f0+f1+...+f7) is multiplied by $92\times 128=23\times 512=23\times 2^9$.

By examining the relative gain G of the output ratio of FDCT in FIG. 1 and FDCT in Eq. 42, for output case, the terms of power of 2 which depend on the position of decimal points (it can be solved by timing shift when the data is read in.) can be ignored.

Therefore, the relative gain G becomes $23\div(1/\sqrt{2})=23\sqrt{2}$, and the variation of gain for each DCT computation is shown in Eq. 44.

$$G = \frac{2\times 23\sqrt{2}}{64} = 1.016466 \approx \frac{65}{64}$$
[Eq. 44]

According to this result, when 2-dimensional DCT is implemented in the case like image processing, it is necessary to modify the the quantization table by multiplying 4232/4095=1.033203 which is generated by the second power of this relative gain.

The modified quantization table can be employed in the quantizing device for the future implementations.

In the next, for the modification of Eq. 42, the determination of the value of $\cos(i/16)\pi$ is described as follows. As mentioned above, depending on the relative gain G, it is different from the cases of FDCT and IDCT in FIGS. 1 and 2, and 1.0 are not expressed by power of 2, they are expressed by the multiplication of power of 2 and the relative gain G, i.e., with the modification as shown in Eq. 42, 1.0 are expressed by $2^8\times G = 260.2153$. Therefore, $\cos(i/16)\pi$ are expressed by FIG. 24 which will be used later.

Corresponding to the matrix computation in each stage of FDCT and IDCT, in $\cos(i/16)\pi$, the values divided the approximate values by 3 for the cos $(i/16)\pi$=odd and 4 for the case of i=even are employed.

Based on Principle I, the value of $\cos(i/16)\pi$ is modified from the value in FIG. 10 to that in FIG. 24, but the error percentage is not changed so much, so that it is evident that this approximation can not affect the results in the processing.

By replacing the values of $\cos(i/16)\pi$ with integral values, the circuit scale is reduced and the computing time is saved, but the new problem arised here is that the symmetry of FDCT and IDCT is broken partly, i.e., when FDCT and IDCT are expressed by the connection of several stages, the outbreak of symmetry can be found in some particular stages. This means that the implementation of FDCT and IDCT becomes difficult just by changing the connecting relations of stages with the same circuit configurations.

In this invention, by providing the particular circuits (exclusive circuits as shown in the parts with F and I later.) which are employed only for FDCT and IDCT, respectively, the way of overcoming this problem is tried, i.e., the circuits with F are used only for FDCT and bypassed for IDCT, and the circuits with I used only for IDCT and bypassed for FDCT.

Data Transform Computing Device Ver. 1

Figure 22:
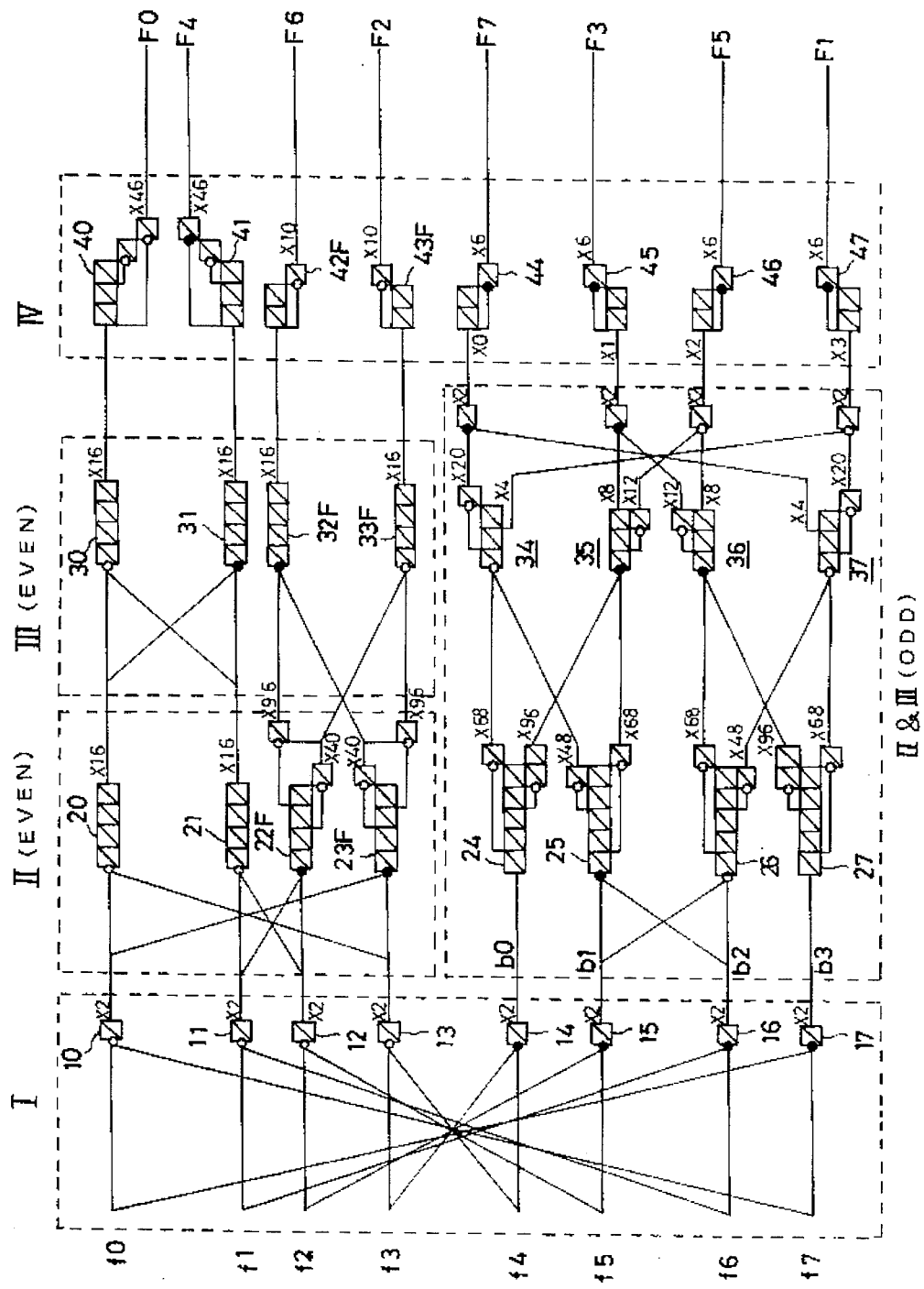
FIG. 22 is the circuitry of the first version (Ver. 1) FDCT of the data transform computing device conformable to this invention.
Figure 23:
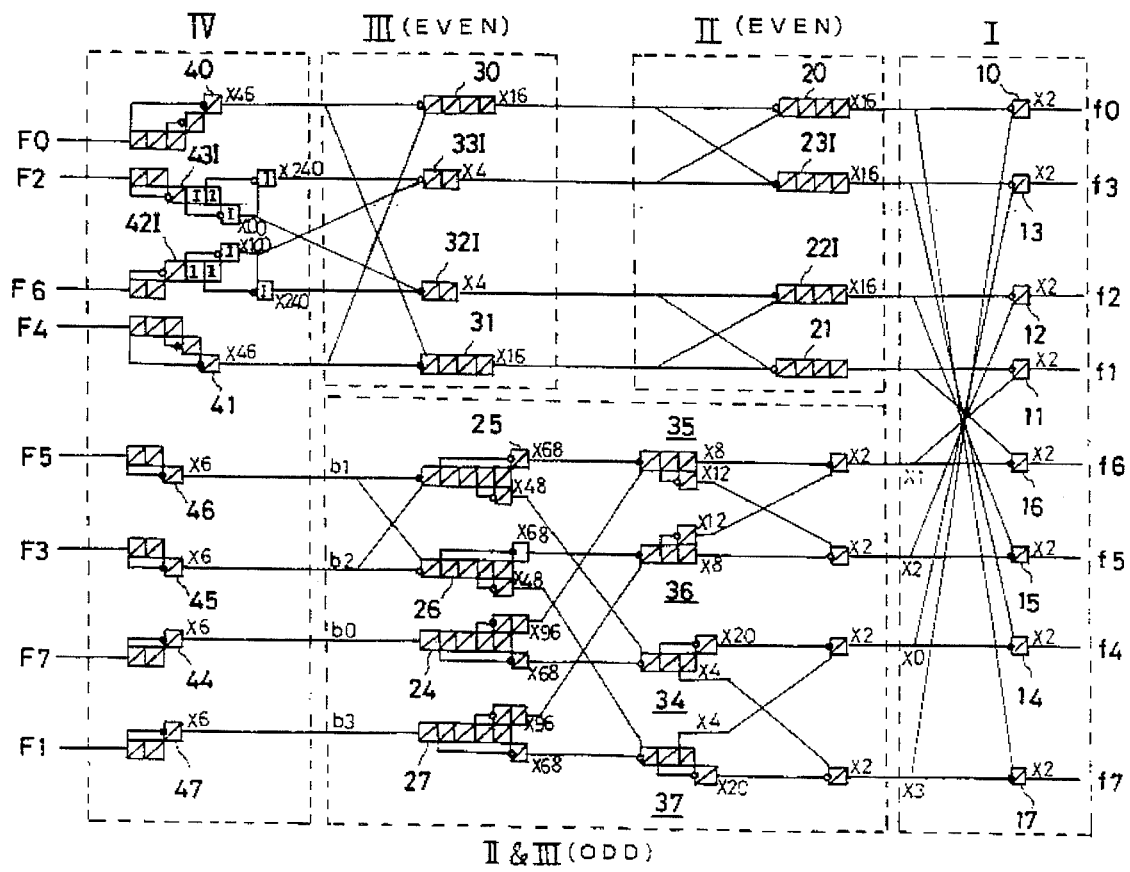
FIG. 23 shows up the circuitry of the first version (Ver. 1) IDCT of the same computing device.

Based on the above-mentioned principle I, the circuit configuration (signal flow) Version 1 of the data transform computing device is described. FIGS. 22 and 23 are the circuits for the implementation of FDCT and IDCT, respectively. The algorithm in FIG. 22 is based on Eq. 43. With rewriting Eq. 43, for outputs F0, F4, F6, F2, F7, F3, F5, F1, the inputs f0, f1, f2, f3, f4, f5, f6, f7 and their relations with stages I, II(even), III(even), II & III (odd), IV and element numbers are shown as in the following Eqs. 45~52.

$F0 = [\{((f0+f7)\times 2+(f3+f4)\times 2)\times 16$
    I   I   I   I   II(even)
    10  10  13  13  20

$+ ((f1+f6)\times 2+(f2+f5)\times 2)\times 16\}\times 16]\times 46$
III(even) I  I   I   I  II(even) III(even) IV
   30    11  11  12  12   21       30      40

[Eq. 45]

$$F4 = [\{((f0+f7)\times 2 + (f3+f4)\times 2)\times 16 \quad \text{[Eq. 46]}$$

I I I I II(even)
10 10 13 13 20

$$- ((f1+f6)\times 2 + (f2+f5)\times 2)\times 16 \} \times 16 ] \times 46$$

III(even) I I I I II(even) III(even) IV
31 11 11 12 12 21 31 41

$$F6 = [\{((f0+f7)\times 2 \quad - \quad (f3+f4)\times 2)\times 40 \quad \text{[Eq. 47]}$$

I I II(even) I I II(even)
10 10 23F 13 13 23F $$- ((f1+f6)\times 2 \quad - \quad (f2+f5)\times 2)\times 96 \} \times 16 ] \times 10$$

III(even) I I II(even) I I II(even) III(even) IV
32F 11 11 22F 12 12 22F 32F 42F $$F2 = [\{((f1+f6)\times 2 \quad - \quad (f2+f5)\times 2)\times 40 \quad \text{[Eq. 48]}$$

I I II(even) I I II(even)
11 11 22F 12 12 22F $$+ ((f0+f7)\times 2 \quad - \quad (f3+f4)\times 2)\times 96 \} \times 16 ] \times 10$$

III(even) I I II(even) I I II(even) III(even) IV
33F 10 10 23F 13 13 23F 33F 43F $$F7 = [[\{((f0-f7)\times 2)\times 68 \quad + \quad ((f1-f6)\times 2 \quad + \quad (f2-f5)\times 2)\times 48 \} \times 4 \quad \text{[Eq. 49]}$$

I I II&III II&III I I II&III I I II&III II&III
(odd) (odd) (odd) (odd) (odd)
17 17 27 37 16 16 26 15 15 26 37

$$- \{((f3-f4)\times 2)\times 68 \quad + \quad ((f1-f6)\times 2 \quad - \quad (f2-f5)\times 2)\times 48\}$$

II&III I I II&III II&III I I II&III I I II&III
(odd) (odd) (odd) (odd) (odd)
34 14 14 24 34 16 16 25 15 15 25

$$\times 20 ] \times 2 ] \times 6$$

II&III II&III IV
(odd) (odd)
34 34 44

$$F3 = [[\{((f0-f7)\times 2)\times 96 \quad - \quad ((f1-f6)\times 2 \quad + \quad (f2-f5)\times 2)\times 68 \} \times 12 \quad \text{[Eq. 50]}$$

I I II&III II&III I I II&III I I II&III II&III
(odd) (odd) (odd) (odd) (odd)
17 17 27 36 16 16 26 15 15 26 36

$$- \{((f3-f4)\times 2)\times 96 \quad - \quad ((f1-f6)\times 2 \quad - \quad (f2-f5)\times 2)\times 68\}$$

I I II&III II&III I I II&III I I II&III
(odd) (odd) (odd) (odd)
14 14 24 35 16 16 25 15 15 25

$$\times 8 ] \times 2 ] \times 6$$

II&III II&III IV
(odd) (odd)
35 35 45

$$F5 = [[\{((f0-f7)\times 2)\times 96 \quad + \quad ((f1-f6)\times 2 \quad + \quad (f2-f5)\times 2)\times 68 \} \times 8 \quad \text{[Eq. 51]}$$

I I II&III II&III I I II&III I I II&III II&III
(odd) (odd) (odd) (odd) (odd)
17 17 27 36 16 16 26 15 15 26 36

-continued
$$+ \{((f3-f4)\times 2)\times 96 \underbrace{\underbrace{}_{\text{II\&III}} \underbrace{}_{\text{I}}}_{\substack{\text{(odd)}\\36}} \underbrace{\underbrace{}_{\text{I}} \underbrace{}_{\text{II\&III}}}_{\substack{14\ 14\ 24}} \underbrace{\underbrace{}_{\text{II\&III}}}_{\substack{\text{(odd)}\\35}} + \underbrace{((f1-f6)\times 2}_{\substack{\text{I}\ \text{I}\\16\ 16}} - \underbrace{(f2-f5)\times 2)\times 68\}}_{\substack{\text{II\&III}\ \text{I}\ \text{I}\ \text{II\&III}\\ \text{(odd)}\qquad\text{(odd)}\\25\ 15\ 15\ 25}}$$

$$\underbrace{\times 12\ ]\ \times 2\ \}\ \times 6}_{\substack{\text{II\&III}\ \text{II\&III}\ \text{IV}\\ \text{(odd)}\ \text{(odd)}\\35\ 36\ 46}}$$

$$F1 = [[\{((f0-f7)\times 2)\times 68 \underbrace{\underbrace{}_{\text{I}} \underbrace{}_{\text{I}\ \text{II\&III}\ \text{II\&III}}}_{\substack{17\ 17\ 27\ \text{(odd)}\ \text{(odd)}\\37}} + \underbrace{((f1-f6)\times 2}_{\substack{\text{I}\ \text{I}\ \text{II\&III}\\16\ 16\ \text{(odd)}\\26}} + \underbrace{(f2-f5)\times 2)\times 48\ \}\times 20}_{\substack{\text{I}\ \text{I}\ \text{II\&III}\ \text{II\&III}\\15\ 15\ \text{(odd)}\ \text{(odd)}\\26\ 37}} \qquad\qquad\text{[Eq. 52]}$$

$$+ \{((f3-f4)\times 2)\times 68 \underbrace{\underbrace{}_{\text{II\&III}}\underbrace{}_{\text{I}}}_{\substack{\text{(odd)}\\37}} \underbrace{\underbrace{}_{\text{I}\ \text{II\&III}\ \text{II\&III}}}_{\substack{14\ 14\ 24\ \text{(odd)}\ \text{(odd)}\\34}} + \underbrace{((f1-f6)\times 2}_{\substack{\text{I}\ \text{I}\\16\ 16}} - \underbrace{(f2-f5)\times 2)\times 48\}}_{\substack{\text{II\&III}\ \text{I}\ \text{I}\ \text{II\&III}\\ \text{(odd)}\qquad\text{(odd)}\\25\ 15\ 15\ 25}}$$

$$\underbrace{\times 4\ ]\ \times 2\ \}\ \times 6}_{\substack{\text{II\&III}\ \text{II\&III}\ \text{IV}\\ \text{(odd)}\ \text{(odd)}\\34\ 37\ 47}}$$

In FIG. 22, the elements are numbered according to the above-mentioned FIGS. 3–5, and the circuits marked by F in Flip-Flops are the particular circuits which are employed only for FDCT as described before. Similarly, the circuits marked by I in FIG. 23 are the particular circuits which are employed only for IDCT. The details will be described later.

In the next, for each stage of FDCT, the matrices will be obtained and its transform characteristics will be discussed.

First of all, for stage I, the matrix is orthogonal matrix (The extended orthogonal matrix is also called orthogonal matrix in below descriptions.) as described before in Eqs. 12 and 13.

Next, F7, F3, F5, F1 in stage 1V which is matrix at odd number side [IV(odd)] is orthogonal matrix as defined in Eq. 53.

$$[IV(\text{odd})] = \begin{bmatrix} 6 & 0 & 0 & 0 \\ 0 & 6 & 0 & 0 \\ 0 & 0 & 6 & 0 \\ 0 & 0 & 0 & 6 \end{bmatrix} \qquad\text{[Eq. 53]}$$

The matrix [II & III(odd)] in stage II & III (odd) are defined as in Eq. 54.

$$[II\ \&\ III(\text{odd})] = 32 \times \begin{bmatrix} -85 & -48 & +72 & +17 \\ +72 & -85 & +17 & +48 \\ -48 & -17 & -85 & +72 \\ +17 & +72 & +48 & +85 \end{bmatrix} \qquad\text{[Eq. 54]}$$

Based on FIG. 24, because 85, 72, 48, 17 correspond to $\cos(1/16)\pi$, $\cos(3/16)\pi$, $\cos(5/16)\pi$, $\cos(7/16)\pi$, respectively, Eq. 55 is obtained in original and is an orthogonal matrix evidently by computation.

$[II\ \&\ III\ (\text{odd})]\ \text{origin} =$ [Eq. 55]

-continued
$$\begin{bmatrix} -\cos\frac{1}{16}\pi & -\cos\frac{5}{16}\pi & \cos\frac{3}{16}\pi & \cos\frac{7}{16}\pi \\ +\cos\frac{3}{16}\pi & -\cos\frac{1}{16}\pi & \cos\frac{7}{16}\pi & \cos\frac{5}{16}\pi \\ -\cos\frac{5}{16}\pi & -\cos\frac{7}{16}\pi & -\cos\frac{1}{16}\pi & \cos\frac{3}{16}\pi \\ +\cos\frac{7}{16}\pi & \cos\frac{3}{16}\pi & +\cos\frac{5}{16}\pi & \cos\frac{1}{16}\pi \end{bmatrix}$$

In the next, F0, F4, F6, F2 at even number side of stage II(even), III(even) and IV becomes matrix [II, III and IV (even)] as defined in Eq. 56.

$$[II\cdot III\cdot IV\ (\text{even})] = 2^8 \begin{bmatrix} 46 & 46 & 25 & 60 \\ 46 & -46 & -60 & 25 \\ 46 & -46 & 60 & -25 \\ 46 & 46 & -25 & -60 \end{bmatrix} \qquad\text{[Eq. 56]}$$

Based on FIG. 24, because 60, 46, 25 correspond to $\cos(2/16)\pi$, $\cos(4/16)\pi$, $\cos(6/16)\pi$, respectively, Eq. 57 is obtained in original and is an orthogonal matrix evidently by computation.

$[II\cdot III\cdot IV\ (\text{even})]\ \text{origin} =$ [Eq. 57]

$$\begin{bmatrix} \cos\frac{4}{16}\pi & \cos\frac{4}{16}\pi & \cos\frac{6}{16}\pi & \cos\frac{2}{16}\pi \\ \cos\frac{4}{16}\pi & -\cos\frac{4}{16}\pi & -\cos\frac{2}{16}\pi & \cos\frac{6}{16}\pi \\ \cos\frac{4}{16}\pi & -\cos\frac{4}{16}\pi & \cos\frac{2}{16}\pi & -\cos\frac{6}{16}\pi \\ \cos\frac{4}{16}\pi & \cos\frac{4}{16}\pi & -\cos\frac{6}{16}\pi & -\cos\frac{2}{16}\pi \end{bmatrix}$$

Therefore, in this example, as in the case of above-mentioned circuit configuration (signal flow) in FIGS. 1 and 2, the orthogonality of each matrix in the circuit elements is remained, but the orthogonality of each stage is lost.

The word of stage will continue to be used in the following descriptions for convenience, but its meaning is different to that in FIGS. 1 and 2.

For the future progress, in the stage II & III (odd) in FIG. 22, the relation between inputs b0, b1, b2, b3 and X0, X1, X2, X3 is given by Eq. 58.

$$X0 = (-85b0 + 72b1 - 48b2 + 17b3) \times 32 \quad [\text{Eq. 58}]$$

$$X1 = (-48b0 - 85b1 - 17b2 + 72b3) \times 32$$

$$X2 = (72b0 + 17b1 - 85b2 + 48b3) \times 32$$

$$X3 = (17b0 + 48b1 + 72b2 + 85b3) \times 32$$

This just a rewriting of the matrix in Eq. 54.

As for FDCT in FIG. 22, IDCT is configured as in FIG. 23. For the outputs of f0, f3, f2, f1, f6, r5, t4, f7 in FIG. 23, the inputs F0, F2, F6, F4, F5, F3, F7, F1 and their relations with stages I, II (even), III(even), II & III(odd), IV and element numbers are shown as in the following Eqs. 59~66.

$$f0 = [((F0 \times 46 + F4 \times 46) \times 16 + (F2 \times 240 + F6 \times 100) \times 4) \times 16 \quad [\text{Eq. 59}]$$
$$+ \{(F7 \times 6 \times 68 + (F3 \times 6 - F5 \times 6) \times 48) \times 4 + (F1 \times 6 \times 68 +$$
$$(F3 \times 6 + F5 \times 6) \times 48) \times 20\} \times 2] \times 2$$

$$f3 = [((F0 \times 46 + F4 \times 46) \times 16 - (F2 \times 240 + F6 \times 100) \times 4) \times 16 \quad [\text{Eq. 60}]$$
$$+ \{(F1 \times 6 \times 68 + (F3 \times 6 + F5 \times 6) \times 48) \times 4 - (F7 \times 6 \times 68 +$$
$$(F3 \times 6 - F5 \times 6) \times 48) \times 20\} \times 2] \times 2$$

$$f2 = [((F0 \times 46 - F4 \times 46) \times 16 - (F2 \times 100 - F6 \times 240) \times 4) \times 16 \quad [\text{Eq. 61}]$$
$$+ \{(F7 \times 6 \times 96 - (F3 \times 6 - F5 \times 6) \times 68) \times 12 + (F1 \times 6 \times 96 -$$
$$(F3 \times 6 + F5 \times 6) \times 68) \times 8\} \times 2] \times 2$$

$$f1 = [((F0 \times 46 - F4 \times 46) \times 16 + (F2 \times 100 - F6 \times 240) \times 4) \times 16 \quad [\text{Eq. 62}]$$
$$+ \{(F1 \times 6 \times 96 - (F3 \times 6 + F5 \times 6) \times 68) \times 12 - (F7 \times 6 \times 96 -$$

$$(F3 \times 6 \quad - \quad F5 \times 6) \times 68) \times 8\} \times 2] \times 2$$

```
     IV   II&III   IV   II&III  II&III  II&III   I
          (odd)        (odd)   (odd)   (odd)
     45    26     45    26      35      35      11
```

$$f6 = [((F0 \times 46 \quad - \quad F4 \times 46) \times 16 \quad + \quad (F2 \times 100 \quad - \quad F6 \times 240) \times 4) \times 16 \quad \text{[Eq. 63]}$$

```
     IV    III    IV   III   II   IV   III   IV   III   II
          (even)     (even)(even)    (even)     (even)(even)
     40    31    41   31    21   43I  32I  42I  32I   21I
```

$$- \{(F1 \times 6 \times 96 \quad - \quad (F3 \times 6 \quad + \quad F5 \times 6) \times 68) \times 12 \quad - \quad (F7 \times 6 \times 96 \quad -$$

```
 I   IV   II&III II&III  IV   II&III  IV   II&III II&III  IV   II&III II&III
     (odd) (odd)      (odd)      (odd)  (odd)      (odd)  (odd)
 16  47    27    36   45    26   46    26    36    35   44    24    35
```

$$(F3 \times 6 \quad - \quad F5 \times 6) \times 68) \times 8\} \times 2] \times 2$$

```
     IV   II&III   IV   II&III  II&III  II&III   I
          (odd)        (odd)   (odd)   (odd)
     45    26     45    26      35      35      16
```

$$f5 = [((F0 \times 46 \quad - \quad F4 \times 46) \times 16 \quad - \quad (F2 \times 100 \quad - \quad F6 \times 240) \times 4) \times 16 \quad \text{[Eq. 64]}$$

```
     IV    III    IV   III   II   IV   III   IV   III   II
          (even)     (even)(even)    (even)     (even)(even)
     40    31    41   31    22I  43I  33I  42I  32I   22I
```

$$- \{(F7 \times 6 \times 96 \quad - \quad (F3 \times 6 \quad - \quad F5 \times 6) \times 68) \times 12 \quad + \quad (F1 \times 6 \times 96 \quad -$$

```
 I   IV   II&III II&III  IV   II&III  IV   II&III II&III  IV   II&III II&III
     (odd) (odd)      (odd)      (odd)  (odd)      (odd)  (odd)
 15  44    24    35   45    25   46    25    35    35   47    27    36
```

$$(F3 \times 6 \quad + \quad F5 \times 6) \times 68) \times 8\} \times 2] \times 2$$

```
     IV   II&III   IV   II&III  II&III  II&III   I
          (odd)        (odd)   (odd)   (odd)
     45    26     46    26      36      36      15
```

$$f4 = [((F0 \times 46 \quad + \quad F4 \times 46) \times 16 \quad - \quad (F2 \times 240 \quad + \quad F6 \times 100) \times 4) \times 16 \quad \text{[Eq. 65]}$$

```
     IV    III    IV   III   II   IV   III   IV   III   II
          (even)     (even)(even)    (even)     (even)(even)
     40    30    41   30    23I  43I  33I  42I  33I   23I
```

$$- \{(F1 \times 6 \times 68 \quad + \quad (F3 \times 6 \quad + \quad F5 \times 6) \times 48) \times 4 \quad - \quad (F7 \times 6 \times 68 \quad +$$

```
 I   IV   II&III II&III  IV   II&III  IV   II&III II&III  IV   II&III II&III
     (odd) (odd)      (odd)      (odd)  (odd)      (odd)  (odd)
 14  47    27    37   45    26   46    26    37    34   44    24    34
```

$$(F3 \times 6 \quad - \quad F5 \times 6) \times 48) \times 20\} \times 2] \times 2$$

```
     IV   II&III   IV   II&III  II&III  II&III   I
          (odd)        (odd)   (odd)   (odd)
     45    25     46    25      34      34      14
```

$$f7 = [((F0 \times 46 \quad + \quad F4 \times 46) \times 16 \quad + \quad (F2 \times 240 \quad + \quad F6 \times 100) \times 4) \times 16 \quad \text{[Eq. 66]}$$

```
     IV    III    IV   III   II   IV   III   IV   III   II
          (even)     (even)(even)    (even)     (even)(even)
     40    30    41   30    20   43I  33I  42I  33I   20
```

$$- \{(F7 \times 6 \times 68 \quad + \quad (F3 \times 6 \quad - \quad F5 \times 6) \times 48) \times 4 \quad + \quad (F1 \times 6 \times 68 \quad +$$

```
 I   IV   II&III II&III  IV   II&III  IV   II&III II&III  IV   II&III II&III
     (odd) (odd)      (odd)      (odd)  (odd)      (odd)  (odd)
 17  44    24    34   45    25   46    25    34    37   47    27    27
```

$$(F3 \times 6 \quad + \quad F5 \times 6) \times 48) \times 20\} \times 2] \times 2$$

```
     IV   II&III   IV   II&III  II&III  II&III   I
          (odd)        (odd)   (odd)   (odd)
     45    26     46    26      37      37      17
```

To IDCT in FIG. 23, by computing the matrix of each element just like FDCT in FIG. 22, the orthogonality is remained, where IDCT corresponds to FDCT in FIG. 22.

This description also can be explained in more details, that is, by computing the matrix [II·III·IV (even)] in FIG. 22, F0, F4, F6, F2 are obtained from a0, a1, a2, a3 (refer to Eq. 40), from the relation of inverse matrix, the results can be obtained from F0, F4, F6, F2 by computing the matrix of [II·III·IV (even)]$^{-1}$.

Because this matrix is orthogonal, its transpose matrix equals to its inverse matrix. These relations are shown in Eqs. 67~69.

$$(a0, a1, a2, a3) [II·III·IV (even)]=(F0, F4, F6, F2) \quad [Eq. 67]$$

$$(F0, F4, F6, F2) [II·III·IV (even)]^{-1}=(a0, a1, a2, a3) \quad [Eq. 68]$$

$$(F0, F4, F6, F2) [II·III·IV (even)]^{t}=(a0, a1, a2, a3) \quad [Eq. 69]$$

where [II·III·IV (even)]$^{t}$ corresponds to the matrix [IV·III·II (even)] IDCT of stages IV, III (even), II(even) in FIG. 23 and becomes Eq. 70.

$$[IV \cdot III \cdot II(even)]_{IDCT} = 2^8 \begin{bmatrix} 46 & 46 & 46 & 46 \\ 46 & -46 & -46 & 46 \\ 25 & -60 & 60 & 25 \\ 60 & 25 & -25 & -60 \end{bmatrix} \quad [Eq. 70]$$

$$= 2^8 \begin{bmatrix} 46 & 46 & 25 & 60 \\ 46 & -46 & -60 & 25 \\ 46 & -46 & 60 & -25 \\ 46 & 46 & -25 & -60 \end{bmatrix}^{t}$$

$$= [II \cdot III \cdot IV(even)]^{t}$$

In the next, by computing the matrices [II & III (odd)][IV (odd)] in FIG. 22, F7, F3, F5, F1 are obtained from b0, b1, b2, b3 (refer to Eq. 40), from the relations of inverse matrix, the results can be obtained from F5, F3, F7, F1 by computing the matrix of [IV (odd)]$^{-1}$ [II & III (odd)]$^{-1}$. In FIG. 23, compared to FIG. 22, the substitution of F7 and F7 is necessary.

Then, because every matrix is orthogonal, its transpose matrix equals to its inverse matrix. These relations are shown in Eqs. 71~73.

$$(b0, b1, b2, b3) [II \& III (odd)][IV (odd)]=(F7, F3, F5, F1) \quad [Eq. 71]$$

$$(F7, F3, F5, F1) [IV (odd)]^{t} [II \& III (odd)]^{t}=(b0, b1, b2, b3) \quad [Eq. 72]$$

$$(F7, F3, F5, F1) [IV (odd)]^{t} [II \& III (odd)]^{t}=(b0, b1, b2, b3) \quad [Eq. 73]$$

The matrix [IV (odd)]$^{t}$ equals to matrix [IV (odd)] or matrix in Eq. 53, and the matrix [II & III (odd)]$^{t}$ corresponds to matrix [II & III (odd)] IDCT in FIG. 23 and becomes Eq. 74.

$$[II \& III (odd)]_{IDCT} = 32 \begin{bmatrix} -85 & +72 & -48 & +17 \\ -48 & -85 & -17 & +72 \\ +72 & +17 & -85 & +48 \\ +17 & +48 & +72 & +85 \end{bmatrix} \quad [Eq. 74]$$

$$= 32 \begin{bmatrix} -85 & -48 & +72 & +17 \\ +72 & -85 & +17 & +48 \\ -48 & -17 & -85 & +72 \\ +17 & +72 & +48 & +85 \end{bmatrix}^{t}$$

$$= [II \& III (odd)]^{t}$$

From above description, it is clear that FDCT in FIG. 22 corresponds to IDCT in FIG. 23 completely.

Relating FIG. 23, the computation of stage II & III (odd) can be written in the following Eq. 75.

$$b0=(-85\times0-48\times1+72\times2+17\times3)\times32 \quad [Eq. 75]$$

$$b1=(+72\times0-85\times1+17\times2+48\times3)\times32$$

$$b2=(-48\times0-17\times1-85\times2+72\times3)\times32$$

$$b3=(+17\times0+72\times1+48\times2+85\times3)\times32$$

where the outputs of elements 46, 45, 44, 47 are X1, X2, X0, X3, and the outputs of elements 35, 36, 34, 37 are b2, b1, b0, b3. By comparing the computing processings of Eq. 58 or stage II & III (odd) of FDCT and stage II & III (odd) defined in Eq. 75, and substituting b0 with X0, b1 with X2, b2 with X1, b3 with X3, Eq. 75 becomes Eq. 58.

Therefore, this result also means that, for IDCT in FIG. 23, the computation is implemented by connecting signal lines corresponding to b0 input of FDCT for F7, b2 input of FDCT for F3, b1 input of FDCT for F3 and b3 input of FDCT for F1.

FIG. 25 illustrates the values of each element in matrix (Eq. 76) of inputs f0, f1, f2, f3, f4, f5, f6, f7 corresponding to outputs F0, F1, F2, F3, F4, F5, F6, F7 of FDCT in FIG. 22.

Eq. 76]

$$(F0, F1, F2, F3, F4, F5, F6, F7)=(f0, f1, f2, f3, f4, f5, f6, f7)$$
(Matrix in FIG. 25)

In the matrix of FIG. 25, the values in parenthesis are those divided by $2^7=128$, by comparing these values with the approximate values of $\cos(i/16)\pi$ in FIG. 24, it is obvious that the original matrix in FIG. 25 is an orthogonal matrix just like the original matrix. Then, in the case of IDCT, the matrix of outputs f0, f1, f2, f3, f4, f5, f6, f7 related to inputs F0, F1, F2, F3, F4, F5, F6, F7 is the transpose matrix in FIG. 25.

The concrete configurations of the above-mentioned data transform computing device are described as follows.

Regarding FDCT and IDCT, as described before, the circuit configurations in each stage of I, II (even), III (even), II & III (odd)), IV can be used commonly, except the particular circuits (The parts with F arraged at Flip-Flops are the particular circuits used only for FDCT, and the parts with I arraged at Flip-Flops are the particular circuits used only for IDCT.).

Described in details, for F0, F4, F6, F2 or even number sides, the signal processing is implemented in the order of stages I, II(even), III(even), IV in the case of FDCT and in the order of stages IV, III(even), II(even), I in the case of IDCT, respectively; for F7, F3, F5, F1 or odd number sides, the signal processing is implemented in the order of stages I, II & III (odd), IV in the case of FDCT and in the order of stages IV, II & III (odd), I in the case of IDCT, respectively.

Therefore, in the first part of circuits which configures each stage, the selector of signal lines is provided. By changing the connecting relations of signal lines, the working status of FDCT or IDCT can be realized. Both FDCT and IDCT can be implemented by one circuit configuration.

Figure 26:
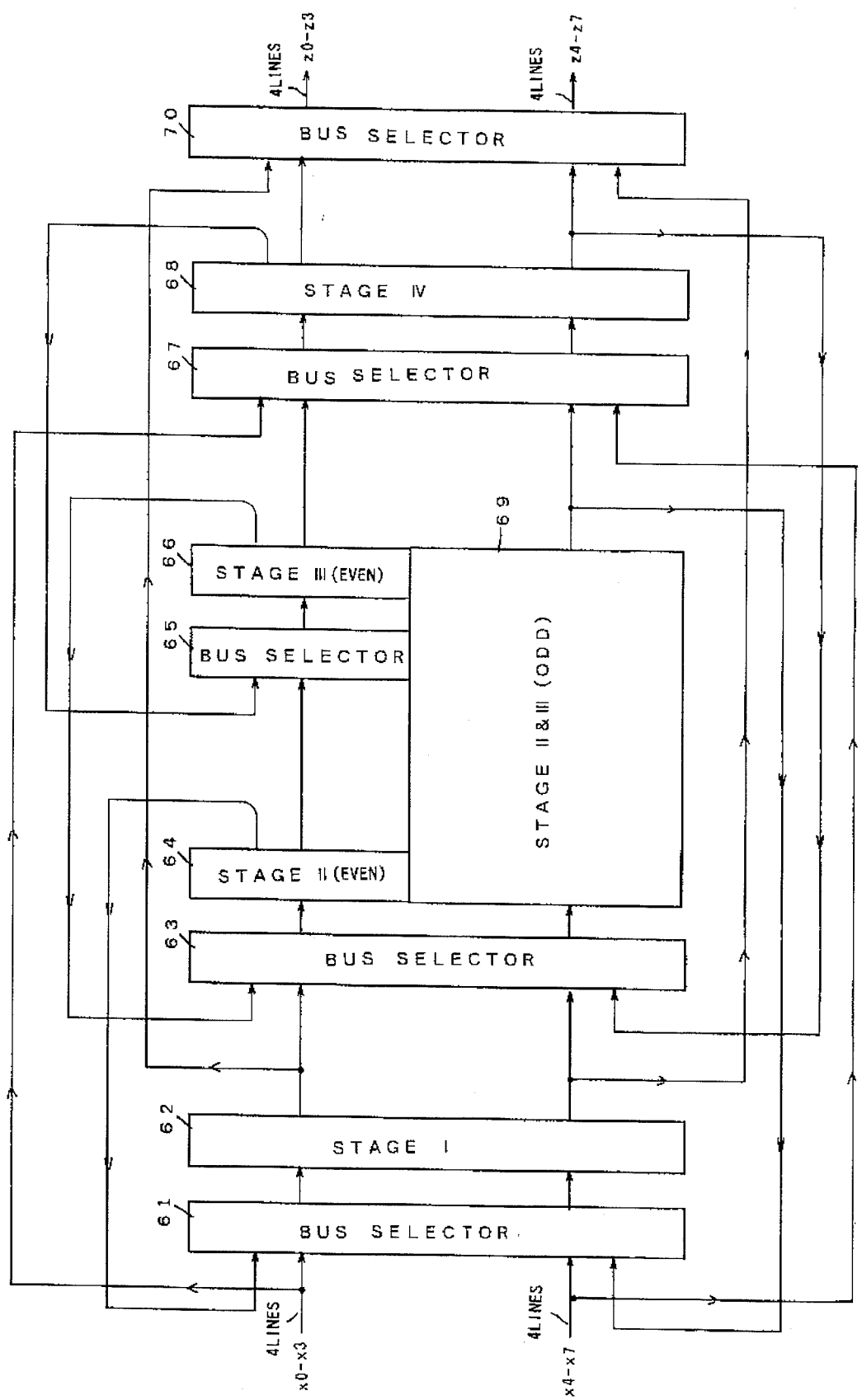
FIG. 26 schematically indicates a signal flow according to which both the FDCT and IDCT are realized by changing the sequences of their respective stages.
Figure 27:
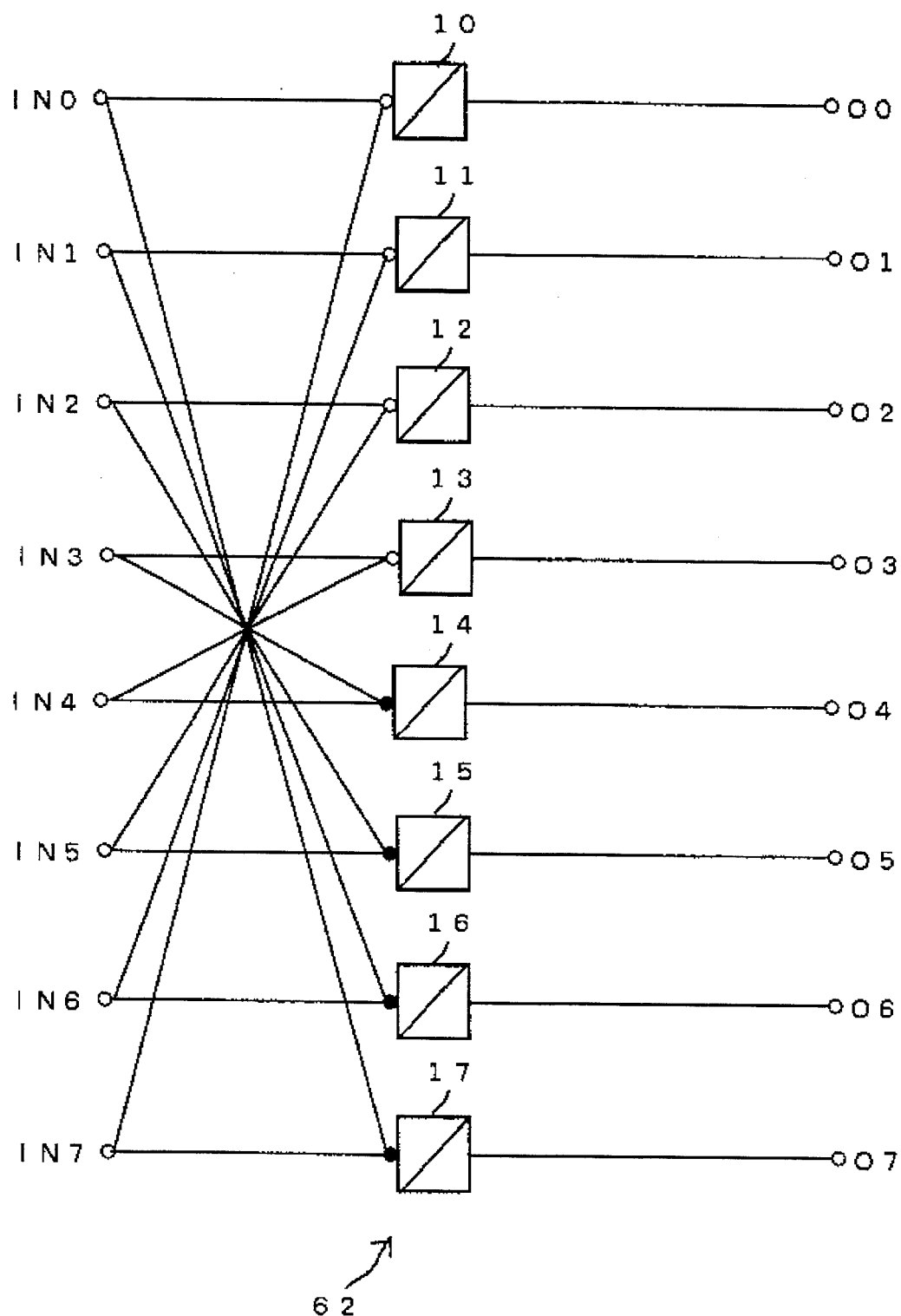
FIG. 27 shows the composition of the circuit 62 in the stage I in FIG. 26.

Based on these ideas, the configuration is illustrated in FIG. 26.

In FIG. 26, the circuit 62 which configures stage I, the circuit 64 which configures stage II (even), the circuit 66 which configures stage III(even), the circuit 68 which configures stage IV and the circuit 69 which configures stage II & III (odd) are illustrated in FIGS. 27, 28, 29, 30 and 31 in details, respectively.

Figure 28:
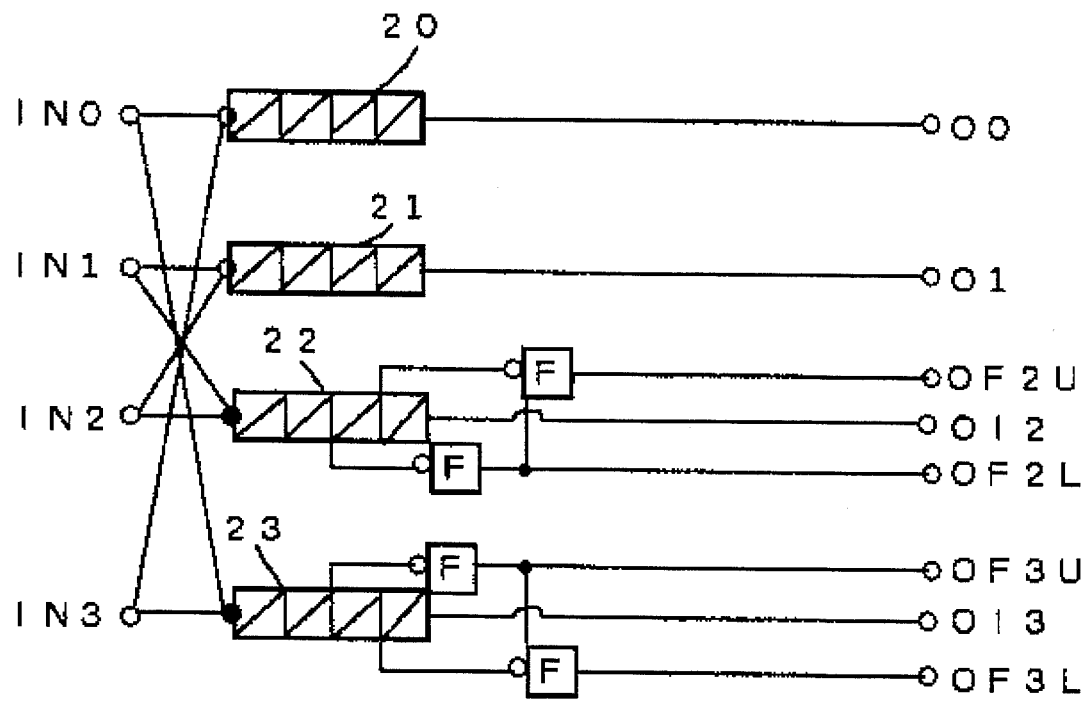
FIG. 28 shows the composition of the circuit 64 in the stage II (even) in FIG. 26.
Figure 29:
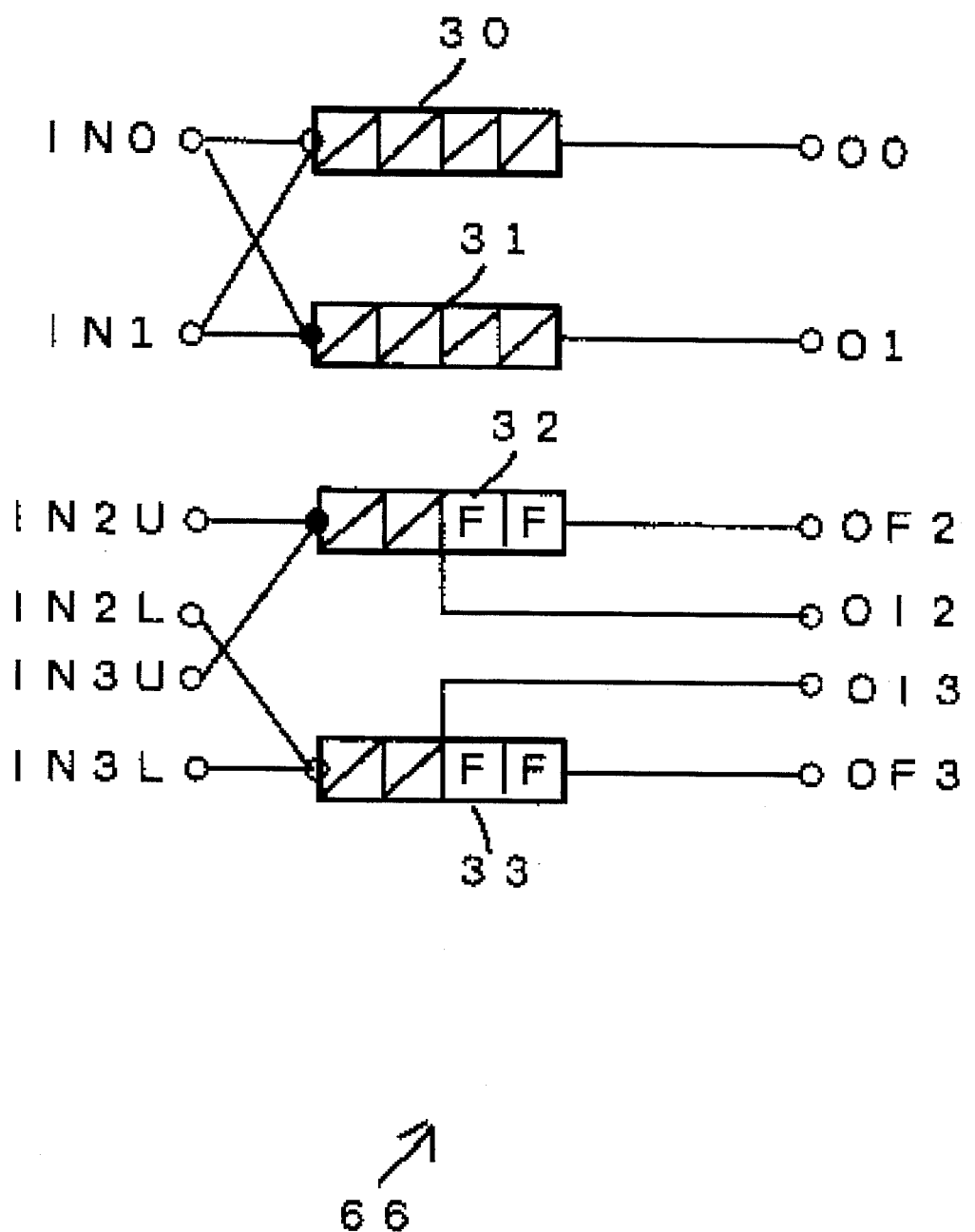
FIG. 29 shows the composition of the circuit 66 in the stage III (even) in FIG. 26.
Figure 30:
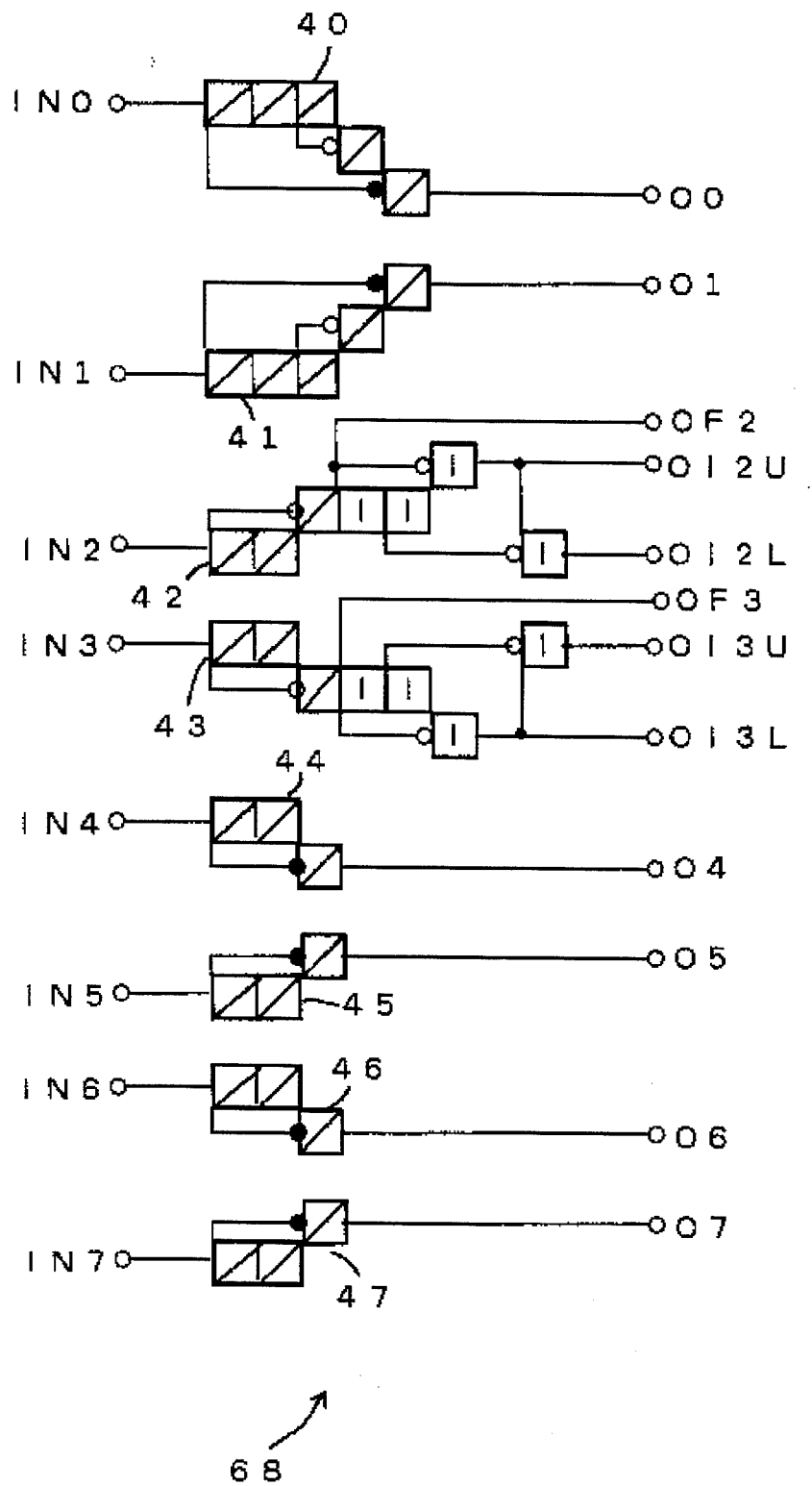
FIG. 30 shows the composition of the circuit 68 in the stage IV in FIG. 26.
Figure 31:
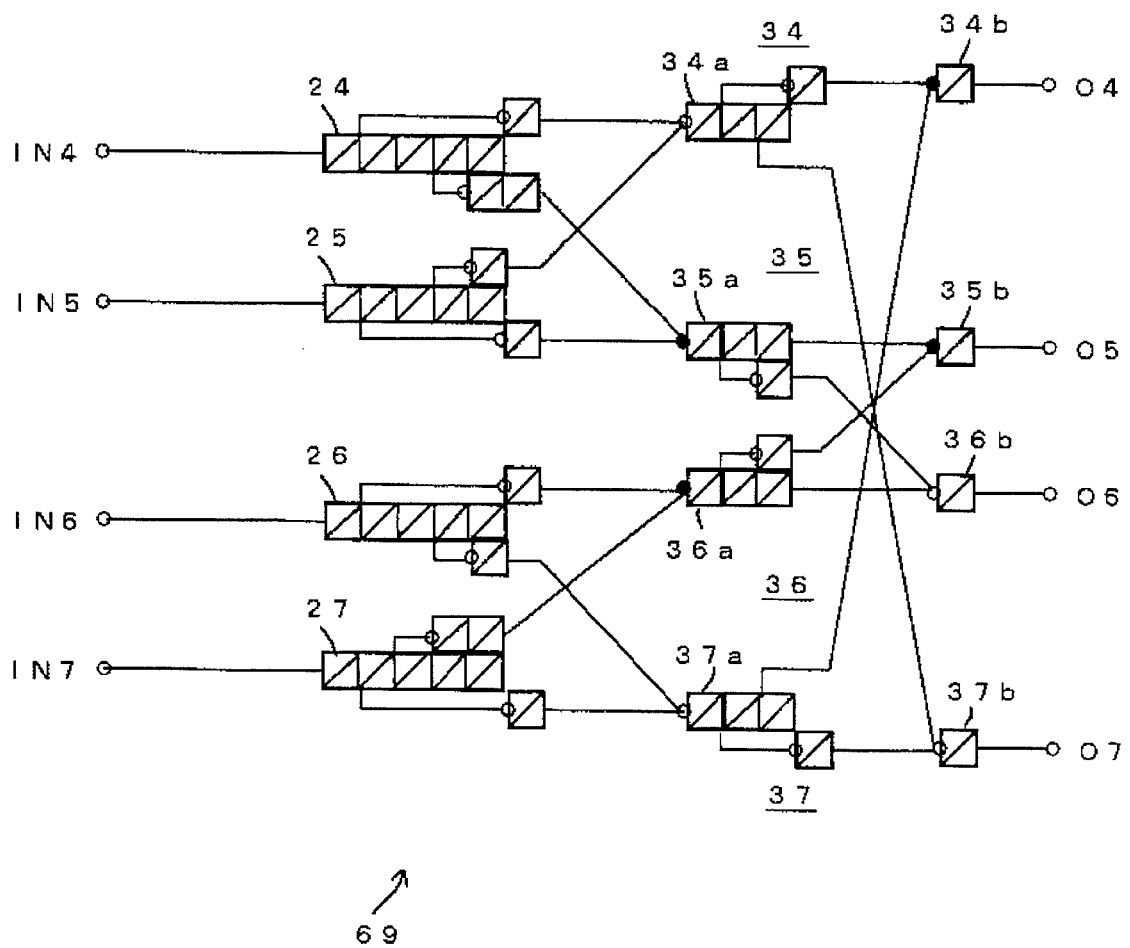
FIG. 31 shows the composition of the circuit 69 in the stages II and III (odd) in FIG. 26.
Figure 32:
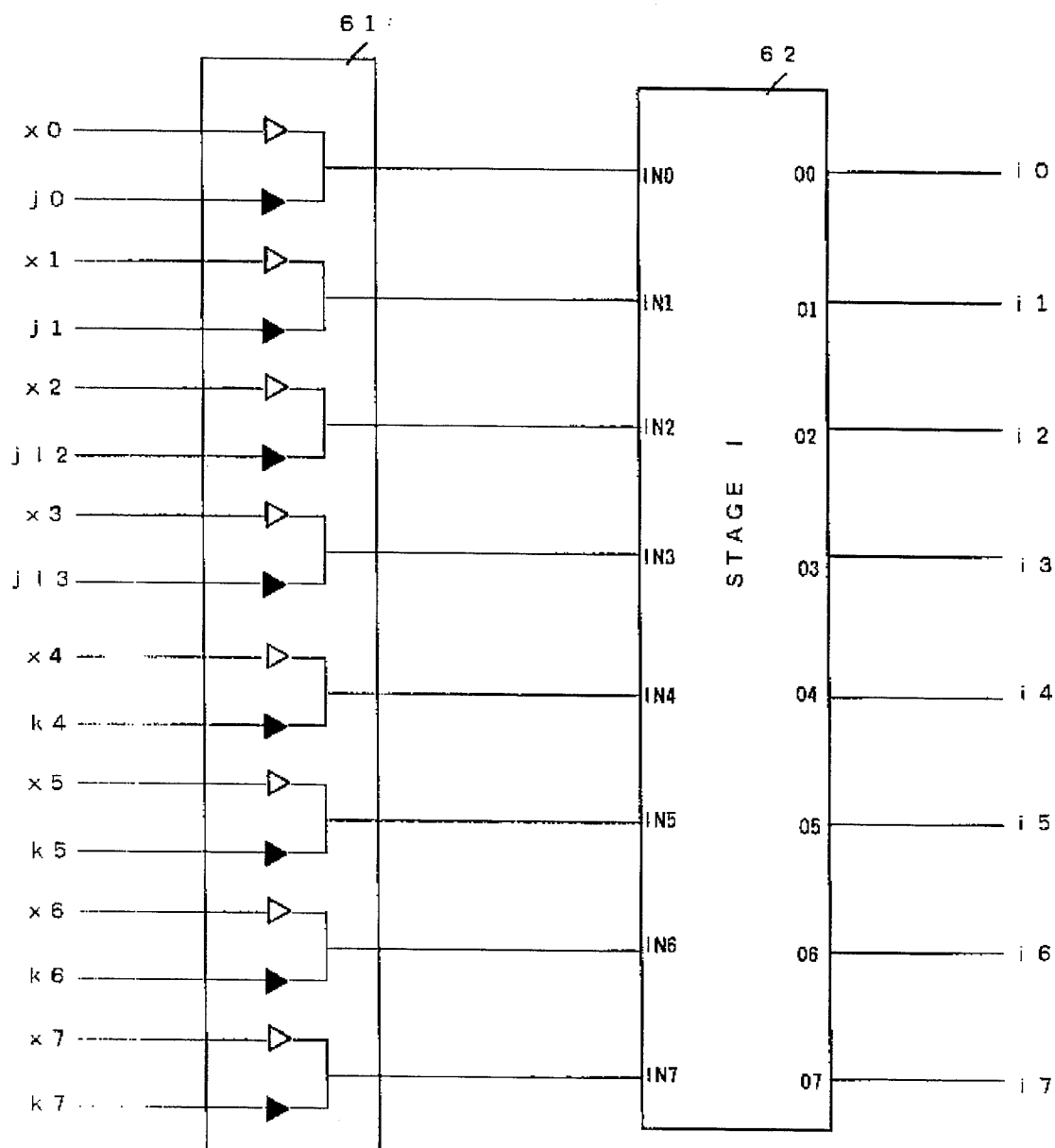
FIG. 32 depicts the bus selector 61 and the composition of the circuit 62 in FIG. 26.
Figure 33:
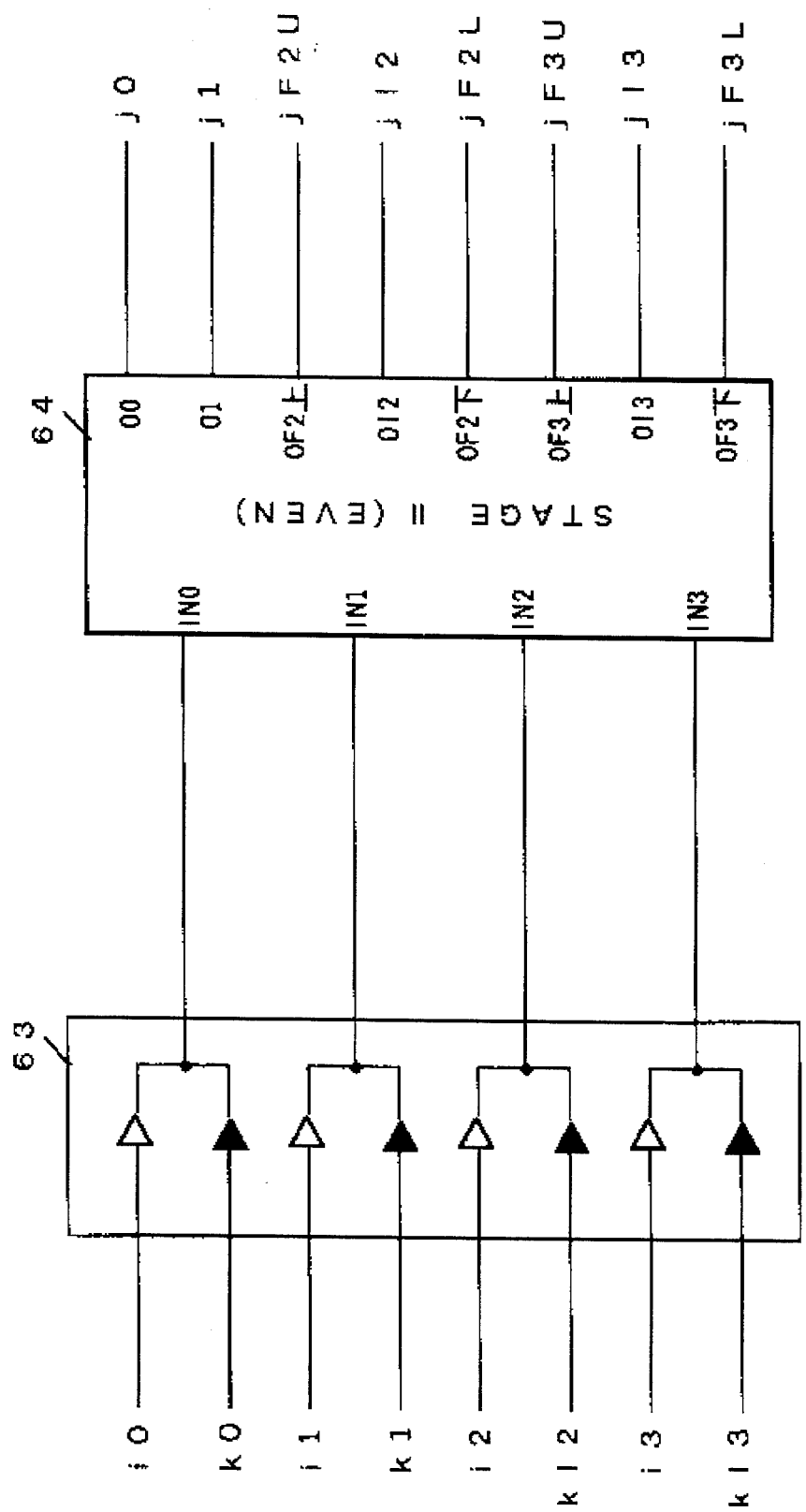
FIG. 33 depicts the bus selector 63 and the circuitry 64 in the stage II (even) in FIG. 26.
Figure 34:
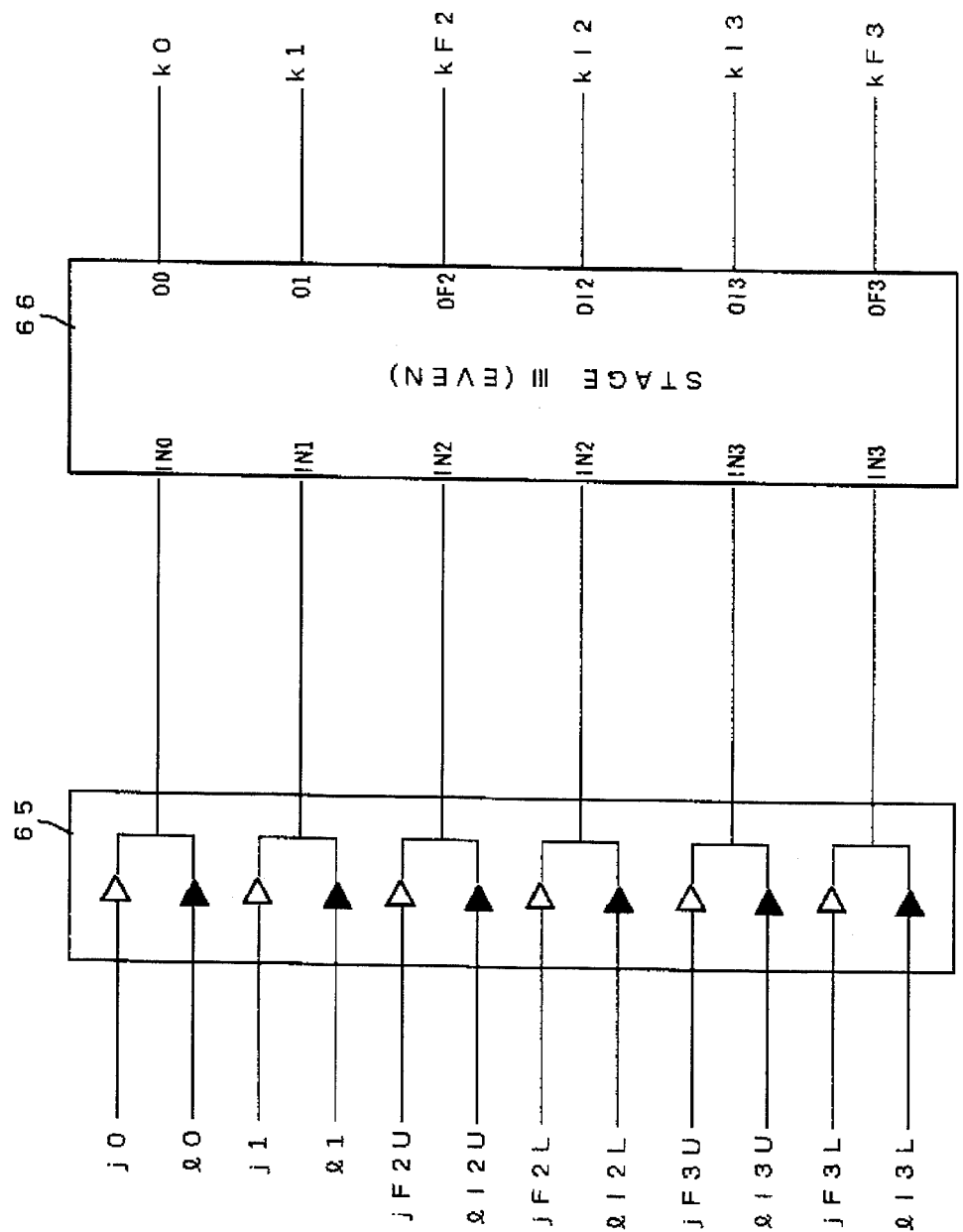
FIG. 34 depicts the bus selector 65 and the circuitry 66 in the stage III (even) in FIG. 26.
Figure 35:
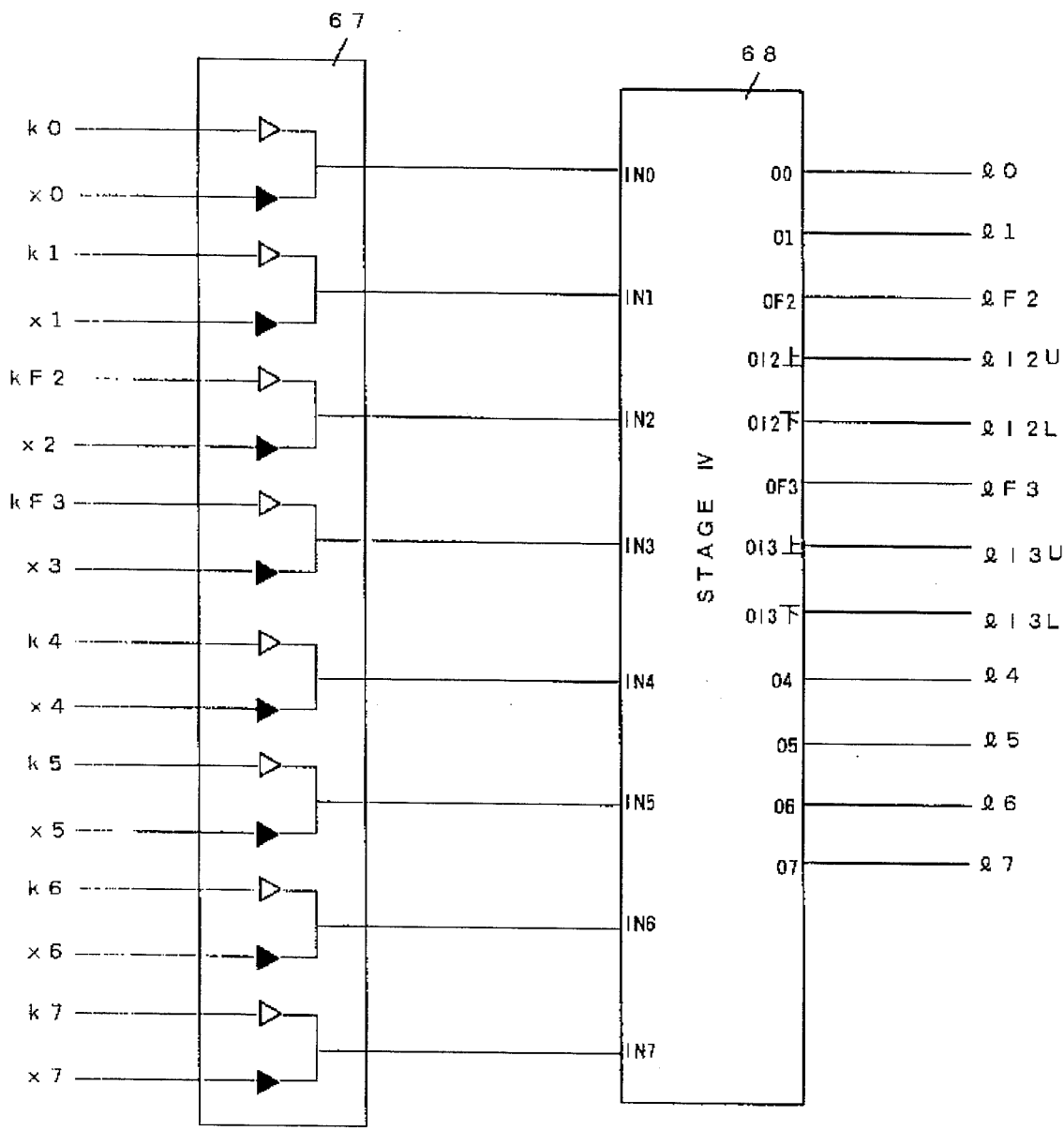
FIG. 35 depicts the bus selector 67 and the circuitry 68 in the stage III (even) in FIG. 26.
Figure 36:
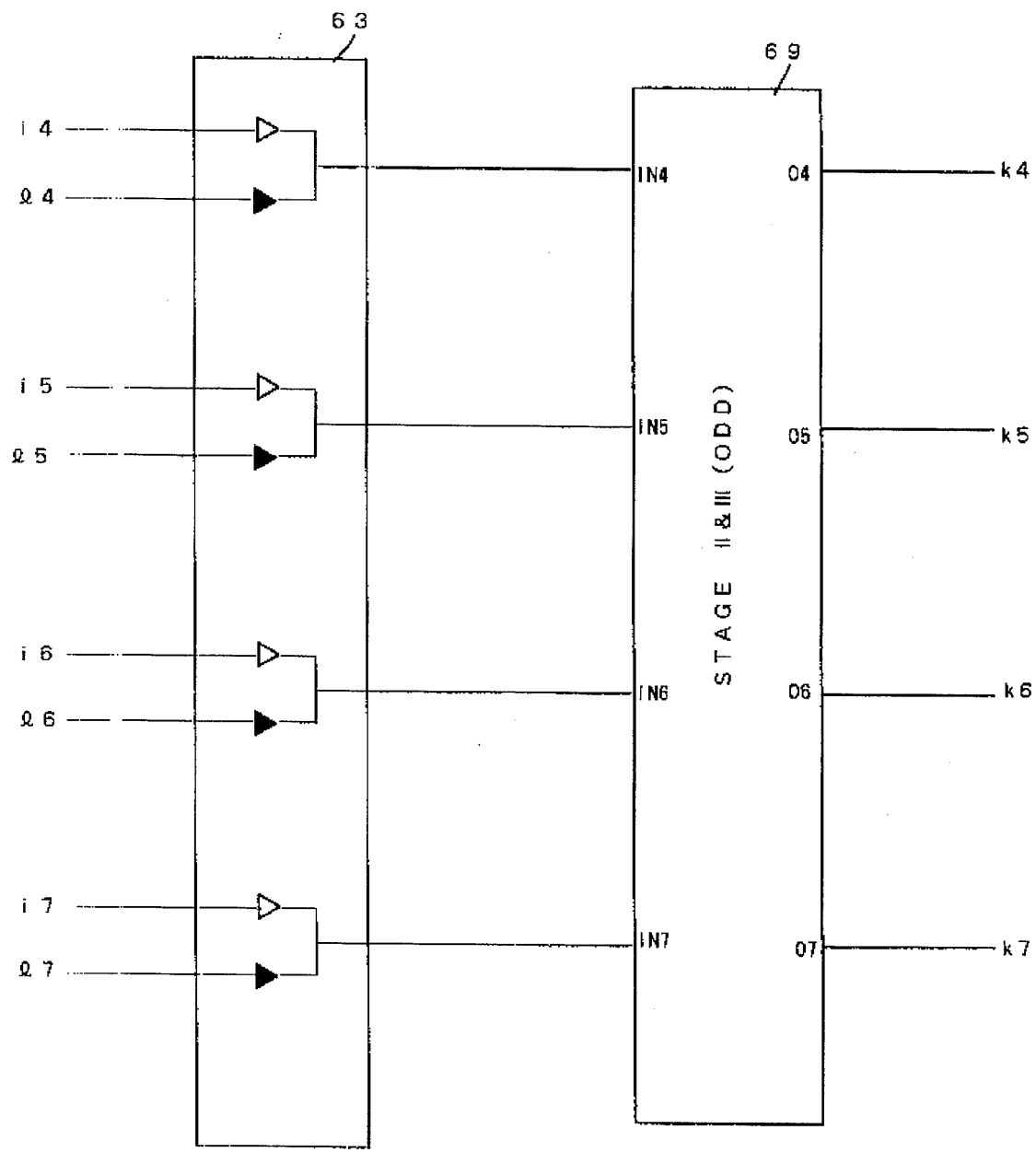
FIG. 36 depicts the bus selector 63 and the circuitry 69 in the stage II and III (odd) in FIG. 26.
Figure 37:
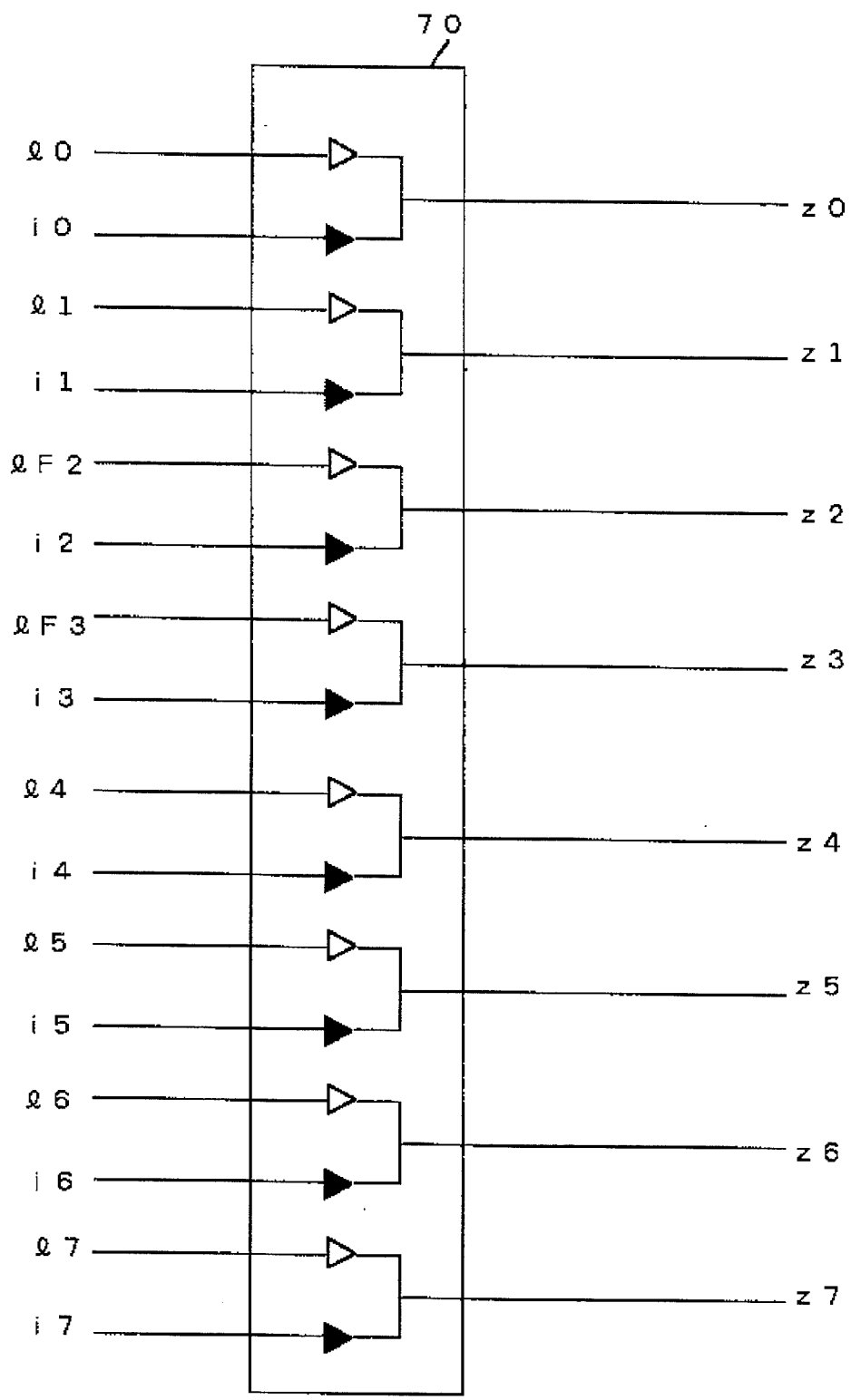
FIG. 37 depicts the composition of the bus selector 70 in FIG. 26.

In FIGS. 22 and 23, the elements whose numbers are followed by F and I, are described without F and I in the detailed figures of FIG. 26 or FIGS. 27~31, e.g., the elements 22F (refer to stage II (even) in FIG. 22) and 22I (refer to stage II (even) in FIG. 23) are expressed by element 22 in FIG. 28.

In FIG. 26, bus selectors 61, 63, 65, 67 which realize the switching of FDCT and IDCT are designed in presence of circuit 62 for stage I, circuit 64 for stage II (even), circuit 69 for stage II & III (odd), circuit 66 for stage III (even) and circuit 68 for stage IV, respectively. Bus selector 70 is provided in the last part of circuit.

The detailed configuration of each bus selector 61, 63, 65, 67, 70 are illustrated in FIGS. 32, 33 and 36, 34, 35, 37, where the write triangular marks are related to the open gates for FDCT and black triangular marks are related to the open gates for IDCT.

The relations of input line symbols of each bus selector and output line symbols of each stage, and the relations of output line symbols of each bus selector and input line symbols of each stage, are shown in figures. Because the connecting relations of each stage are obvious, the detailed descriptions are not presented.

Figure 38:
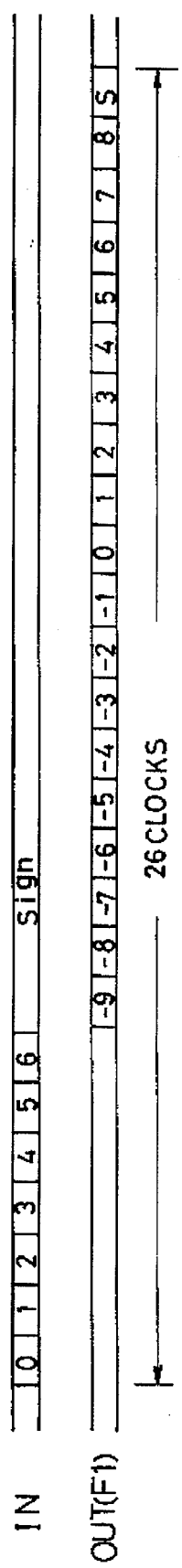
FIG. 38 shows a time chart of the input and output of the FDCT as given in FIG. 22.

The description of Version 1 of data transform computing device in this invention finishes here. In FIG. 38, the time chart of input and output signals (particularly for F1) is presented in the case of FDCT, i.e., FIG. 38 illustrates the time chart of input and output (F1) in FIG. 22, and corresponds to time chart FIG. 11 which is related to the above-mentioned FIG. 1.

In FIG. 22, if input data is 8 bit, the maximum total input from f0 to f7 becomes $(85+72+48+17)\times192\times2\times2=170496$, as an example, output F1 is expressed by 18 bits, where the multiple value of F1 can be found from Eq. 42 obviously.

Therefore, the above-mentioned pipe line length becomes 26 clocks. For F1 in FIG. 22, 7 Flip-Flops are used in the shortest course from input, and the data output is from the place marked by −9 in FIG. 38.

Regarding output, because, from the original equation of FDCT related to F3, the sum of the absolute value of the coefficients for l=1 line (k=0 to 7) in FIG. 7 is calculated by $\{\cos(1/16)\pi+\cos(3/16)\pi+\cos(5/16)\pi+\cos(7/16)\pi\}\times1/2\times2\approx2.5$, the decimal point position (binary Point) increases 2 bit compared to input.

Therefore, as described before, if input data is 8 bits, the output above decimal point is 10 bits and is placed in the position as shown in FIG. 38 or the position between 0 and −1.

From the above descriptions and the comparison of FIG. 1 and FIG. 22, it is understandable that the great reduction of circuit scale is possible, and the computing speed becomes quite fast by comparing the length of the pipelines in FIG. 11 and FIG. 38.

Data Transform Computing Device Ver. 2

In the next, the concrete circuit configuration (signal flow) version 2 of the data transform computing device is described.

This Version 2 comes from the improvement of Version 1 in FIGS. 22 and 23 as described before. First of all, the basic idea of Version 2 is described in the following Principle II.

Description of Principle II

The processing speed of FDCT and IDCT in FIG. 22 is considerable to be faster.

For this purpose, in FDCT of FIG. 22, the complicate-like parts are found out heuristically, i.e., for input signal, the parts which take time in the serial computation, or the parts whose clocks cycle number per line (per data word) is large is found out. It is found that these parts are the parts of stage II & III (odd) in FIG. 22.

Then the input/output function of these parts is tried to be formulated, it is found that the function is given by Eq. 55 which has been obtained already.

If this equation is rewritten as Eq. 77, it is much easy to look over it.

$$X0=2^4\times(-170b0+144b1-96b2+34b3) \quad \text{[Eq. 77]}$$

$$X1=2^4\times(-96b0-170b1-34b2+144b3)$$

$$X2=2^4\times(144b0+34b1-170b2+96b3)$$

$$X3=2^4\times(34b0+96b1+144b2+170b3)$$

By examining each coefficient of b0~b3, the common 24 is found out, so that it is considerable that 4 steps of Flip-Flop can be reduced.

The rest coefficients are K1=170, k2=144, K3=96, K4=34, and they can be factorized by the following Eq. 78.

$$Kj = \sum_i C_i \times 2^{ni} \quad \text{[Eq. 78]}$$

$C_i$ = integer, $ni$ = integer

Then K1~K4 are written as the following Eq. 79.

$$K1=170=1\times2+42\times2^2 \quad \text{[Eq. 79]}$$

$$K2=144=18\times2^3$$

$$K3=96=6\times2^4$$

$$K4=34=2\times2^0+2\times2^4$$

From the factorization like this, the separation of the multiplication of bi×Cj (Cj can be one of 1, 2, 6, 18, 42) and the addition of the multiplication of bi×Cj and power of 2 is understandable.

Concrete Configuration

Figure 40:
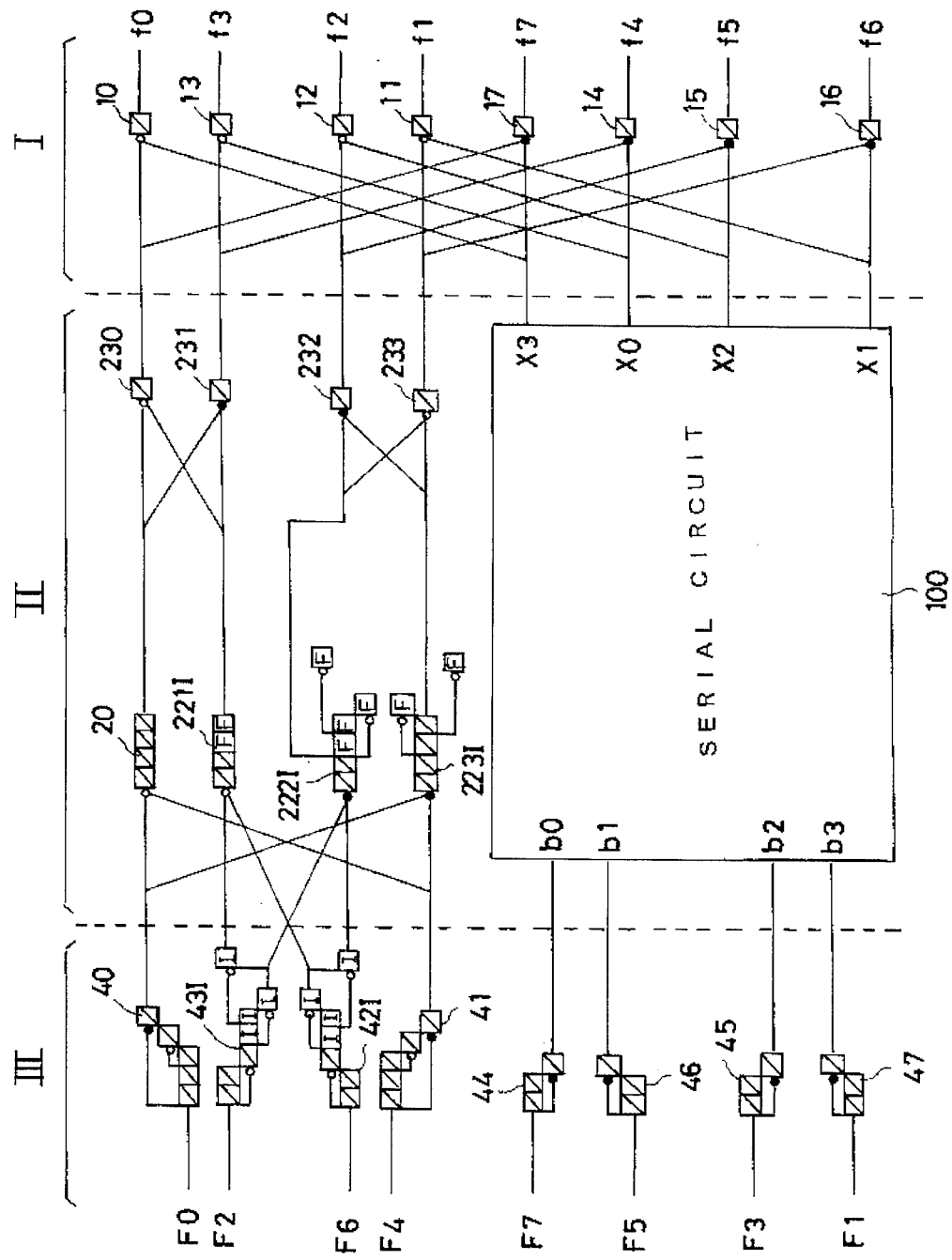
FIG. 40 shows the circuitry of the second version IDCT of the same device.

In the next, the concrete configuration of data transform computing device is described as follows. FIGS. 39 and 40 illustrate the improved configurations of FDCT and IDCT, respectively, where the same elements are given by the same sign as in the configurations in FIGS. 22 and 23.

Figure 41:
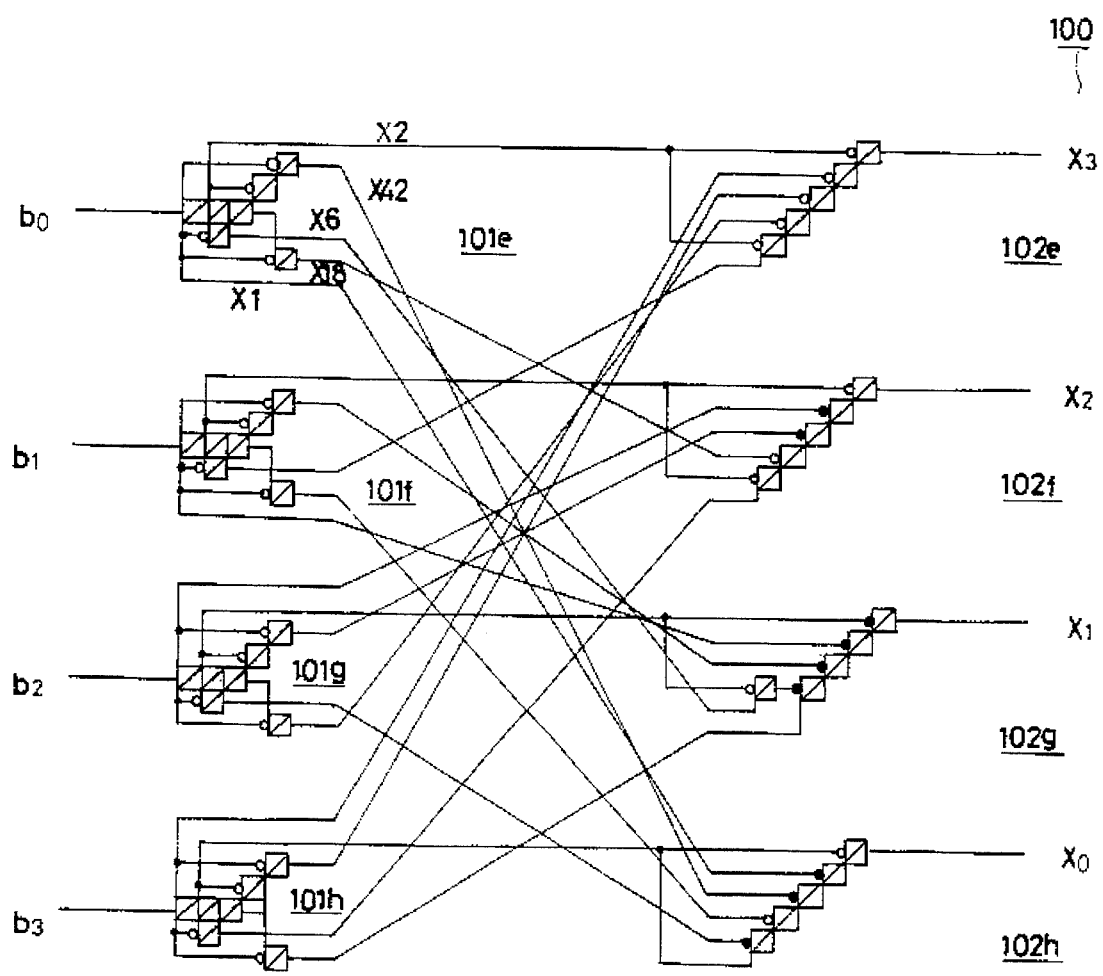
FIG. 41 depicts the configuration of the serial circuit 100 as shown in FIGS. 40 and 41.

The part in FIG. 39 corresponding to the configuration of stages II & III (odd) in FIG. 22 is the serial circuit 100 whose concrete configuration is given by FIG. 41.

Therefore, based on the above-described Principle II, It is divided into 2 computing blocks for per line, i.e., for inputs b0, b1, b2, b3, the elements 101e–101h which perform the multiplication of 1, 2, 5, 18, 42 with inputs b0, b1, b2, b3 and the elements 102e–102h connected to outputs X3, X2, X1, X0 which perform power of 2 and the addition and subtraction based on the above-mentioned Eq. 77. The compution in the serial circuit 100 is presented in Eq. 80 and is $2^3$ times different from that in Eq. 77. In other words, regarding the odd lines of F7, F3, F5, F1, 3 stages of Flip-Flops can be reduced, so that the same as for the even lines of F0, F4, F6, F2, 3 stages of Flip-Flops should be removed.

$$X0=2\times(-170b0+144b1-96b2+34b3)$$ [Eq. 80]

$$X1=2\times(-96b0-170b1-34b2+144b3)$$

$$X2=2\times(144b0+34b1-170b2+96b3)$$

$$X3=2\times(34b0+96b1+144b2+170b3)$$

In the case of FDCT, by comparing FIGS. 22 and 39, stage I in FIG. 22 corresponds to stage I in FIG. 39, and stage IV in FIG. 22 corresponds to stage III in FIG. 39. (completely equivalent.)

Therefore, as mentioned above, because 3 stages of Flip-Flop are removed at odd line side (F7, F3, F5, F1), 3 stages of Flip-Flop are removed at even line side (F0, F4, F6, F2). This can be realized by reducing 4 atages Flip-Flops configuration from elements 30, 31, 32F, 33F in FIG. 22 to 1 stage Flip-Flop configuration, i.e., the elements 230, 231, 232, 233 in FIG. 39. And it is obvious that a line connecting configuration of stages II (even) and III(even) in FIG. 22 corresponds to stage II in FIG. 39.

In the case of IDCT, by comparing FIGS. 23 and 40, as a matter of course, stage I in FIG. 23 corresponds to stage I in FIG. 40, and stage IV in FIG. 23 corresponds to stage III in FIG. 40. (completely equivalent.)

Then 4 stages Flip-Flop configuration from elements 20, 23I, 22I, 21 of stage II (even) in FIG. 23 becomes 1 stage Flip-Flop configuration, and a line connecting configuration of stage III(even) and II(even) in FIG. 23 corresponds to stage II in FIG. 40.

In the case of IDCT, because the element 331 in FIG. 23 is 2 stage Flip-Flop configuration, in 4 stage Flip-Flops of element 22lI in FIG. 40, only 2 stage must be used.

Putting this fact into mind, by comparing FDCT in FIG. 39 and IDCT are the completely same, except the particular circuits marked by F in Flip-Flop which are employed only for FDCT.

Figure 42:
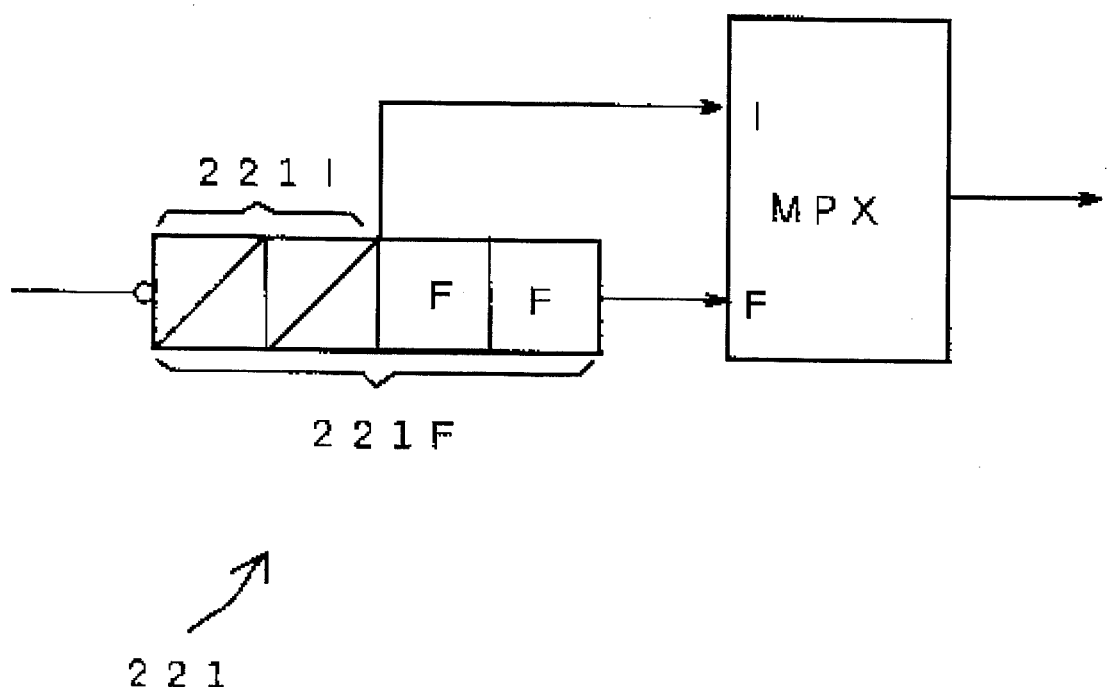
FIG. 42 schematically shows up the circuit connection including the inherent circuit as shown in FIGS. 40 and 41.

As an example shown in FIG. 42, element 221F of FDCT and element 221I of IDCT are configured by the common element 221, 2 inputs/1 output multiplexor (MPX) can switch the outputs corresponding to the cases of FDCT and IDCT.

Therefore, as for FDCT in FIG. 39, the signal processing is implemented in the stage order of I, II, III, and as for IDCT in FIG. 40, the signal processing is implemented in the stage order of III, II, I, i.e., the signal processing in implemented in the completely inverse order compared to FDCT.

Figure 43:
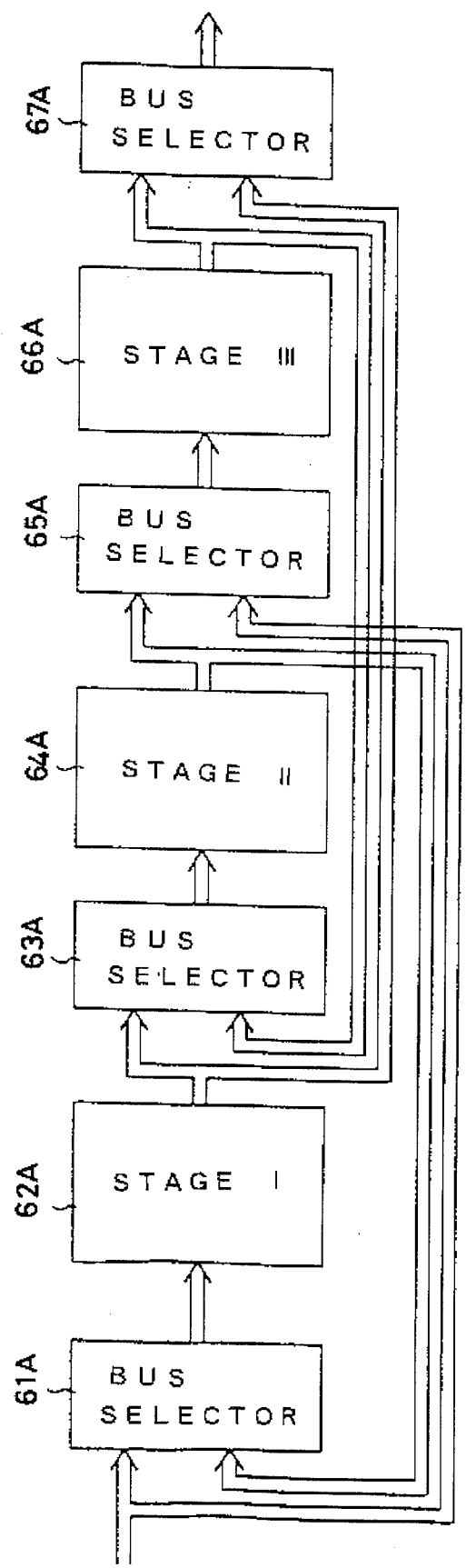
FIG. 43 represents a signal flow according to which both the FDCT and IDCT are realized by changing the sequences of their respective stages I, II, and III.

As illustrated in FIG. 43, in the presence of circuit 62A which configures stage I shown in FIGS. 39 and 40, circuit 64A which configures stage II and circuit 66A which configures stage III, bus selector 61A, 63A, 65A and bus selector 67A at final step are provided as similarly in the above-mentioned FIG. 26.

Then, in each case of FDCT and IDCT, by switching the connecting relations of bus selector 61A, 63A, 65A, 67A and multiplexor provided at the latter parts of the particular circuits, the FDCT and IDCT can be implemented in the same circuit configuration.

Figure 44:
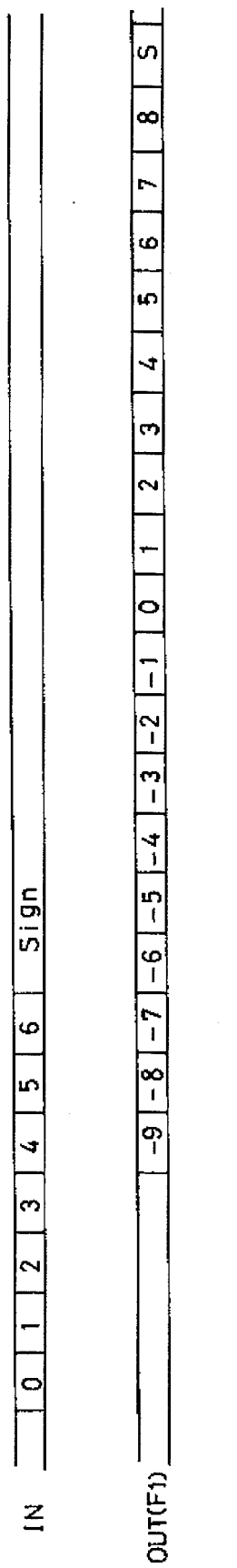
FIG. 44 gives the time chart of the input and output of the FDCT as shown in FIG. 39.

Because the serial circuit 100 is configurated as FIG. 39, and 3 stages of Flip-Flop is reduced totally compared to that in FIG. 22, its time chart is presented in FIG. 44. Then compared to that in FIG. 38, 3 clocks are reduced from input to output, and the pipe line length becomes 23 clocks.

Data Transform Computing Device Ver. 3

Next explained will be the third version (Ver. 3) of the circuitry embodiment (signal flow) of the data transform computing device.

This third version is an improvement of the second one already described referring to FIGS. 39 and 40. The way of thinking implemented in this version shall be called Principle III which will be expounded hereafter.

Description of Principle III

The configuration has thus far used the elements of the circuit symbols as shown in FIGS. 3 to 5. The symbols in FIG. 4 in particular signify a combination of one-bit serial full adder FA and a flip-flop FF, while the symbols in FIG. 5, a combination of one-bit serial full subtracter FS and a flip-flop FE In both of them the circuit that latches the carry and borrow in FA and FS is so designed as operates in synchronization with the read-in clock CLK in subsequent flip-flop FF.

Use of the elements of such circuit symbols has caused the time delay by the corresponding retardation of the clock CLK of the flip-flop FF even in mere addition and subtraction. This led us to decide to perform a high-speed operation omitting the flip-fop FF intended for timing adjustment.

Configuration as Materialized

Figure 45:
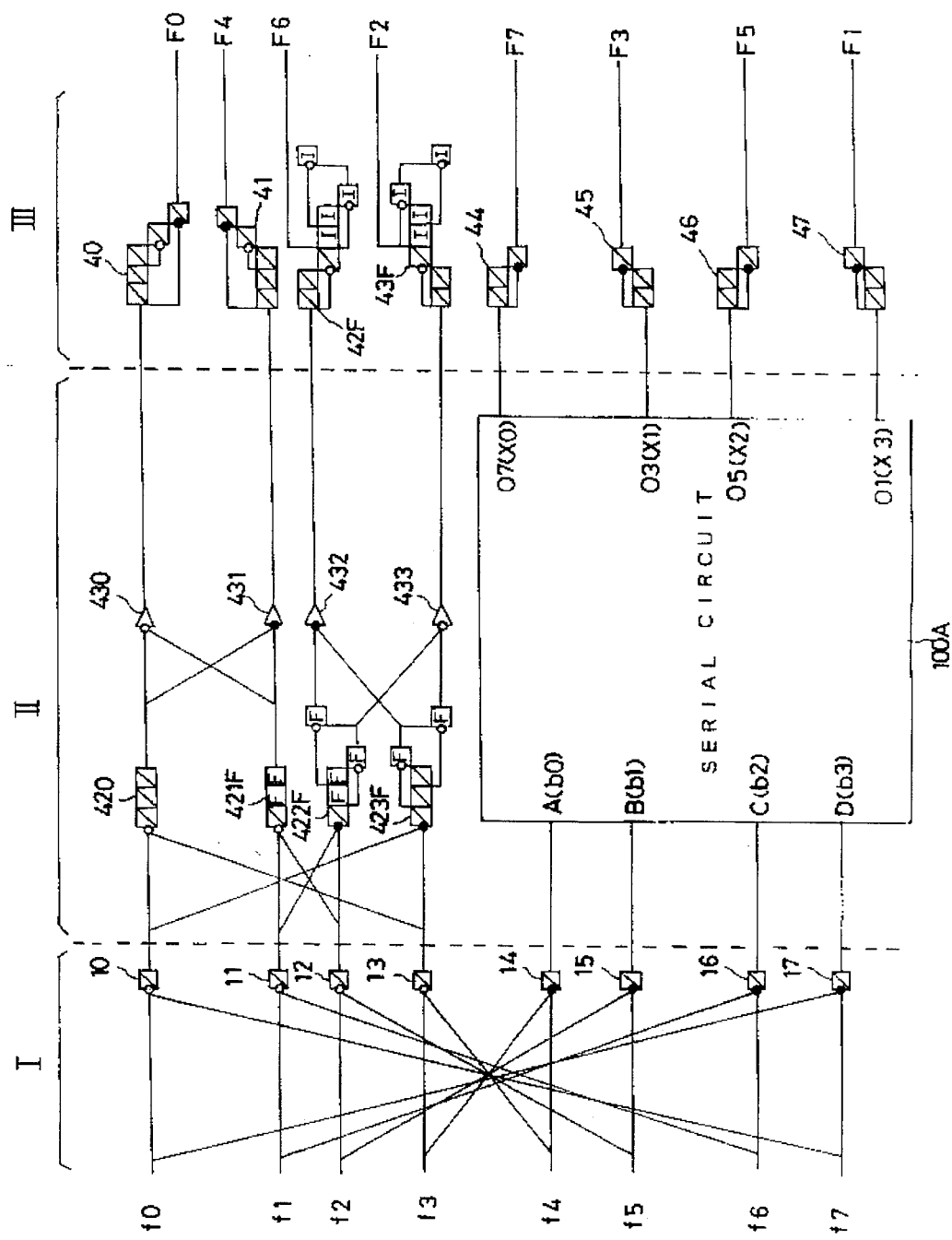
FIG. 45 represents the circuitry of the third version (Ver. 3) FDCT of the data transform computing device conformable to this invention.
Figure 47:
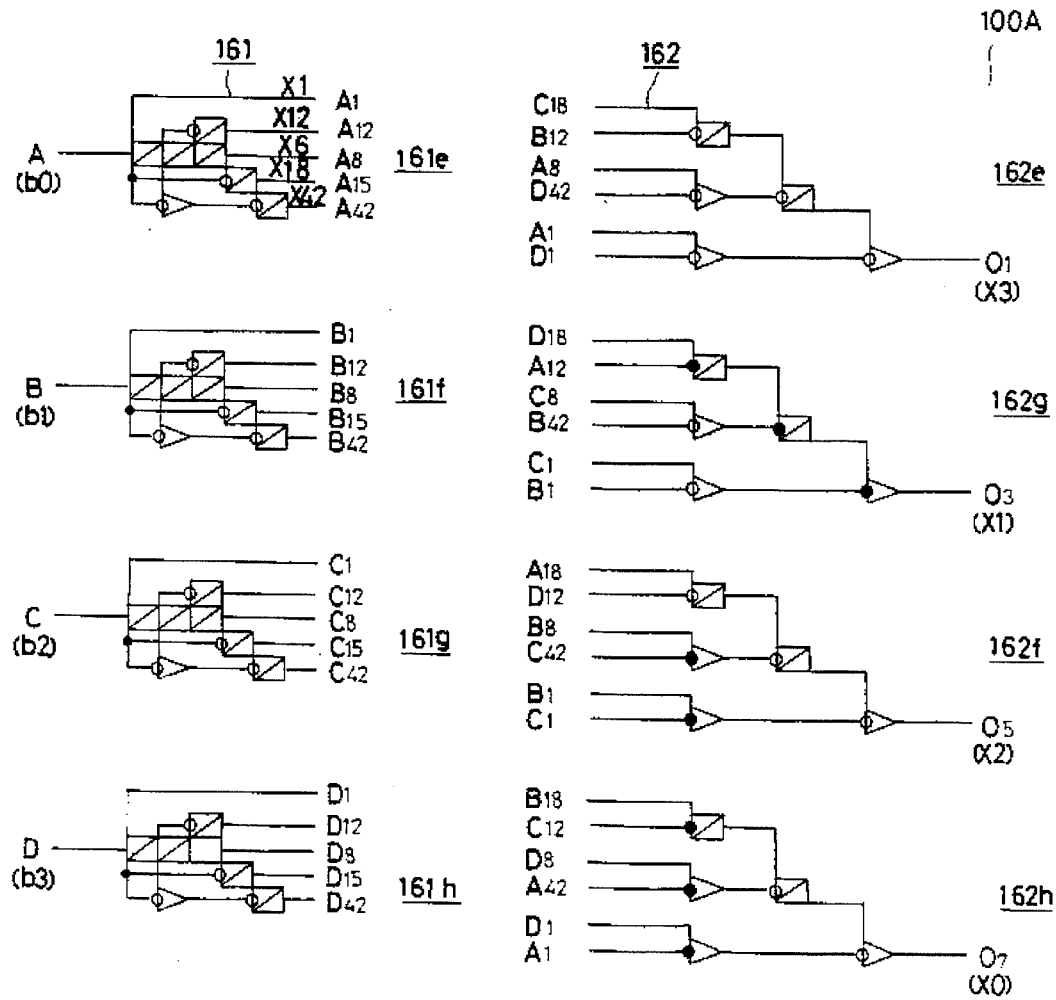
FIG. 47 illustrates the configuration of the serial circuit 100A as shown in FIGS. 45 and 46.

Next explained will be an embodiment of the circuitry of this data transform computing device. FIG. 45 depicts the configuration of improved FDCT, and FIG. 46, that of improved IDCT, while FIG. 47 shows up the serial circuit 100A.

Same elements shall have same symbols in the FIG. 39 which shows the FDCT as the second version, in the FIG. 40 illustrating the IDCT, and lastly in the FIG. 41 which illustrates the internal configuration of the serial circuit 100.

Figure 48:
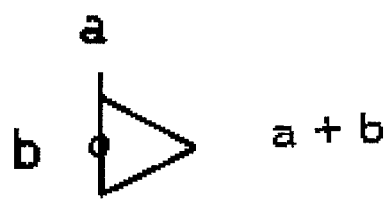
FIG. 48 shows the circuit symbols of the elements that execute the 2 input addition (one-bit full adder) as used in the drawings accompanying to the description of this invention.
Figure 49:
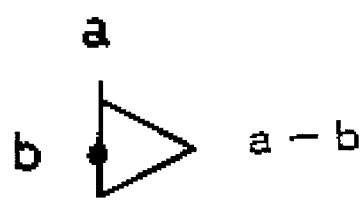
FIG. 49 shows up the circuit symbols of the elements that execute the 2 input subtraction (one-bit full subtractor) as used in the drawings accompanying the description of this invention.

First we will explain the operation off the serial circuit 100A. The circuit symbols newly used are as shown in FIGS. 48 and 49; the symbols in FIG. 48 will be used as one-bit serial adder in which there is the carry feedback loop off one-bit delay. Similarly the borrow feedback loop of one-bit delay is in FIG. 49 as one-bit serial full subtracter. Their respective circuit output are (a+b) and (a−b).

According to the configuration of FIG. 47, the output of O1, O3, O5, and O7 (corresponding in this order to X3, X1, X2, and X0 in FIG. 41) as against the input off A, B, C, and D (corresponding in this order to b0, b1, b2, and b3 in FIG. 41) has the relationship determined by Eq. 81 as below.

$$O1=17A+48B+72C+85D$$ [Eq. 81]

$$O3=-48A-85B-17C+72D$$

$$O5=72A+17B-85C+48D$$

$$O7 = -85A + 72B - 48C + 17D$$

As is understood by comparing Eq. 81 and Eq. 80, the Eq. 81 is smaller by 4 (=$2^2$) units than the Eq. 80, which allows for fast computation by omitting two stages of flip-flop.

To be more in detail, each line is divided into two blocks in which the computation of Eq. 81 is run in conformity to the Principle II already described. Stated another way, the serial circuit 100A includes the elements 161e to 161h that multiply numbers 1, 8, 12, 18 and 42 for the input A, B, C, and D and the elements 162e, 162g, 162f, and 162h which are connected to the output O1, O3, O5, and O7 and calculate the power of 2, and execute add and subtract operation based on the Eq. 81.

Note that in this case the respective coefficients of the Eq. 78, namely k1'=85, k2'=72, k3'=48, and k4'=17 can be factorized according to the Eq. 78; that is, they become like the Eq. 82.

[Eq. 82]

$$K1' = 85 = 1 \times 2^0 + 42 \times 2^1$$

$$K2' = 72 = 18 \times 2^2$$

$$K3' = 48 = 12 \times 2^2$$

$$K4' = 17 = 1 \times 2^0 + 8 \times 2^1$$

Accordingly the elements 161e to 161h executes multiplication of numbers 1, 8, 12, 18 and 48 with corresponding input data.

As is clear from the above, the Eq. 81 is $2^{-2}$ times the Eq. 80, and from the circuitry viewpoint each signal line of the serial circuit 100A is by two flop-flops less than the serial 100 shown in FIG. 39; namely the computation is faster by several 2-clock cycles.

Since each odd number line in the serial circuit 100A is less by two flip-flops, it is necessary to reduce two flip-flops respectively also in the even number lines in stage II in match with the respective odd number lines. The FDCT in FIG. 45 is less by one flip-flop respectively in its elements 420, 421F, 422F, and 423F than the FDCT in its respective elements 22, 221F, 222F, and 223F in FIG. 39. Further in the elements 430, 431, 432, and 433 the combination of adder or subtracter with flip-flop is changed simply into adder or subtracter in the elements 230, 231, 232, and 233. As in the even number line, the odd number line of the FDCT in FIG. 45 enables the computation which is speedier, by several two-clock cycles, than in the FDCT shown in FIG. 39.

Next we will discuss the IDCT shown in FIG. 46 corresponding to the FDCT in FIG. 45. Also in this case, it suffices if two flip-flops are eliminated in stage II in each line from the IDCT shown in FIG. 40. This is understandable from the fact that the elements 20, 221I, 222I, and 223I in FIG. 40 have been changed into elements 420, 421I, 422I, and 423I in FIG. 46 and that the elements 230, 231, 232, and 233 in FIG. 40 have been changed into the elements 430, 431, 432, and 433 in FIG. 46. This relationship is same as in the case of the FDCT.

Figure 50:
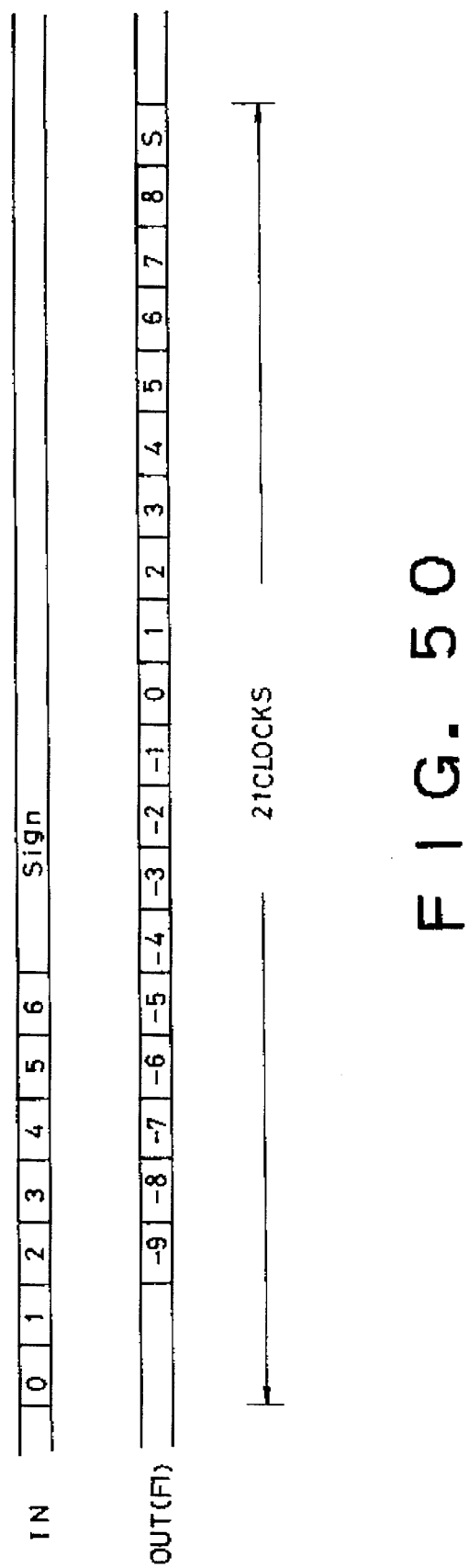
FIG. 50 is the time chart of the input and output of the FDCT as shown in FIG. 45.

FIG. 50 is a time chart which indicates the relationship of the output as against the input of FIG. 45. It implies that the operation is by several two-oclock cycles faster than in the time chart (FIG. 44) of the FDCT shown in FIG. 40.

Data Transform Computing Device Ver. 3.1

Explained next will be the version 3.1 (Ver. 3.1) of the circuit embodiment of the data transform computing device.

This version includes only a little improvement of the FDCT shown in FIG. 45 and IDCT shown in FIG. 46 of the third version (Ver. 3) described earlier.

The FDCT in FIG. 45 and IDCT in FIG. 46 have been ameliorated only in that the operation in stage II is speedier. In this embodiment, however, what form the subject of our discussion are the combination of the flip-flop with adder and subtracter both in stage I and III on the one hand, and the single combination of full adder and full subtractor also in the same stages on the other.

As is understandable from the comparison of FIG. 45 with FIG. 51, the elements 10 to 17 have been changed into elements 410 to 417 in stage I of the FDCT thereby permitting faster operation by one clock cycle. In stage III the elements 40, 41, 42F, 43F and 44 to 47 have been changed into elements 440, 441, 442F, 443F, and 444 to 447 thereby rendering the operation speedier by one clock similarly. The time chart of this FDCT (not shown) allows for faster operation further by 2 clock cycles than that shown in FIG. 50.

Figure 52:
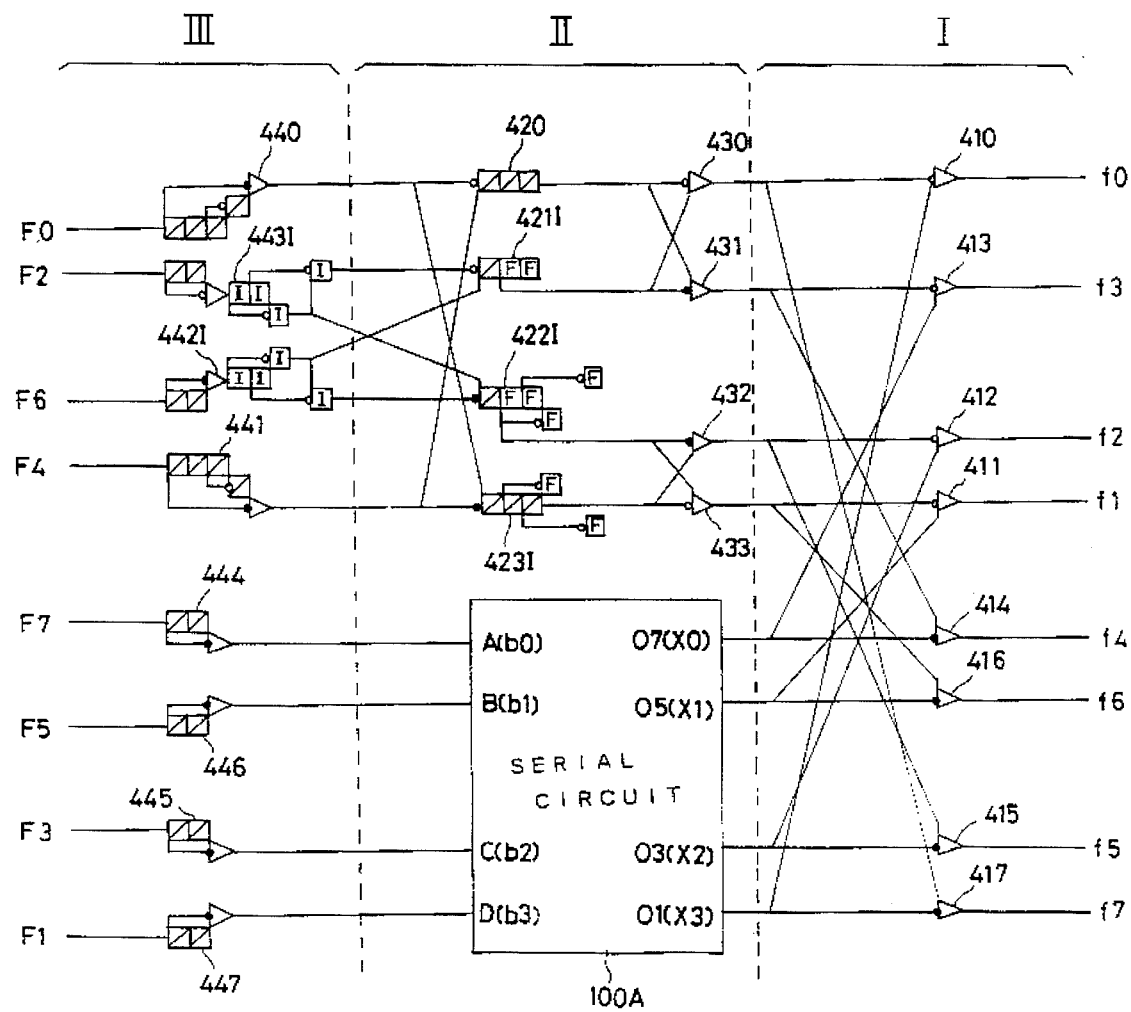
FIG. 52 illustrates the circuitry of the IDCT as the 3.1 version (Ver. 3.1) for the same data transform computing device.

The IDCT shown in FIG. 52, which has been changed from that shown in FIG. 46, enables to perform faster operation by two clock cycles. The relationship of FIG. 52 to FIG. 46 remains same as that of FIG. 51 to FIG. 45 as already described. In consequence it would not be necessary to explain more about FIG. 52.

Data Transform Computing Device Ver. 4

We could thus build up the FDCT and IDCT of version 3.1 (Ver. 3.1) either by reducing the number of flip-flops or changing the combination of full adder or full subtracter with flip-flops into single constitution of full adder or full subtractor.

Continuing to thus change the circuitry may indeed contribute to the enhancement of the operational speed, but some inconvenience, say a critical path has come to be feared between stages due to the fewer number of clocks between data input to data output.

In the event that, as shown in FIG. 43, FDCT and IDCT processings are to be selectively realized by changing over the relationship between input and output in a circuit by way of the action of bus selector, there arises the problem of wiring delay between the stages. In this case such inconveniences often occur as reading-in of erroneous data because of the critical path.

We will call Principle IV the way of thinking for materializing that data transform computing device of the fourth version (Ver. 4) where the above inconvenience has been removed.

Description on Principle IV

As has been expounded earlier, envisaging an operation under high speed may lead to a critical path. Our target here should therefore be to reduce clock skew by inserting into the critical path, a retardation element, for instance a flip-flop to dissolve the critical path and secure a stabler action.

Embodiment of Configuration

Figure 53:
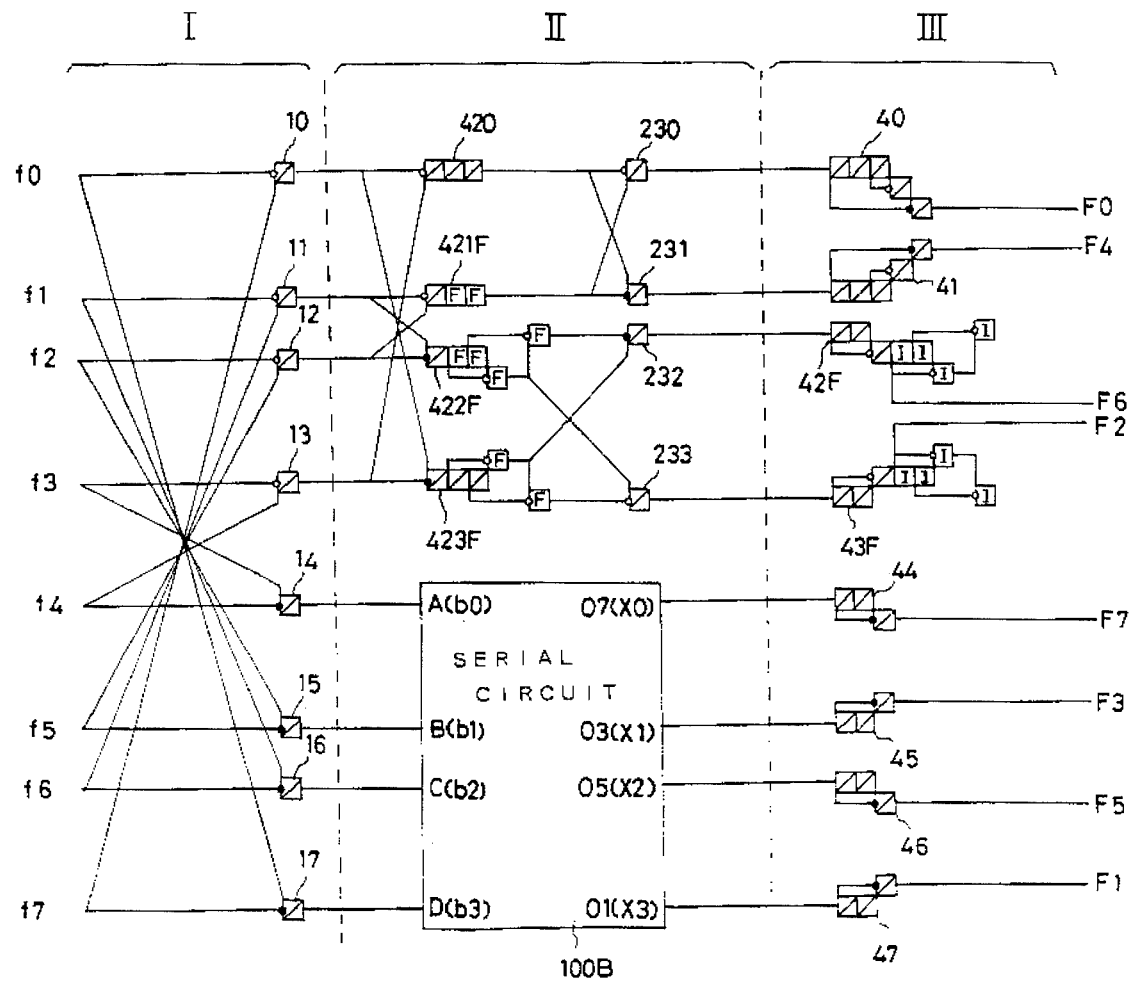
FIG. 53 illustrates the circuitry of the FDCT as the fourth version (Ver. 4) for the data transform computing device conformable to this invention.

Next explained will be the materialized configuration of this data transform computing device. FIG. 53 shows up the configuration of improved FDCT, while FIG. 54, that of ameliorated IDCT, and FIG. 55, enhanced serial circuit 100B. Same symbols are given to the same elements thus far described and the description on them will therefore be omitted.

First of all we attempt to survey the relationship between the serial circuits 100B and 100A. Also in this serial circuit 100B based on the Principle II already expounded, each line has been divided into two blocks that perform the operation of the Eq. 83.

$$O1=2\times(17A+48B+72C+85D) \quad \text{[Eq. 83]}$$

$$O3=2\times(-48A-85B-17C+72D)$$

$$O5=2\times(72A+17B-85C+48D)$$

$$O7=2\times(-85A+72B-48C+17D)$$

Figure 55:
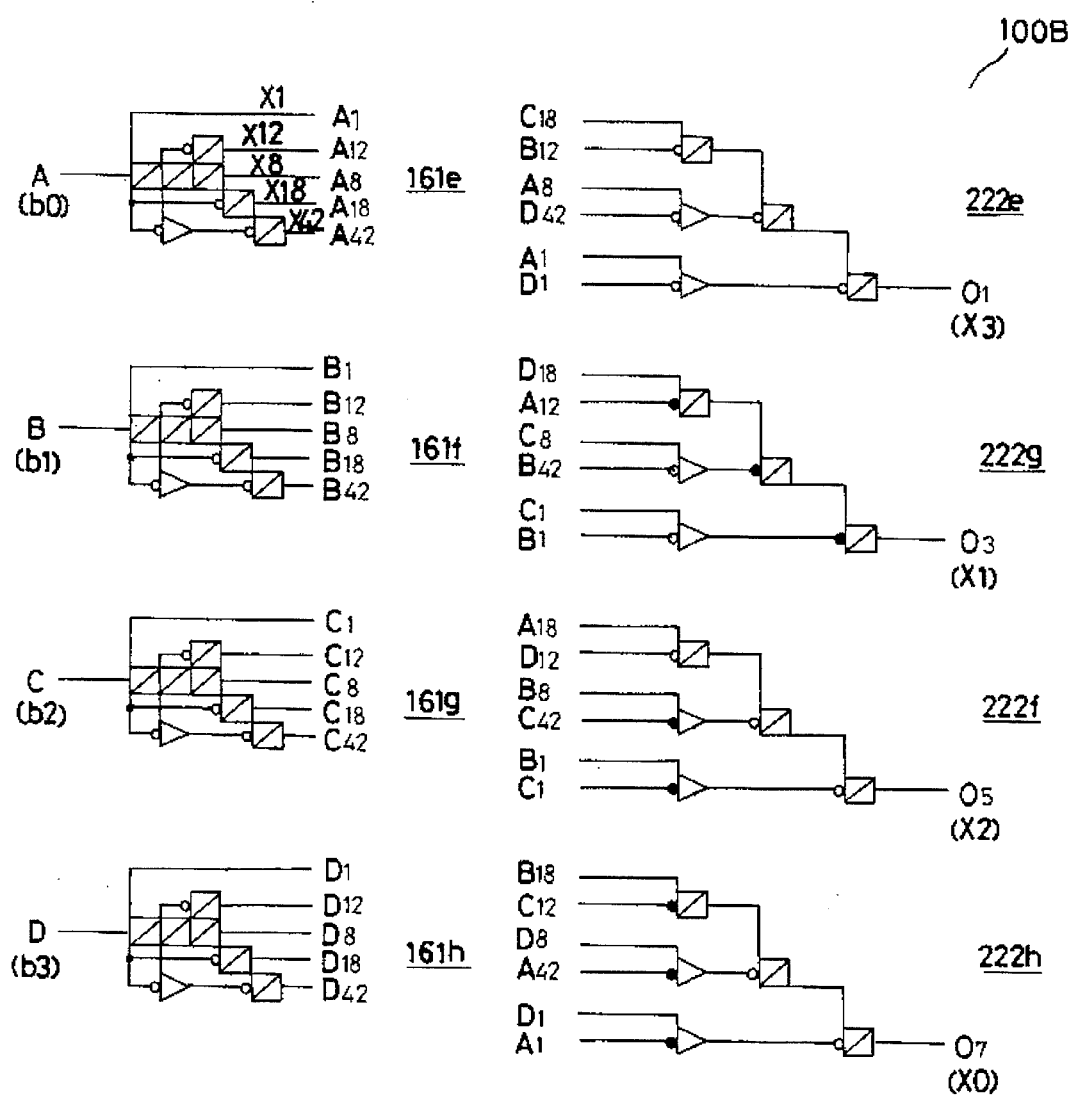
FIG. 55 shows the circuit configuration of the serial circuit 100B as given in FIGS. 53 and 54.

In an attempt to compare the serial circuit 100B with the serial one 100A as shown in FIG. 47, we find that the elements 161e to 161h are exactly the same, but that the elements 162e, 162g, 162f, and 162h have been changed into 222e, 222g, 222f, and 222h. These changes made in conformity to the aforesaid principle IV modify the full adder or full subtractor into the full adder or full subtractor provided with flip-flop. Consequently the output of the serial circuit 100B in FIG. 55 is twice that of the serial circuit 100A in FIG. 47 (compare the Eq. 83 with Eq. 81), and is accordingly delayed by one clock cycle.

By thus constituting the serial circuit 100B and in accord with the above-mentioned principle IV, first the elements 430 to 433 on the even number line side of stage II (refer to FIG. 51) are changed into 230 to 233 (FIG. 53). This is in a similar vein that they are returned to the elements 230 to 233 in FIG. 39.

As far as the stage II is concerned, therefore, it is understood that all the final rows of the stage have changed into the flip-flops that read in the signals in synchronization with the clock.

As is clear from stage I in FIG. 53, the full adders or full subtracters 410 to 417 in FIG. 51 have all been changed into the initial full adders or full subtracters provided with flip-flops, 10 to 17 (refer to FIG. 45). It is quite evident that this also is based upon the principle IV mentioned above.

It is further understandable, for stage III when comparing FIG. 53 with FIG. 51, that the elements 440, 441, 442F, 443F, and 444 to 447 have been changed into the initial elements 40, 41, 42F, 43F and 44 to 47 (refer to FIG. 45). This also is clearly owing to the foregoing principle IV.

Figure 54:
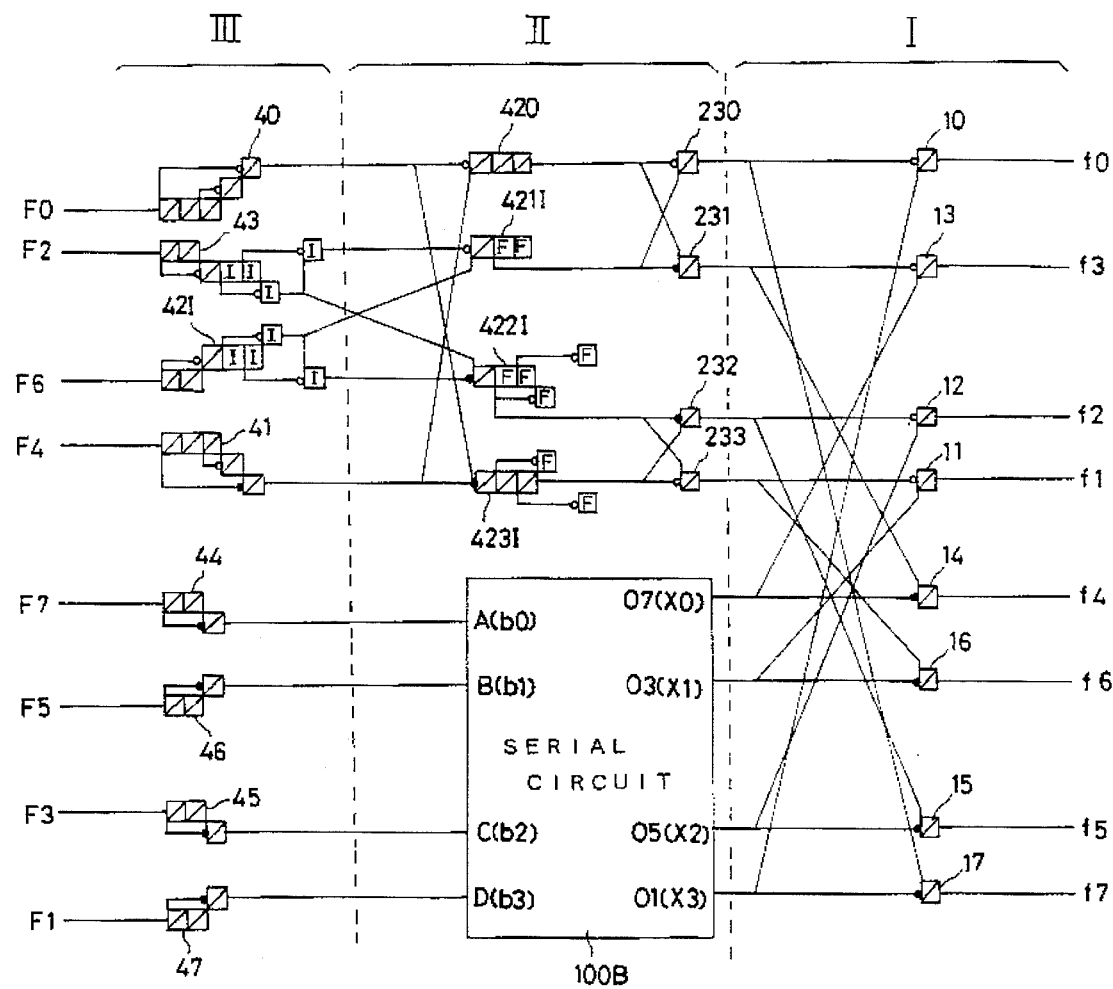
FIG. 54 illustrates the circuitry of the IDCT as the fourth version (Ver. 4) for the same data transform computing device.

Having described the case of FDCT, the changes should be comprehensible if FIG. 52 is compared with FIG. 54 because the changes of IDCT correspond to those of DFCT. Detailed description on the case of IDCT may therefore be safely omitted.

Configuration with Parallel to Serial/Serial to Parallel Converter

In addition to the exemplary configurations of data transform computing device by various versions thus far expounded, there are parallel to serial converter and serial to parallel one as such elements that enlarge the circuits of the data compressing and extending device.

The concept of reducing the scale of these converters, referred to as Principle V, will next be described.

Description of Principle V

The parallel to serial converter (FIG. 13) and serial to parallel one (FIG. 16) closely resemble each other in that they have D flip-flops in their respective cells. This fact suggests that appropriate changeover of the makes and breaks of the input and output gates and the control signals to be given in the parallel to serial conversion and serial to parallel one may allow for common use of their circuits.

Such a converter circuit will be built up which will enable both the serial to parallel and parallel to serial conversion of data. Connection of this conversion circuit with the data transform computing device in ring form would be able to decrease the largeness of the overall circuitry of the data compressing and extending processing.

Exemplary Configuration

Figure 56:
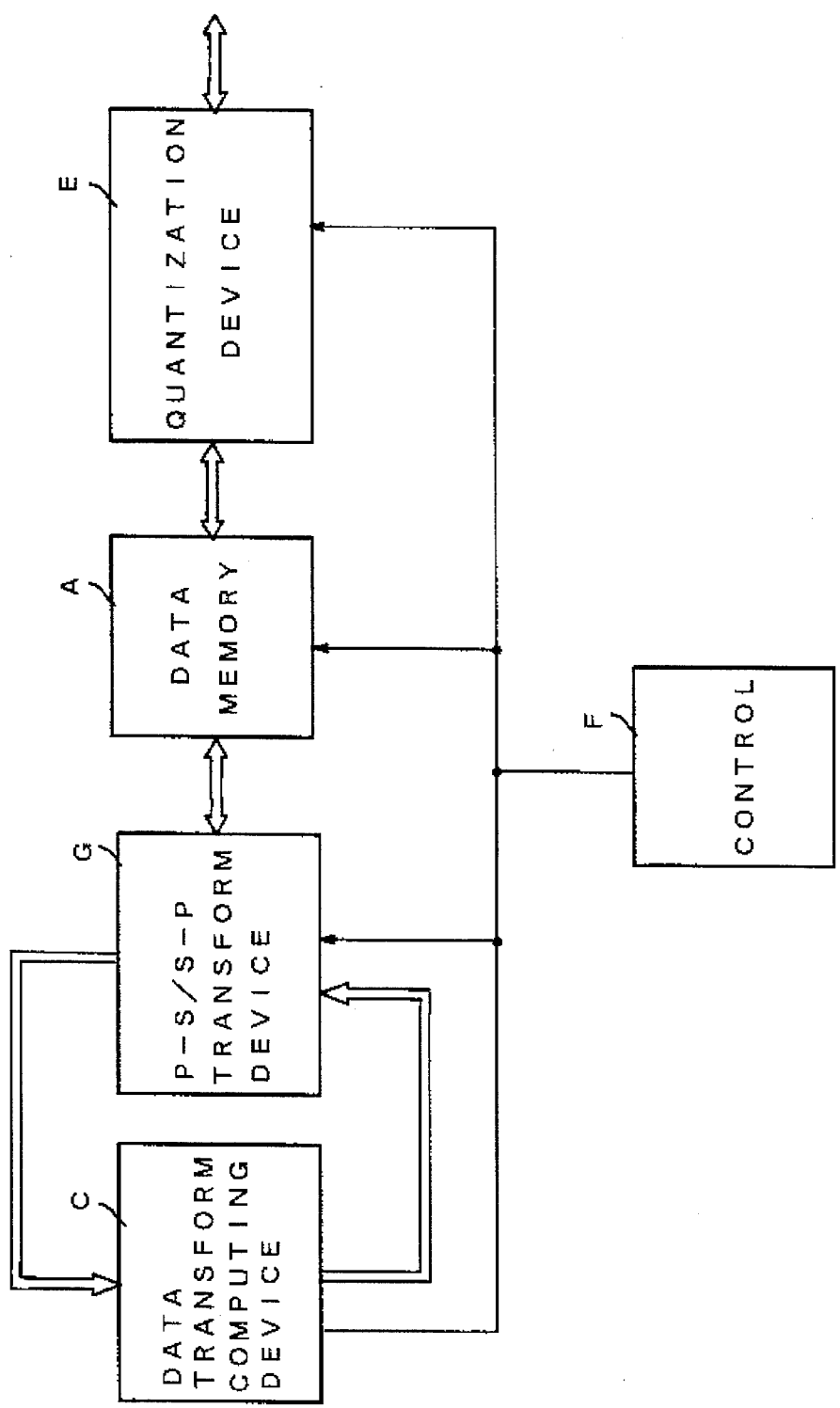
FIG. 56 depicts the overall configuration of the data compressing and extending device conformable to this invention.

FIG. 56 demonstrates the overall construction of the data compressing and expanding device having parallel to serial and serial to parallel converter E which is connected to the data transform computing device.

As has been expounded hereinabove, the parallel data in the data memory device A are converted sequentially into serial data by the converter E to be given to the data converter C where the serial data supplied after digital signal processing by serial computation at the data converter C are then converted into parallel data by the converter E to be stored once again in the same data memory device A.

Other compositions in FIG. 56 being similar to those in FIG. 12, there will be no particular need to describe them.

Figure 57:
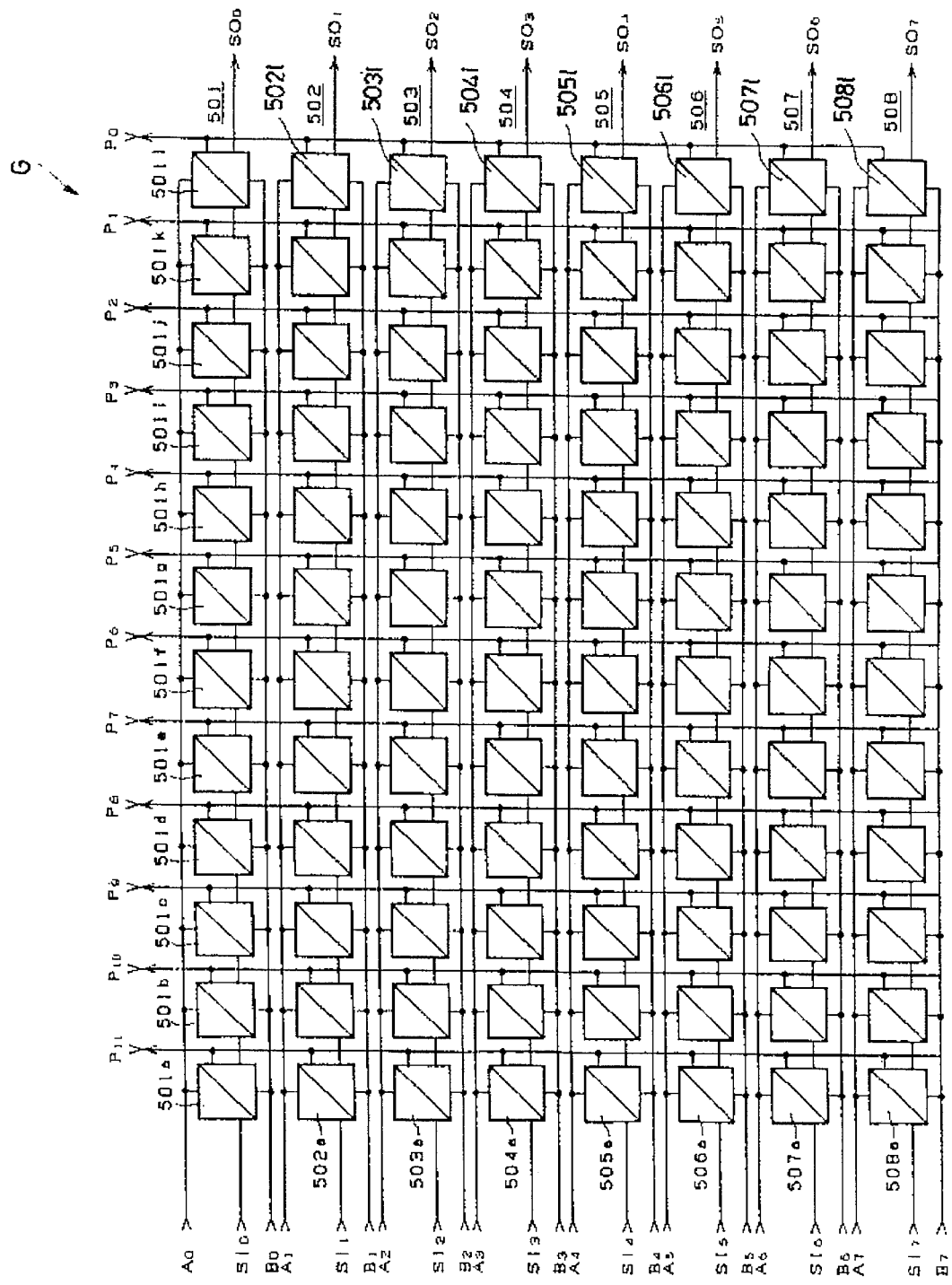
FIG. 57 represents the concrete circuitry of the parallel to serial and serial to parallel converter G as shown in FIG. 56.

In FIG. 57 which depicts in some detail the parallel to serial and serial to parallel converter G, there are 8 lines×12 bits=96 cells provided. As has been interpreted in FIGS. 13 and 16 these respective lines 501 to 508 build up a shift register.

When each cell is made to perform parallel to serial conversion, eight (8) sets of parallel data P0 to P11 are read into each cell and thereafter shift sequentially toward right in the figure in synchronization with the clock. The output from the final stage cells 5011, 5021, . . . 5081 will be serial output S01 to S07.

As will be clear from the description given later in this text, intake of parallel data P0 to P11 into corresponding cells is carried out when the enable signals B (B0 to B7) are 0 and enable signals A (A0 to A7) are 0 too.

When the data once latched are continuously bit-shifted, the enable signal A is 1, and the enable signal B, 0.

When each cell is made to execute serial to parallel conversion, eight lines of serial data SI0 to SI7 are supplied sequentially from the lowest bits. After the data corresponding to 12 bits are latched in each cell, bit-shifting toward right in the FIG., eight (8) sets of these data do output parallel sequentially as parallel data P0 to P11.

As will be distinct also from the description given later, it is so designed that the enable signal A is 1 and the enable signal B is 1 too when the serial data SI0 to SI7 enter. When the data of all bits are output as parallel data P0 to P8 after being latched, shifting to the corresponding cells, both enable signals A and B are set 1.

FIG. 58 illustrates the relationship of the enable signals A and B to the action of each cell.

Figure 59:
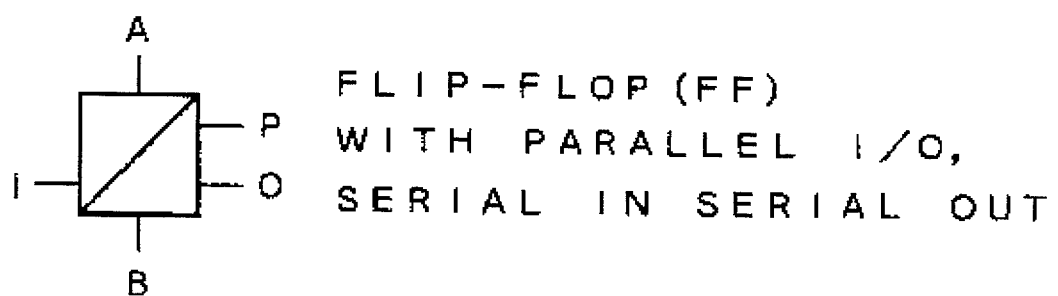
FIG. 59 is a schematic drawing showing the input and output terminals of the respective cells as shown in FIG. 57.
Figure 60:
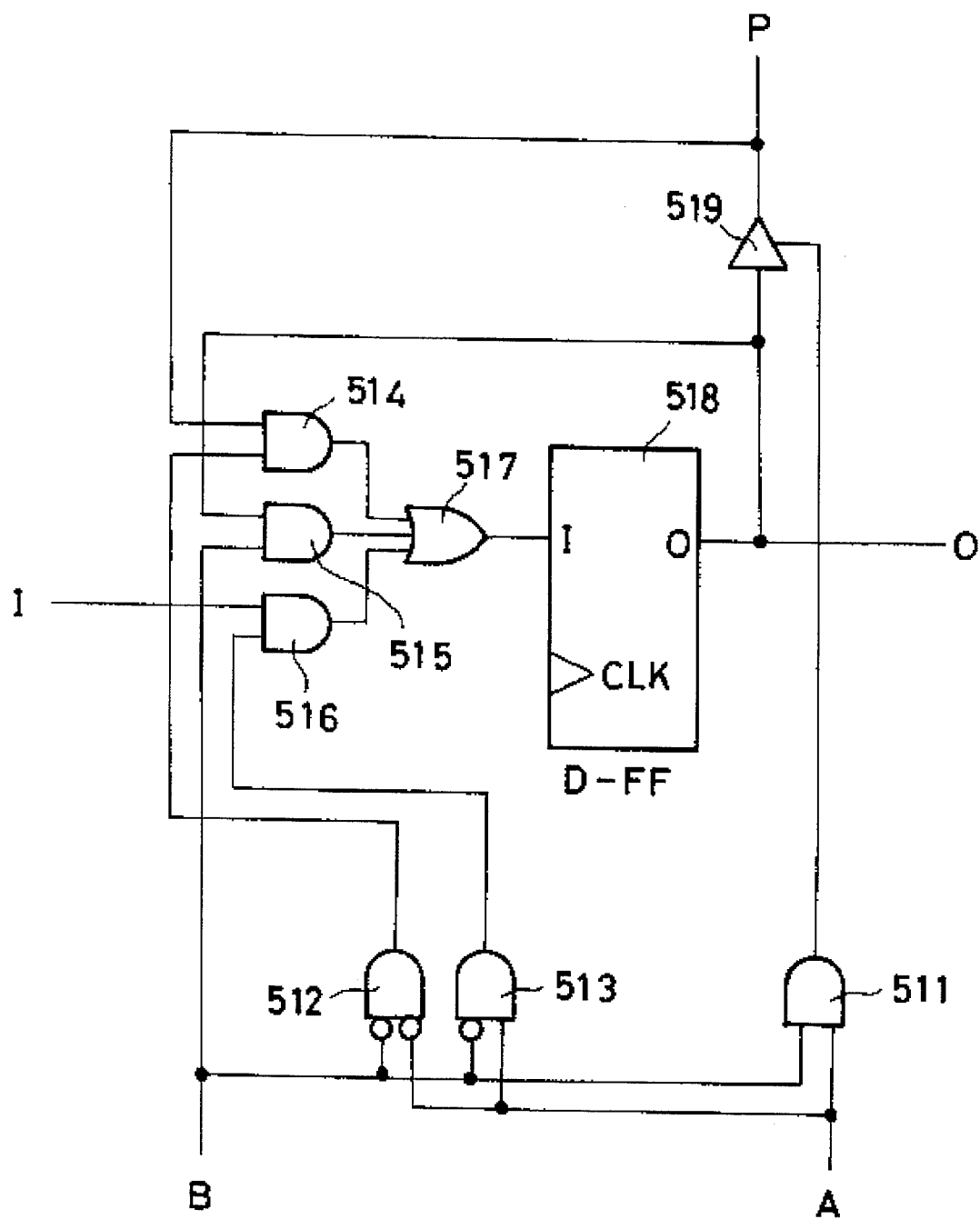
FIG. 60 shows up the concrete configuration of the cells shown in FIG. 57.
Figure 61:
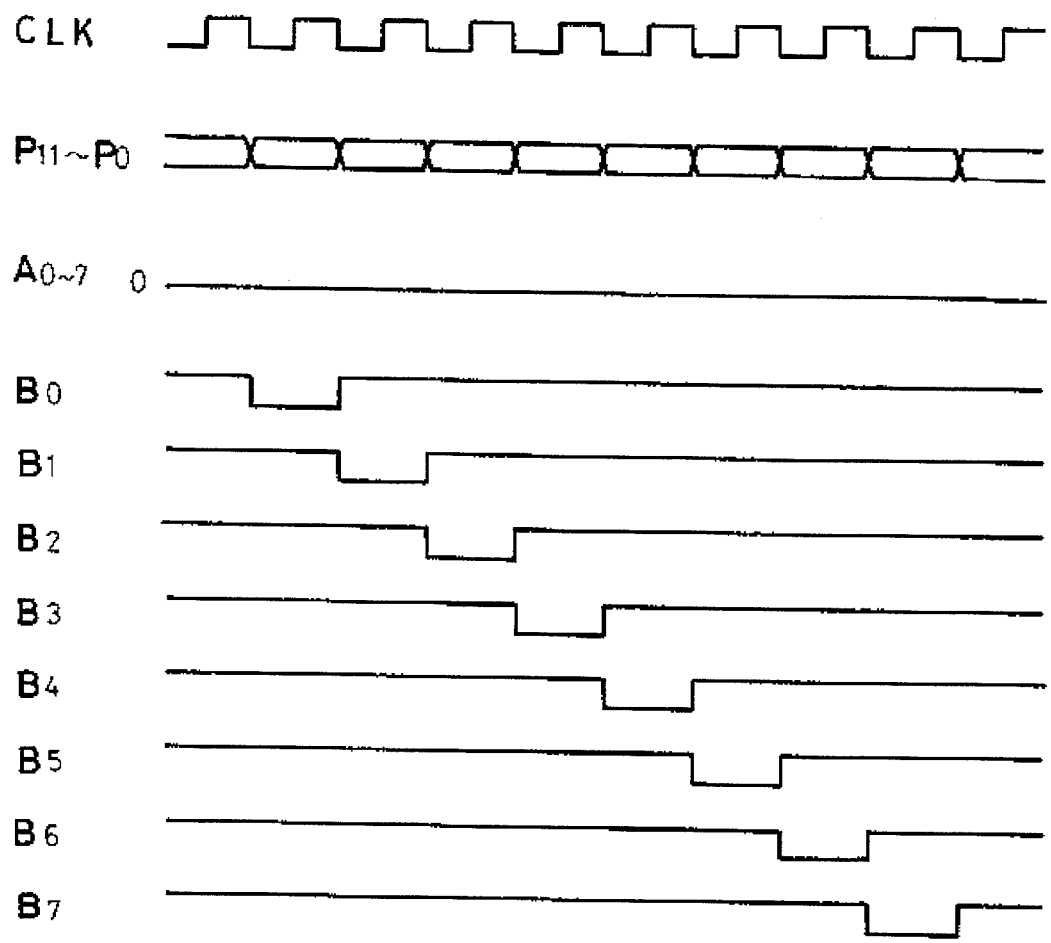
FIG. 61 illustrates the time chart showing how the parallel data are latched sequentially in the parallel to serial and serial to parallel converter G as shown in FIG. 56.

FIG. 59, which shows up the input and output relation of each cell, indicates the parallel input/output terminal as P, serial input terminal as I, serial output one as O, and the terminals of the enable signals A and B as A and B, respectively. The exemplary compositions of these respective cells are given in FIG. 60 where input/output gate is provided for D type flip-flop 518. To be more concrete, it has been so conceived that the output of the AND gates 514, 515, and 516 is given to the input terminal I of the flip-flop 518 all through the OR gate 517. The signal from the input/output terminal P of parallel data has been input at the AND gate 514.

Given to the following gate 515 is the signal fed back from the output terminal O of the flip-flop 518, and given to the AND gate 516 is the signal from the input terminal I of serial signal.

Given as gate open and close control signals to these AND gates 514, 515, and 516 are the output of the AND gate 512, enable signal B and the output of AND gate 513, respectively. As shown in the figure, these AND gates 512 and 513 are given respectively after the enable signals A and B are controlled at their respective logical levels.

The output terminal O of the flip-flop 518 is connected to the parallel input/output terminal P via tri-state buffer 519, and the make and break control of this tri-state buffer 519 is conducted on the basis of AND gate 611 to which are given both the enable signals A and B.

It is understandable from the above explanation and the active state diagram in FIG. 58 that this parallel to serial and serial to parallel converter G can perform both the parallel to serial and serial to parallel conversion.

FIG. 57 shows the active state when 8 lines of the parallel data P0 to P11 go to be latched as the enable signals B0 to B7 become 0 one after another to the sequential shift registers 501 to 508.

After thus being set to the shift registers 501 to 508 the data for all the lines will be serially output bit by bit from the lowest one in synchronization with the clock CLK.

Figure 62:
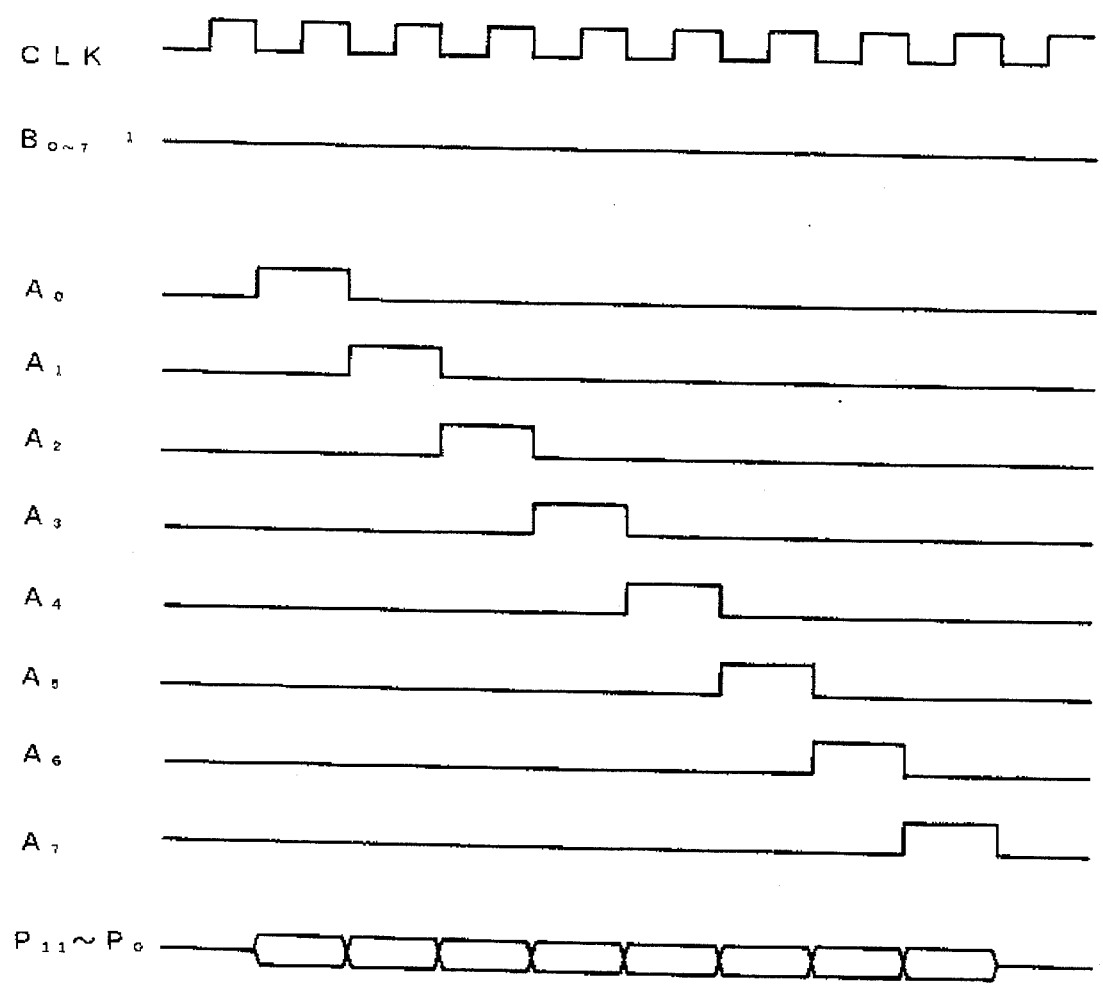
FIG. 62 gives on the other hand the time chart showing how, in the parallel to serial and serial to parallel converter G shown in FIG. 56, the latched serial data are output sequentially as parallel data.

FIG. 62 explains how the serial data for 8 lines as shifted by respective shift registers 501 to 508 are output sequentially as parallel data P0 to P11 at the timing when the enable signals A0 to A7 become 1.

Figure 63:
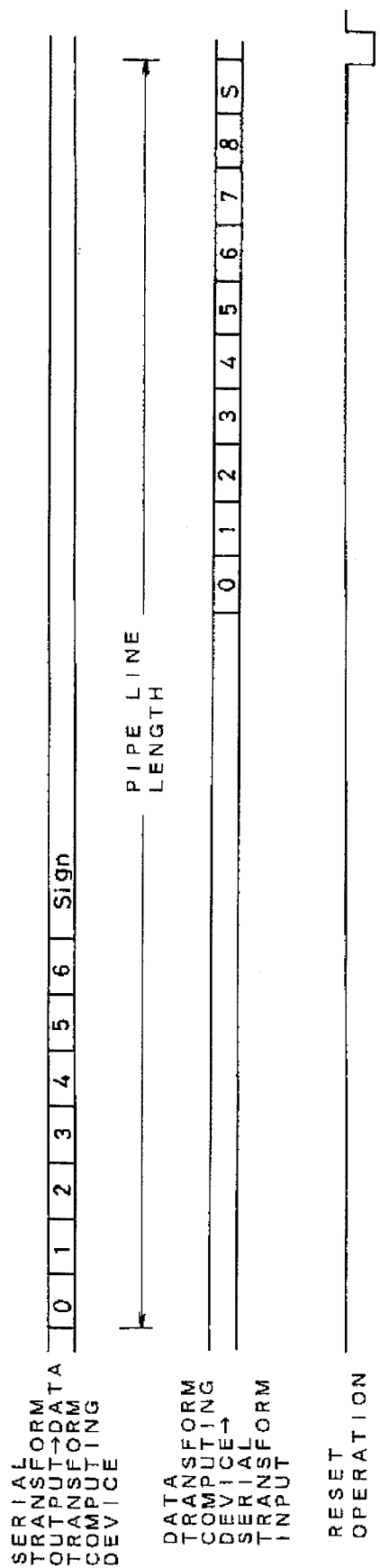
FIG. 63 gives another time chart relating to the continuous operation of parallel to serial and serial to parallel conversion in the same converter G shown in FIG. 56.

FIG. 63 is a time chart that shows up the continuous action of parallel to serial and serial to parallel conversion.

In other words, if the serial input from Parallel-to-serial/Serial-to-parallel transform device G comes from 8 bit at low bit side as an example, the data transform computation is implemented in data transform computing device C for this serial input, i.e., though the data transform computing devices are different in the above-mentioned Versions, in any case, it takes time of clock numbers as long as pipe line length. The serial transform output from low bit side comes from data transform computing device C, and is transfered to parallel-to-serial/serial-to-parallel transform device G, and then stored in data memory device C as parallel transform data.

As has been described referring to FIGS. 13 and 16, reset of all the flip-flops is made, after a series of actions, for the data converter C. In the event that this resetting is not effected, the input of the flashing bits in the pipeline processing may guarantee that the content of the flip-flop should not become queer.

Since both the parallel to serial and serial to parallel conversions are conducted in only one circuit (FIG. 60), the device results in having one flip-flop and several gates per cell less than in the case where these two converters are provided separately (FIGS. 15 and 18). In total therefore the circuit largeness can be reduced by the number of cells (96).

APPLICATION EXAMPLE

In the next, the application examples which used the data compressing/expanding device is this invention are described.

Example Description of Digital Still Camera

Figure 64:
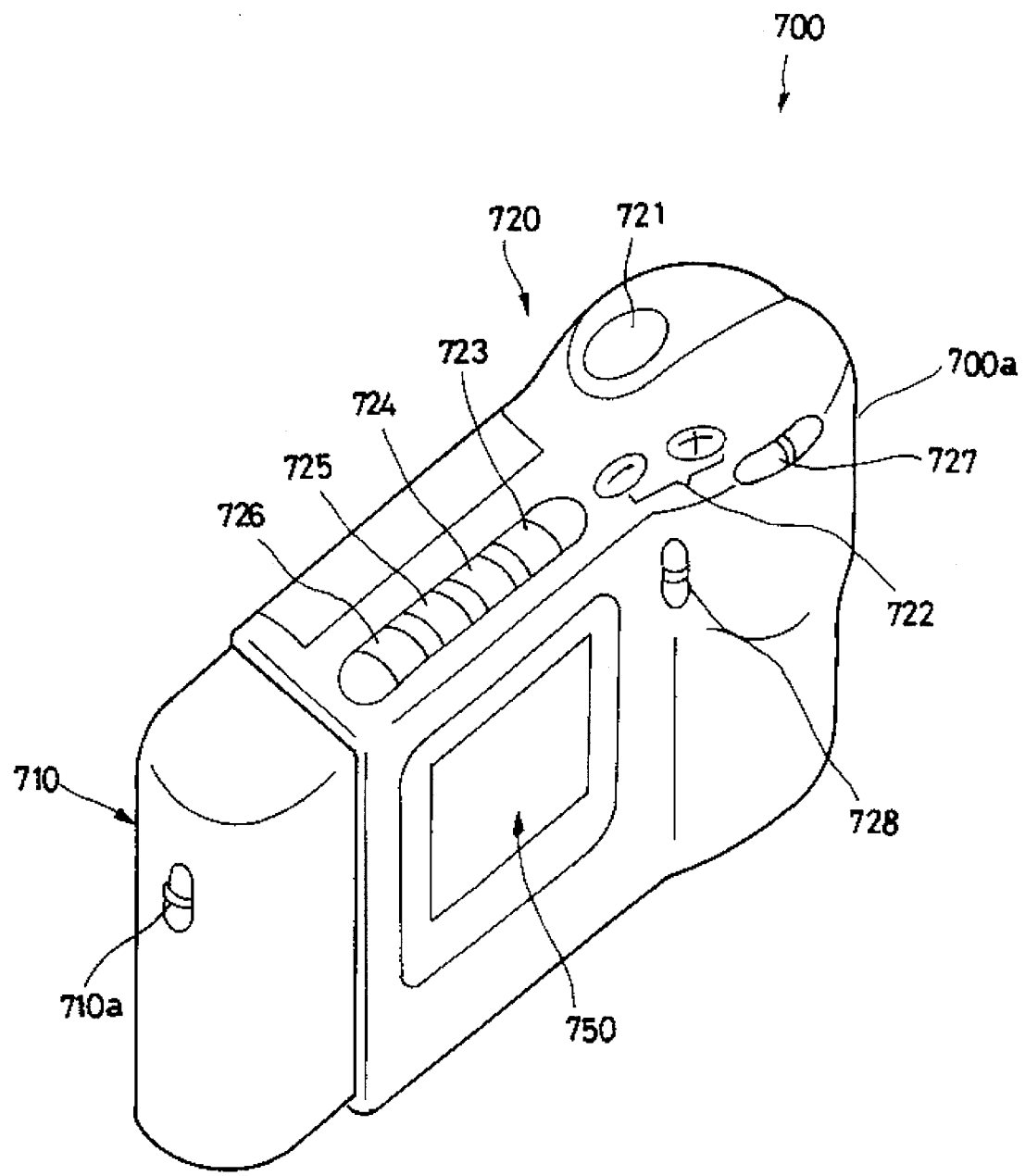
FIG. 64 is a sketch drawing of the digital still camera shown as the first application example of the data compressing and expanding device in accordance with this invention.
Figure 65:
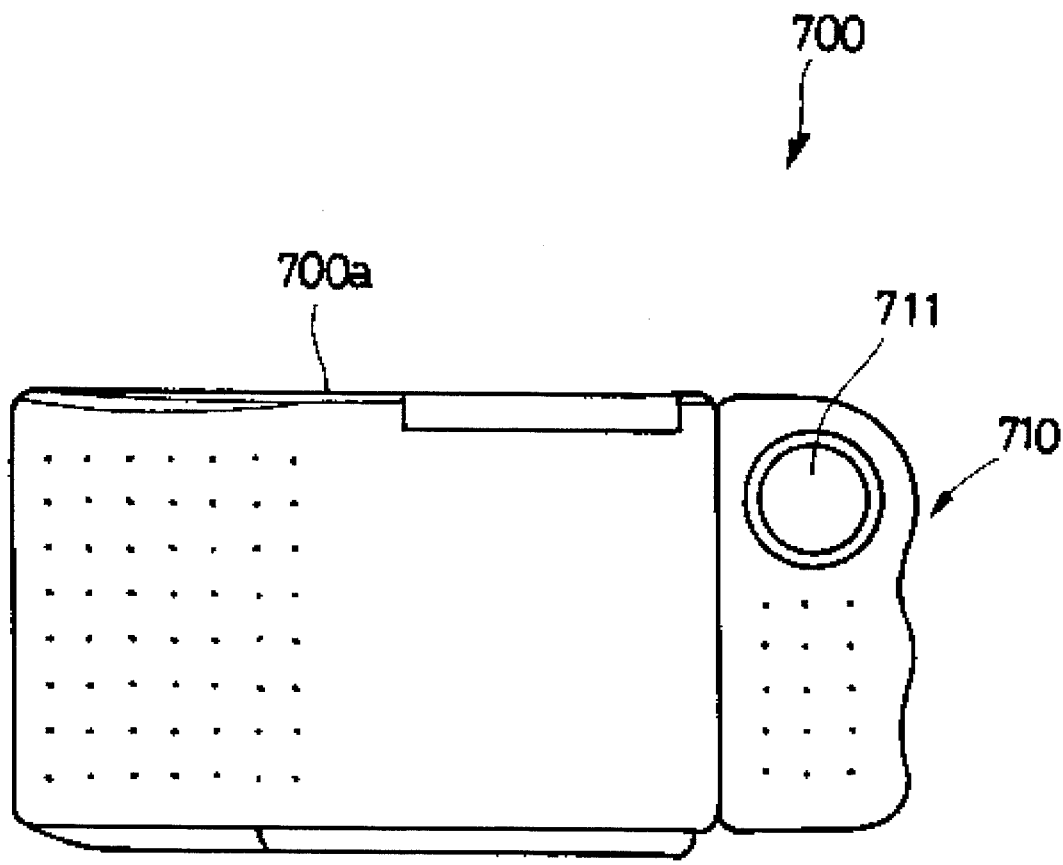
FIG. 65 is a front view of the same digital still camera.

First of all, as the first application example, the practical example of using this invention in digital still camera is described. FIG. 64 shows an outside drawing of the electronic camera; FIG. 65, an elevation of the electronic camera shown in FIG. 64; and FIG. 66 outlines the block diagram of the construction of the same electronic camera.

In FIGS. 64 and 65 the electronic camera 700 is a portable, compact and light-weighted camera, where its box 700a is formed into a rectangular parallelepiped, diminutive in depth and long and narrow in transversal direction.

Mounted on the left side of the box 700a is a camera block 710 in front of which is mounted a lens 711 (FIG. 65) and on the lateral side of which is installed a lens changeover switch 710a.

Provided on the back face and upper face of the box 700a are a liquid crystal display unit 750 and a keyboard 720 having a shutter button, said liquid crystal display unit 750 comprising a display driver (DD) and a liquid crystal display (LCD) as will be described later referring to FIG. 66, and said keyboard 720 having plural key switches in order for an operator to give necessary instructions when selecting one among a variety of processings at the level of the electronic camera 700. The keyboard 720 comprises a shutter button 721, a plus and minus key 722 intended to change over image data, a mode key 723 for selecting one out of plural modes, a display key 724, a zoom key 725, and a self-timer key 726. The foregoing liquid crystal display unit 750 will be, by way of example, an active matrix type liquid crystal display using the TFT (thin film transistor) system, whose screen size will be 1.4 inch. Furnished further on the upper face of the box 700a are the power switch 727 which turns on and off the main power supply for the electronic camera 700, and a function switch 728.

Figure 66:
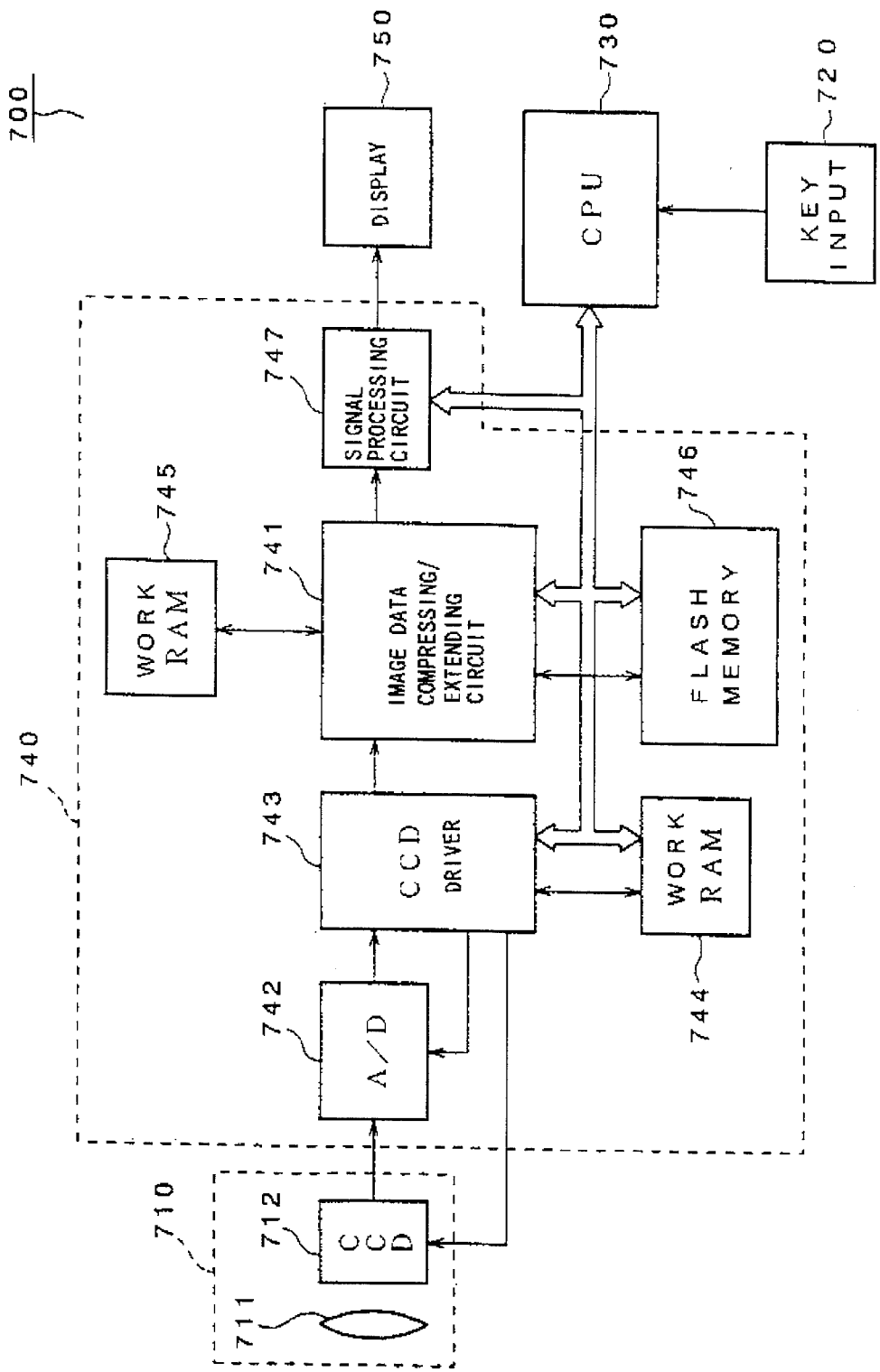
FIG. 66 shows the internal circuitry of the same digital still camera.

Referring to FIG. 66, the electronic camera unit (image equipment) 700 incorporates a camera block 710, a keyboard 720, a control 730, an image processing unit 740, and a liquid crystal display unit 750; said control 730 and image processing unit 740 being connected to a bus 760.

The camera block 710 consists of a lens 711 and a charged coupled device (CCD) 712.

The lens 711 is an optical, glass or plastic, lens installed on the body of the electronic camera 700. The CCD 712 emits an electric signal in conformity to the intensity of the light of the image formed by the lens 711 to output this signal (analog electric signal) to the image processing unit 740.

The keyboard 720 including the shutter button and plural key switches gives such instructions as shutter, recording and reproduction.

The control 730 comprises a CPU (Central Processing Unit), a RAM (Random Access Memory) and a ROM (Read Only Memory).

Said control 730 runs a variety of programs pursuant to the instructions given from the keyboard 720 and outputs a number of control signals to respective portions in the electronic camera 700 by way of the bus 760 to control the same portions.

The image processing unit 740 consists of an image data compressing and expanding circuit 741, an analog to digital (A/D) converter circuit 742, a CCD driver 743, work RAMs 744 and 745, a flash memory 746, and a signal processing circuit 747.

Said CCD driver 743 controls, according to the operational timing from a timing generator (not shown), the image pickup action of the camera 710; for instance, the timing control of the CCD 712, shutter control, and sampling control for analog to digital conversion.

The signal of the image sensed by the CCD 712 is output to the CCD driver 743 and work RAM 744, where the image signal thus input is separated into a luminance signal YH and color difference signal C to be output to the image compressing and expanding circuit 741.

The analog to digital converter circuit 742 converts the analog image signal as input from the camera 710 into a digital signal processable in the image processing unit 740 to output it to the work RAMs 744 and 745 and to the image data compressing and expanding circuit 741.

Said image data compressing and expanding circuit 741 that comprises the respective data conversion and arithmetic units which have been explained as data transform computing device Ver. 1 to Ver. 4 as described in some detail under the foregoing embodiments, converts the image data stored in the work RAMs 744 and 745 into so many serial data and compresses these data by serial arithmetic operation, or else expands, also by serial arithmetic operation, the compressed image data as stored in the flash memory 746 to output the image data thus expanded to the work RAMs 744 and 745.

The work RAMs 744 and 745 are the semiconductor memories which temporarily store either the image pickup data under processing or the image data at the time of compression; the work RAM 744 being used when the image pickup data is converted into image data, and the work RAM 745 being employed on the way to the compression and expansion processing.

The flash memory 746, a non-volatile memory collectively erasable by unit of word or cell, is an image memory intended to store the image data as compressed and expanded by the image data compressing and expanding circuit 741.

The signal processing circuit 747 processes the image data as compressed and expanded by the image data compressing and expanding circuit 741 in such a way as to be displayed on the liquid crystal display unit 750.

By way of example the liquid crystal display 750 is composed of the TFT (thin film transistor) liquid crystal display module incorporating the liquid crystal DD (display driver).

Now explained will be the working operation of this embodiment.

Manipulation of the shutter button 721 and plural key switches from the keyboard 720 enables such control as shutter, recording and reproduction.

The data of the image taken at the level of the lens 711 and CCD 712 will be input into the image processing unit 740 and converted from analog into digital by the analog to digital converter, and be stored in the image memory 746 consisting of the flash memory via the CCD driver 743.

This CCD driver 743, which is destined to control this operation, controls the timing of the CCD 712, performs the shutter control and the sampling control of the analog to digital conversion, and converts the image pickup data into image data by means of the work RAM 744.

In other words, when sensing the image, the raw image pickup data coming from the CCD 712 is once memoried in the work RAM 744 where the data is separated, through the control by CPU 730, into the luminance signal YH and color difference signal C, then sent to the image data compressing and expanding circuit 741 to be compressed, and finally recorded in the flash memory 746 as image memory.

At the time of video-through, that is, under normal conditions except when taking views such as watching image from the CCD through view finder, the image pickup data transformed into image signal through intermediary of the CCD 712, CCD driver 743, and work RAM 744 is displayed on the display unit 750 after passing through the signal processing circuit 747, not by way of the image data compressing and expanding circuit 741.

Parallel data is input into and output from the aforementioned image data compressing and expanding circuit 741, wherein the data is tranformed into serial one and serially processed as has thus been described.

When reproducing, the data as read out of the flash memory (image momery) 746 is expanded by means of the image data compressing and expanding circuit 741, converted into an image signal for displaying by means of the signal processing circuit 747, and converted from digital into analog by an inner digital to analog converter (not shown) to be displayed on the display unit 750. Although we may use, as the display unit 750, the TFT (thin film transistor) liquid crystal display module incorporating the liquid crystal driver, there is no need of digital to analog converter in the case of simple matrix liquid crystal display unit.

Because, as has thus far been explained, this embodiment performs the compression and expansion of the image data by serial processing using the foregoing image data compressing and expanding circuit 741, we can reduce by far the largeness of the compressing and expanding circuit for image data and perform the processing at a high speed. Materialization of a data compressing and expanding apparatus with higher operational accuracy and smaller circuit will allow the whole electronic camera including the image processing unit 740 to be by large compacter and less costly.

Although we chose to describe, in this embodiment, an application, to the electronic camera, of the data compressing and expanding apparatus and image equipment according to this invention, they can naturally be applied also to, for instance, a video camera.

Also in this example, it has been so designed that the compressed image data is stored into the flash memory 746. Any device however will do if only it uses the aforesaid image data compressing and expanding circuit 741 for the compression and expansion of the image information. There also is no doubt that we can utilize, as a means to record the image data, not only the flash memory but other semiconductor memories, magneto-optical (MO) disks, floppy disks, and so forth.

Example Description of Visual Telephone Device

In the next, as the second application which used this invention visual telephone device is described.

Figure 67:
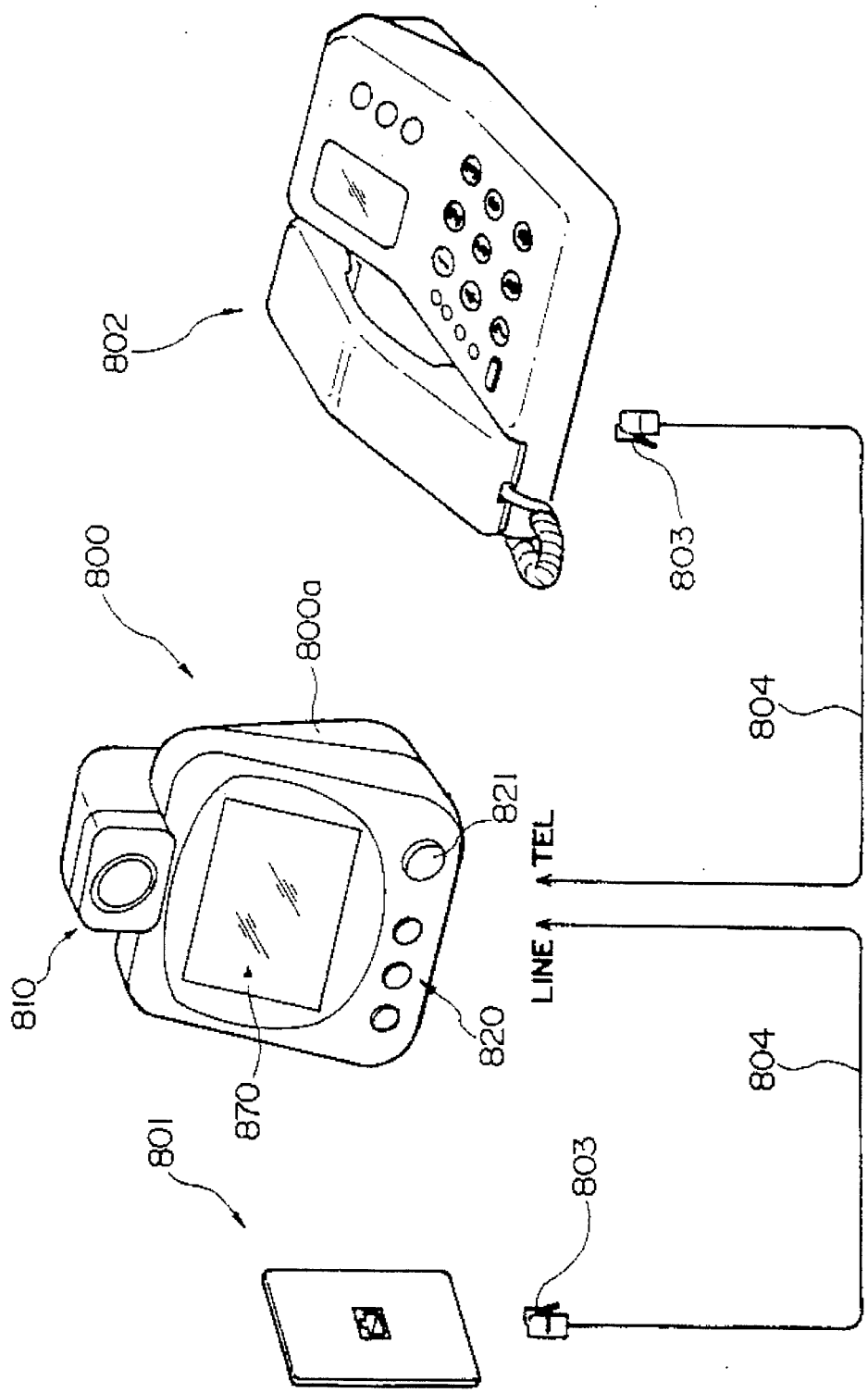
FIG. 67 is a sketch drawing of the visual telephone as the second application example of the data compressing and expanding device conformable to this invention.
Figure 68:
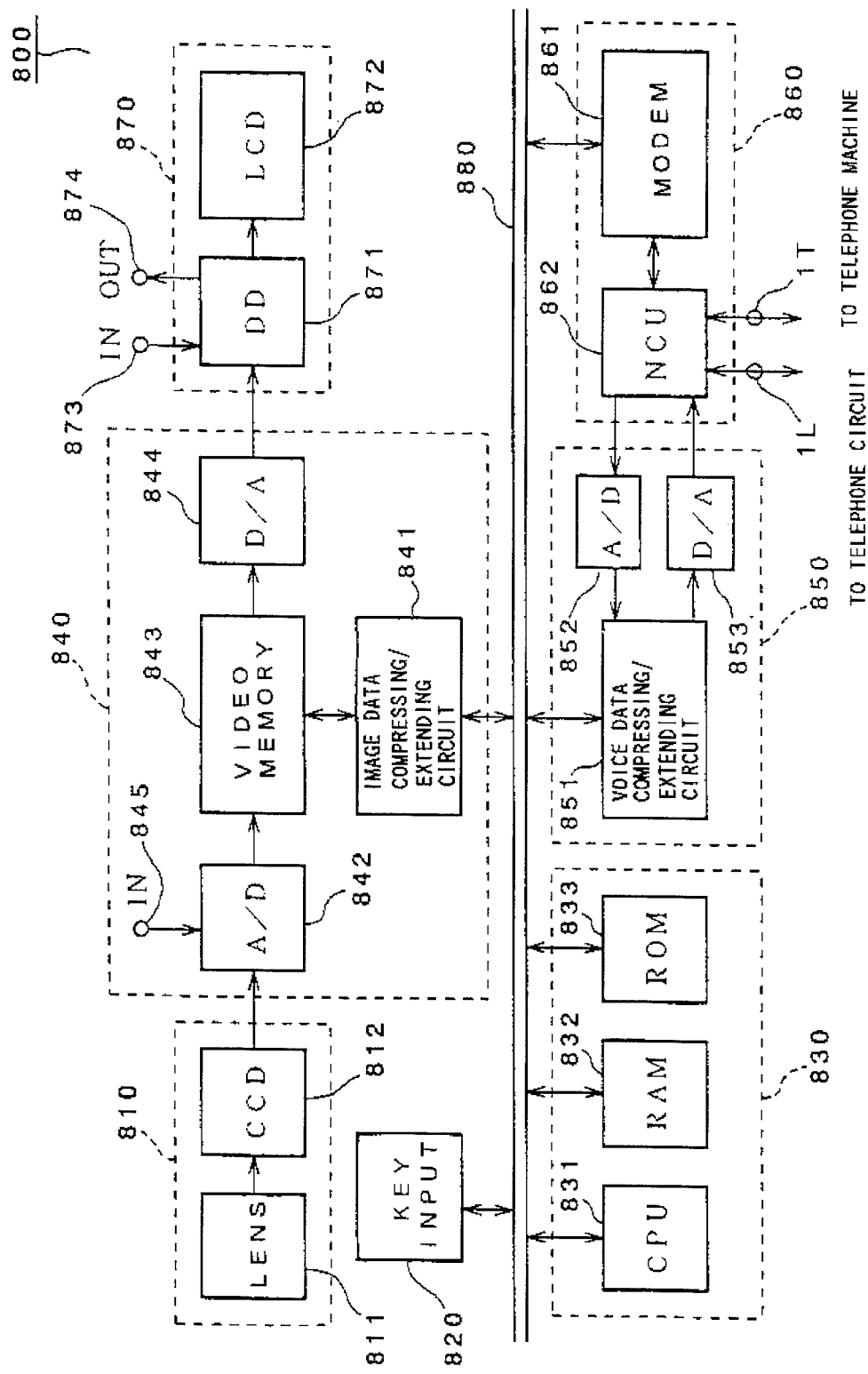
FIG. 68 shows up the internal circuitry of the same visual telephone.

First the construction will be explained. FIG. 67 is an outside drawing of a visual telephone 800, while FIG. 68 illustrates a block diagram showing schematically the configuration of the electronic camera as depicted in FIG. 67. Hereunder we will tale up, as an example of communication channels, the general subscriber lines of analog telephone.

Referring to FIG. 67, the visual telephone 800 has a color liquid crystal display panel, 3 inches in screen size, and 110×160 pixels (picture elements). Provided on its back face are the input-output terminals 1L and 1T as described later.

This visual telephone 800, which is installed between an input-output terminal modular jack type receptacle 801 and telephone set 802, connects the modular jack type receptacle 801 to the input-output terminal 1L and the input-output terminal 1T to the telephone set 802 by way of a modular cable 804 having, at its ends, modular plugs 803.

In FIG. 67 the upper central portion of the box 800a of the visual telephone 800 has a camera block 810 and the camera portion 102 is installed on the upper end of said box 800a.

Furnished on the frontal side of the box 800a are a liquid crystal display unit 870 and a keyboard 820. As will be explained later referring to FIG. 67, the liquid crystal display unit 870 comprises a display driver (DD) 871 and a liquid crystal display (LCD) 872, while the keyboard 820 consists of plural key switches intended for an operator to give instructions when selecting any one of various processings at the level of the visual telephone 800. By way of example, the aforesaid liquid crystal display unit 870 is an active matrix type liquid crystal display of TFT system, 1.4 inch in screen size, and is provided with a high resolution color liquid crystal display panel, 220×279=61380 pixels, wherein the respective picture elements arranged in delta form correspond to the three primary colors: R (red), G (green) and B (blue).

Further the frontal face of the box 800a mounts a power switch 821 which turns on and off the main power supply of the visual telephone 800.

The visual telephone 800 according to this embodiment incorporates telephone function provided with a modem (MOdulation and DEmodulation) and NCU (Network Control Unit). As shown in FIG. 67, it transmits and receives both the image data and voice data through the communication channel 801 by means of the embedded telephone function which is connected between the communication channel 801 and the telephone set 802.

FIG. 68 is a block diagram which shows schematically the configuration of the visual telephone 800 as depicted in FIG. 67.

In FIG. 68 the visual telephone 800 comprises a camera block 810, a keyboard 820, a control 830, an image preocessing unit 840, an audio processing unit 850, a modulatordemodulator 860, and a liquid crystal display unit 870. Connected to a bus 880 are the keyboard 820, control 830, image processing unit 840, audio processing unit 850, and the modulator-demodulator 860.

The camera block 810 consists of a lens 811 and a CCD (charge coupled device) 812.

The lens 811 provided on the body of the visual telephone 800 is an optical glass or plastic lens, while the CCD 812 emits an electric signal based on the intensity of the light of the image formed by the lens 811 to output this analog electric signal to the image processing unit 840.

The keyboard 820, composed of plural key switches, is intended for an operator to give instructions when selecting one of the varied processings at the level of the visual telephone 800.

The control 830 comprises CPU 831, RAM 832 and ROM 833.

The CPU 831 outputs, to respective portions in the visual telephone 800 through the bus 880, a variety of those signals that control said portions, and at the same time runs the communication control programs responding to so many types of telecommunication lines connected. The CPU 831, on the other hand, receives the image and voice data sent as multiplexed data from the partner's video phone. When the data are input as demodulated by the modulator-demodulator unit 860, the CPU 831 separates the image and voice data thus demodulated, outputs the compressed image data to the image data compressing and expanding circuit via the bus 880, and gives the compressed voice data to the audio compressing and expanding circuit 851 also by way of the bus 880.

Furthermore this CPU 831 multiplexes both the compressed image data as input from the image data compressing and expanding circuit 841 through the bus 880 and the compressed voice data input, through the same bus 880, from the audio compressing and expanding circuit 851 to output these two as image and voice data to the modulator-demodulator 860 always via the bus 880.

The RAM 832 is a semiconductor memory that stores such program data as utilized in the processing of the program run by the CPU 831 as well as compressed image and voice data.

The ROM 833 is a semiconductor memory which stores such programs and data as used in the visual telephone 800.

The image processing unit 840 comprises an image data compressing and expanding circuit 841, an analog to digital converter circuit 842, a video memory (VRAM) 843, and a digital to analog converter circuit 844. The numeral 845 symbolizes an image input terminal.

The image data compressing and expanding circuit 841, which is composed of the respective conversion and arithmetic units which have been explained as data transform computing devices Ver. 1 to Ver. 4 compresses the image data stored in the video memory 843 by serial arithmetic operation after converting said data into serial one, or else, expands by serial arithmetic operation the compressed image data as stored in the video memory 843 to output the image data thus expanded to the exterior.

The analog to digital converter circuit 842 converts the analog image signal as input from the camera block 810 into the digital signal processable in the image processing unit 840 to output it to the video memory 843.

The video memory 843, which consists of the VRAM (video RAM), is a semiconductor image memory intended to store either the digital image data as output from the analog to digital converter circuit 842 or the digital image data compressed and expanded by the image data processing and expanding circuit 841.

The digital to analog converter circuit 844 converts the digital information signal of the image data as stored in the video memory 843 into the analog signal to be displayed on the liquid crystal display unit 870 to output the signal. Since in this embodiment an analog information driver is used as the data driver for the LCD 872 described later, it needs a digital to analog converter circuit, but this digital to analog converter circuit 844 is not necessary if the data driver used is a digital one.

The audio processing unit 850 comprises an analog to digital converter circuit 852, an audio compressing and expanding circuit 851, and a digital to analog converter circuit 853.

The analog to digital converter circuit 852 converts the analog aural signal as input from the modulator-demodulator unit 860 into the digital signal processable in the audio processing unit 850 to output it to the audio compressing and expanding circuit 851.

The audio compressing and expanding circuit 851 compresses, namely encodes, the digital voice data as input from the analog to digital converter circuit 852 through predetermined encoding system by means of analysis against the data input during a certain time interval, composition of waveform from the parameters analyzed, and of error calculation of input waveform and composed waveform, all for instance by way of the algorithm CELP (Code-Excited Linear Prediction), and outputs the compressed voice information to the digital to analog converter circuit 853 or expands, namely decodes, the received compressed voice data as demodulated by the modulator-demodulator unit 860 to output the expanded voice data to the digital to analog converter circuit 853.

The modulator-demodulator unit 860 is composed of a MODEM (MOdulation and DEModulation) 861 and an NCU (Network Control Unit) 862. The symbols 1L and 1T signify respectively the input-output terminals of the communication channels, that is, general subscriber lines, 1L being connected to the modular jack type receptacle and 1T, to the telephone set, both by way of a modular cable.

The modem 861 and NCU 862 have both double function; a function as the modulator which converts the serial digital signals as output from either a computer or terminal equipment into the analog signals transmittable through communication channels and sends these signals, on the one hand, and another function as the demodulator which returns the analog signals transmitted through the communication channels into such digital signals as can be deciphered by the computer or terminal equipment, on the other. The NCU 862 makes it possible to use these signals in the general subscriber lines.

The modem 861 and NCU 862 as embodied in this example enable to transmit signals at transmission rate of 14400 bps, the maximum speed usable in the public analog lines of telecommunication. By incorporating both video codes and audio codes into one frame to be a processing unit, they transmit the image data and voice data simultaneously, transmitting the image data for one picture as intermittent images at the rate of 1 frame per 3 seconds.

The liquid crystal unit 870 comprises a DD (display driver) 871 and a LCD (liquid crystal display) 872. The numerals 873 and 874 denote an image input terminal and an image output terminal respectively.

The DD871 drives the LCD 872 in order to have it display an image in conformity either to the image signal as input from the image processing unit 840 or to the one input from the image input terminal 873.

The LCD 872 composed of the color liquid crystal display unit having TFT (thin film transistor) type liquid crystal display panel, one of the active matrix systems, displays the color image signal, 4096 colors maximum (12 bits) by driving the DD 871.

The bus 880, which is a common signaling path connecting the keyboard 820, control 830, image processing unit 840, speech processing unit 850, and modulator-demodulator 860, comprises the address bus to assign an address and the data bus intended to transfer data.

Explained next will be the working operation of this embodiment.

First we will describe the action by the control 830. Note that the program corresponding to the processing action of the CPU 831 in the control 830 has been stored in the ROM 833 in the same control 830.

To begin with, an operator will raise the telephone receiver into off-hook position, and the input of the telephone number of the other end will dial-up via the NCU 862.

Then it is discriminated whether or not the communication channel has been connected, and if not, redialing will be repeated up until it is connected.

When connected, the following transmission and reception processing will be performed.

Since the visual telephone 800 in this embodiment implements, in the transmission and reception processing, the image information and speech information processings in parallel at the same time, we will hereunder separate respectively the transmission and reception into image transmission and speech one, on the one hand, and into image reception and speech one, on the other.

In the image transmission processing, the data of the image sensed by the camera block 810 is stored in the video memory 843 via the analog to digital converter circuit 842, and the image information stored in this video memory by the image data processing and expanding circuit 841 is compressed by prescribed compressing process.

The image data thus compressed will be output at the modulator-demodulator unit 860 to be transferred to the other end by the same modulator-demodulator unit 860 through intermediary of the bus 880.

In the event of the image reception processing, the voice data as input from the receiver of the telephone set is outpout to the analog to digital converter circuit through the modulator-demodulator unit 860 and compressed through the prescribed compression processing by the audio compressing and expanding circuit 851.

The voice data thus compressed is output at the modem 861 in the modelator-demodulator 860 by way of the bus 880 and transferred to the other end through the NCU 862 and input-output terminal 1L.

In the event of the image reception processing, the modulator-demodulator unit 860 decides if there be or not any image receiving signal, and if any, the demodulated image information will be output to the image processing unit 840 via the bus 880, and the image information received will be expanded by the image data compressing and expanding circuit 841.

As the image data thus expanded is stored in the video memory 843, the data is output at the liquid crystal display unit 870 via the digital to analog converter circuit 844 to be displayed on the LCD 872.

In the speech reception processing, the modulator-demodulator unit 860 discriminates whether or not there be any speech receiving signal, and if any, the aural signal demodulated is output at the audio processing unit 850, and the voice data received is output at the audio compressing and expanding circuit 851 via the bus 880 to be expanded by this same circuit 851.

Then the expanded voice information will be output at the NCU 862 in the modulator-demodulator unit 860 by way of the digital to analog converter circuit 853, and the voice will be output at the telephone set through the input-output terminal 1T.

The above transmission and reception processing will be repeated up until the receiver of the telephone set restores its on-hook position.

As has so far been described, the present embodiment allows to materialize a high-quality image transmission making full and fledged use of of the intrinsic characteristics of the visual telephone that one can converse on telephone line looking at the face of the person at the other end.

Since in particular we utilize the image data compressing and expanding circuit 841 that performs the compression and expansion of the image data according to the serial processing described before, as a data compressing and expanding circuit for the image data stored in the video memory 843, the largeness of the image data compressing and expanding circuit 841 can be by large reduced, and at the same time a processing at higher rate becomes probable. Because, as a result, a data compressing and expanding apparatus with reduced scale of circuit can thus be realized, the visual telephone as a whole, including the image processing unit 840 can be rendered far compacter and less costly correspondingly.

It is to be noted that the voice information compression system is not limited to the CELP algorithm as described in the context of this example, but that AD-PCM (Adaptive Differential Pulse Code Modulation) system or VSELP (Vector Sum Excited Linear Prediction) system for instance will do.

Until now, several practical examples of this invention and its applications described as above in details, but this invention is not just limited in these examples.

Except DCT, the idea of this invention can be applied for other transform processings, e.g., FFT (Fast Fourier Transform), LOT (Lapped Orthogonal Transform), Haar Transform, Slant Transform, DST (Discrete Sine Transform), etc.. In general, the idea of this invention can be applied for the transform processing types which operate like orthogonal transform processing and are implemented by the bit serial computation processing.

Furthermore, this invention also can be applied for the digital filter which is based on the bit serial computation processing, so that, for this invention, the signals which can be processed are not just the above-mentioned image signal but also other signals like voice processing.

In the above-mentioned Principle I, based on the basic algorithm, by approximating the constant coefficients with integer ratio as small as possible, the reduction of the circuit coefficients is implemented by the combination of several kinds of coefficients values. Therefore, by wrong running, the only thing is to find out the set of coefficient values. The most suitable set of coefficient values is determined by the basic algorithm.

Therefore, the variation of the gain which is happened by the approximation of coefficient values with integer values can be absorbed in the quantization parts as described before. In this case, the variation of the quantization parts is determined definitely referring to the corresponding approximation of the coefficient values.

By applying Principle I, because of the transform and inverse transform, at least in some of blocks, the breakout of the symmetry is happened. But in the particular blocks, by providing the particular (exclusive) circuits only for transform and the particular (exclusive) circuits only for inverse transform, this problem can be solved. Therefore, the transform circuit which can deal with both of transform and inverse transform is configured by these kinds of particular circuit elements.

These particular (exclusive) circuit elements can be determined by the basic algorithm, and they also can be determined definitely by the various transforms, the corresponding inverse transforms and their relations with the set of approximated coefficients.

In the next, for Principle II, on stage II & III (odd) of FIGS. 22 and 23 in the above practical example, the configuration (FIGS. 41, 47 and 55) in which the coefficients are factorized, and the first part (the computation of $b_i * C_j$) and the latter part (the addition with multiplication of power of 2) are separated is applied.

Based on the basic algorithm, this can be realized by the investigation that the computation in which stage the idea of Principle II could be used, and by the searching of the most suitable factorization by wrong running, since the factorization of coefficients can have various combination.

Furthermore, for Principle III and IV, by removing the period Flip-Flop provided in the latter part of 1 bit serial full-adder and 1 bit serial full-subtractor, the computing time can be saved and the fast computation can be realized. Nevertheless, in the case where a number of algorithms are realized by the wire connection changing of several circuit block elements i.e., in the case of implementation of FDCT and IDCT by changing the wire connection of stages shown in FIGS. 26 and 43, the danger of the time delay for the signal transmission between one circuit block and another circuit block. By removing the above-mentioned period Flip-Flop in circuit block (stage) and leaving the circuit block (stage) in the last part of circuit block, the error operation from the occurrence of critical bus is prevented previously. By applying principles III and IV, both the stability of circuit operation and fast computation are realized.

Finally, for Principle V, the parallel/serial transform as the first part of bit serial computing processing and the serial/parallel transform as the latter part are implemented by one circuit configuration. The bit number of these parallel/serial to serial/parallel transforms can be changed to fit the precision of digital signal processing.

Although the several embodiments of the present invention have been described, these embodiments are simply illustrative and not restrictive. The present invention may therefore be modified in various manners. All the modifications of the present invention are within the scope and sprit of the invention, so that the scope of the invention should be determined only what is recited in the appended claims and their equivalents.

I claim:

1. An apparatus for transforming digitized data, comprising:

supplying means for supplying said digitized data;

arithmetic means for executing operations on said supplied data for said transforming of the digitized data;

said arithmetic means comprising bit-serial for performing bit-serial arithmetic operations;

said bit-serial means comprising distributed strings of flip flops, adder and/or subtracter for performing said bit-serial arithmetic operations;

said strings having a function of performing multiplications without any actual bit-parallel multiplier; and said multiplications using multiplication constants M1–MN by which said digitized data are multiplied, said multiplication constants M1–MN being integers and approximately in proportion to ideal-valued constants C1–CN such that M1/C1≈M2/C2≈ . . . ≈MN/CN ≈P in which P is a non-two's power number.

2. The apparatus of claim 1, wherein said digitized data represents an image.

3. The apparatus of claim 1, wherein said transforming includes a forward transforming mode for compressing said digitized data.

4. The apparatus of claim 1, wherein said transforming includes a forward transforming mode for expanding said digitized data.

5. The apparatus of claim 1, having forward and inverse transforming capabilities in which the forward transforming capability processes uncompressed digital data into those in a transform domain for data compression, and the inverse transforming capability processes digital data in said transform domain back to those in an uncompressed domain for data expansion.

6. The apparatus of claim 1, wherein said transforming comprises to an orthogonal transforming coding.

7. The apparatus of claim 1, wherein said transforming comprises to a discrete cosine transforming.

8. The apparatus of claim 1, wherein said ideal-valued constants include irrational numbers.

9. The apparatus of claim 1, having forward and inverse transforming modes in which:
   said arithmetic means includes an asymmetrical hardware unit having a circuit configuration which in a forward transforming mode is asymmetrical with respect to that in an inverse transforming mode, wherein first certain circuit elements of said arithmetic means are dedicated to the forward transforming mode and wherein second certain circuit elements of said arithmetic means are dedicated to the inverse transforming mode.

10. The apparatus of claim 1, wherein said supplying means comprises:
    storage means for storing said digitized data; and
    parallel-to-serial converter means for receiving from said storage means digitized data in a bit-parallel manner, and for converting said received digitized data into a bit-serial data stream for application to said bit-serial means.

11. The apparatus of claim 10, further comprising serial-to-parallel converter means for receiving from said bit-serial means transformed data in a bit-serial stream, and for converting said transformed data into a bit-parallel form.

12. The apparatus of claim 11, further comprising sharing means for sharing said parallel-to-serial converter means such that both said parallel-to-serial converter means and said serial-to-parallel converter means are realized by common hardware.

13. The apparatus of claim 1, wherein said bit-serial means comprises a plurality of hardware stages operatively interconnected in cascade so as to bit-serially process said digitized data.

14. The apparatus of claim 13, wherein:
    one of said plurality of hardware stages includes a plurality of input ports for receiving input digital signals and a plurality of output ports for supplying output digital signals;
    a relationship formed between said digital input and output signals is:

$\{I\} \times \{T\} = \{O\}$ in which $\{I\}$=input vector representing said input digital signals,
        $\{T\}$=transform matrix, and
        $\{O\}$=output rector representing said output digital signals;
    said transform matrix $\{T\}$ containing integer constants by which said input digital signals are multiplied;
    each integer constant K being decomposed into a linear combination of two's power integers as $K = \Sigma_i C_i \times 2^{n_i}$ in which $n_i$=integer and $C_i$=non-two's power integer; and
    said one of said plurality of hardware stages comprises a first portion corresponding to said non-two's power integer $C_i$ and a second portion corresponding to said $2^{n_i}$.

15. The apparatus of claim 13, wherein each of said plurality of hardware stages includes output circuit elements for supplying stage output signals, each output circuit element comprising a flip flop driven by clock pulses for synchronous operation.

16. The apparatus of claim 1, wherein said strings includes a string in which an output from an adder or subtracter is directly connected to an input to another adder or subtracter.

17. An apparatus for processing a digital signal comprising:
    supplying means for supplying said digital signal;
    bit-serial arithmetic means for performing bit-serial arithmetic operations on said supplied signal for said processing;
    said bit-serial arithmetic means comprising distributed strings of flip flops, adder and/or subtracter for performing said bit-serial arithmetic operations;
    said strings having function of performing multiplications without any actual bit-parallel multiplier; and
    said multiplications using multiplication constants M1–MN by which said digitized data are multiplied, said multiplication constants M1–MN being integers and approximately in proportion to ideal-valued constants C1–CN such that $M1/C1 \approx M2/C2 \approx \ldots \approx MN/CN \approx P$ in which P is a non-two's power number.

18. An apparatus for transforming digitized data comprising:
    first storage means for storing and supplying said digitized data;
    bit-serial arithmetic means for performing bit-serial arithmetic operations on a bit-serial stream of said digitized data from said first storage means to thereby provide a bit-serial stream of processed data;
    second storage means for receiving and storing said processed data;
    said first and second storage means comprising bit-parallel accessible storage means;
    first converter means for receiving from said first storage means digitized data in a bit-parallel manner and for converting the received data into a bit-serial stream for application to said bit-serial arithmetic means;
    second converter means for receiving from said bit-serial arithmetic means a bit-serial stream of said processed data and for converting the received bit serial stream into a bit-parallel form for loading into said second storage means; and
    sharing means for sharing said first converter means with said second converter means such that both of said first and second converter means are realized by common hardware.

19. An apparatus for forward-transforming digitized data for data compression, comprising:
    supplying means for supplying said digitized data;
    arithmetic means for executing operations on said supplied data for said transforming of the digitized data;
    said arithmetic means comprising bit-serial means for performing bit-serial arithmetic operations;
    said bit-serial means comprising distributed strings of flip flops, adder and/or subtracter for performing said bit-serial arithmetic operations;
    said strings having a function of performing multiplications without any actual bit-parallel multiplier; and
    said multiplications using multiplication constants M1–MN by which said digitized data are multiplied, said multiplication constants M1–MN being integers and approximately in proportion to ideal-valued constants C1–CN such that $$M1/C1 \approx M2/C2 \approx \ldots \approx MN/CN \approx P$$

in which P is a non-two's power number.

20. An apparatus for inverse-transforming digitized data for data expansion, comprising:

supplying means for supplying said digitized data;

arithmetic means for executing operations on said supplied data for said transforming of the digitized data;

said arithmetic means comprising bit-serial means for performing bit-serial arithmetic operations;

said bit-serial means comprising distributed strings of flip flops, adder and/or subtracter for performing said bit-serial arithmetic operations;

said strings having a function of performing multiplications without any actual bit-parallel multiplier; and said multiplications using multiplication constants M1–MN by which said digitized data are multiplied, said multiplication constants M1–MN being integers and approximately in proportion to ideal-valued constants C1–CN such that $$M1/C1 \approx M2/C2 \approx \ldots \approx MN/CN \approx P$$

in which P is a non-two's power number.

21. An apparatus having first and second operation modes in which, in the first operation mode, digitized data are forward-transformed in a transformed domain for data compression, whereas in the second operation mode, digitized data in said transformed domain are inverse transformed for data expansion, the apparatus comprising:

supplying means for supplying digitized data;

bit-serial arithmetic means for performing bit-serial arithmetic operations on said supplied data;

said bit-serial arithmetic means comprising distributed strings of circuit elements without any bit-parallel multiplier;

said strings of circuit elements having a function of performing multiplications which use non-two's power approximation proportions of ideal-valued fixed coefficients for application to data to be processed;

said multiplications using multiplication constants M1–MN by which said digitized data are multiplied, said multiplication constants M1–MN being integers and approximately in proportion to ideal-valued constants C1–CN such that $$M1/C1 \approx M2/C2 \approx \ldots \approx MN/CN \approx P$$

in which P is a non-two's power number; and mode control means for controlling interconnection of said circuit element strings of said bit-serial arithmetic means for either of said data compression in said first operation mode and said data expansion in said second operation mode, whereby the apparatus functions as a forward-transformer in said first operation mode and as an inverse-transformer in said second operation mode.

* * * * *